US012725520B2

(12) United States Patent
Hu et al.

(10) Patent No.: US 12,725,520 B2
(45) Date of Patent: Sep. 1, 2026

(54) PARKING METHOD AND APPARATUS, AND VEHICLE

(71) Applicant: Yinwang Intelligent Technologies Co., Ltd., Shenzhen (CN)

(72) Inventors: Wenxiao Hu, Shanghai (CN); Ting Xu, Shenzhen (CN)

(73) Assignee: Yinwang Intelligent Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/884,497

(22) Filed: Sep. 13, 2024

(65) Prior Publication Data

US 2025/0006055 A1 Jan. 2, 2025

Related U.S. Application Data

(63) Continuation of application No. PCT/CN2022/081636, filed on Mar. 18, 2022.

(51) Int. Cl.

| | |
|---|---|
| ***G08G 1/14*** | (2006.01) |
| ***B60W 30/06*** | (2006.01) |
| ***B60W 40/09*** | (2012.01) |
| ***B60W 50/14*** | (2020.01) |

(52) U.S. Cl.

CPC ............ *G08G 1/145* (2013.01); *B60W 30/06* (2013.01); *B60W 40/09* (2013.01); *B60W 50/14* (2013.01); *G08G 1/143* (2013.01); *B60W 2050/146* (2013.01); *B60W 2520/10* (2013.01); *B60W 2540/18* (2013.01)

(58) Field of Classification Search

CPC ....... G08G 1/145; G08G 1/143; B60W 30/06; B60W 40/09; B60W 50/14; B60W 2050/146; B60W 2520/10; B60W 2540/18

See application file for complete search history.

(56) References Cited

U.S. PATENT DOCUMENTS

| | | | | |
|---|---|---|---|---|
| 8,504,245 | B2 * | 8/2013 | Sasajima | B60K 35/22 701/41 |
| 11,027,723 | B2 * | 6/2021 | Hayakawa | B60R 1/27 |
| 11,958,475 | B2 * | 4/2024 | Suzuki | B62D 15/0285 |
| 2013/0060421 | A1 | 3/2013 | Kadowaki et al. | |
| 2020/0346639 | A1 * | 11/2020 | Tashiro | G08G 1/168 |

(Continued)

FOREIGN PATENT DOCUMENTS

| | | | |
|---|---|---|---|
| CN | 108885825 | A | 11/2018 |
| CN | 111591283 | A | 8/2020 |
| EP | 2394862 | B1 | 12/2011 |

(Continued)

*Primary Examiner* — Steven Lim
*Assistant Examiner* — James E Munion
(74) *Attorney, Agent, or Firm* — Leydig, Voit & Mayer, Ltd.

(57) ABSTRACT

A parking method includes: obtaining information about a plurality of parking areas; obtaining a relative position relationship between a vehicle and each of the plurality of parking areas; and recommending a first parking area to a user based on the relative position relationship and a first driving behavior of the user, where the plurality of parking areas include the first parking area. The parking method can be applied to a new energy vehicle or an intelligent vehicle, help improve user parking efficiency, and help improve user parking experience.

20 Claims, 37 Drawing Sheets

(56) References Cited

U.S. PATENT DOCUMENTS

2023/0023349 A1* 1/2023 Pathak .................. G08G 1/168

FOREIGN PATENT DOCUMENTS

| | | | | | |
|---|---|---|---|---|---|
| EP | 3367367 | A1 | | 8/2018 | |
| JP | 2014196040 | A | | 10/2014 | |
| JP | 2018111381 | A | | 7/2018 | |
| JP | WO2017068697 | A1 | | 9/2018 | |
| JP | 2019151307 | A | | 9/2019 | |
| JP | 2019155951 | A | * | 9/2019 | |
| JP | 2021151815 | A | | 9/2021 | |
| JP | 7363906 | B2 | | 10/2023 | |
| KR | 20210011533 | A | * | 2/2021 | ............ G08G 1/168 |

* cited by examiner

PARKING METHOD AND APPARATUS, AND VEHICLE

CROSS-REFERENCE TO RELATED APPLICATIONS

This application is a continuation of International Application No. PCT/CN2022/081636, filed on Mar. 18, 2022, the disclosure of which is hereby incorporated by reference in its entirety.

TECHNICAL FIELD

Embodiments of this application relate to the field of intelligent driving, and more specifically, to a parking method and apparatus, and a vehicle.

BACKGROUND

Automatic parking (AP) means a vehicle is automatically parked in a parking space, to be specific, an automatic driving system can semi-automatically or full-automatically help a user park a vehicle in a parking space. Automatic parking may include automatic parking assist (APA), remote parking assist (RPA), auto valet parking (AVP), and the like.

A current automatic parking technology has a high requirement on a driver. For example, when the driver drives the vehicle, if a posture or a position of the vehicle does not meet a requirement (for example, marked lane violation), the vehicle cannot identify a parking space, the vehicle cannot be pulled in the parking space due to incorrect determining of the vehicle, or the like. As a result, the driver directly misses a proper parking space or opportunity, and parking efficiency is low.

Therefore, how to improve parking efficiency and accuracy becomes an urgent problem to be resolved.

SUMMARY

Embodiments of this application provide a parking method and apparatus, and a vehicle, to help improve efficiency and accuracy when a user performs parking.

A vehicle (sometimes referred to as an auto for short) in this application is a vehicle in a broad sense, and may be a transportation means (for example, a car, a truck, a motorcycle, a train, an airplane, or a ship), an industrial vehicle (for example, a fork lift truck, a trailer, or a tractor), an engineering vehicle (for example, an excavator, a bulldozer, or a crane), an agricultural device (for example, a lawn mower, a harvester), a recreation device, a toy vehicle, or the like. A type of the vehicle is not limited in this application.

According to a first aspect, a parking method is provided. The method includes: obtaining information about a plurality of parking areas: obtaining a relative position relationship between a vehicle and each of the plurality of parking areas: and recommending a first parking area to a user based on the relative position relationship and a first driving behavior of the user, where the plurality of parking areas include the first parking area.

In this embodiment of this application, after obtaining the information about the plurality of parking areas, the vehicle may prompt the user with a recommended parking area based on the relative position relationship between the vehicle and each parking area and a driving behavior of the user, so that the user can quickly target the recommended parking area from the plurality of parking areas for parking. This helps accelerate a process in which the user selects a proper parking area from the plurality of parking areas, and helps prevent the user from manually selecting a parking area in which parking is difficult: and helps improve user parking efficiency, and improve user parking experience and efficiency on the whole.

In some possible implementations, the parking area includes a pulling-out area (for example, an area obtained after the vehicle is pulled out) or a pulling-in area (for example, a parking space).

In some possible implementations, the first driving behavior includes first gear information and/or first steering information of a steering wheel. The first steering information of the steering wheel corresponds to a first steering direction of a wheel.

In some possible implementations, the first parking area may include two or more parking areas.

In some possible implementations, the method further includes: prompting the user with a recommendation degree of the first parking area.

With reference to the first aspect, in some implementations of the first aspect, the method further includes: recommending a second parking area to the user based on the relative position relationship and a second driving behavior of the user, where the plurality of parking areas include the second parking area.

In this embodiment of this application, after the first parking area is recommended to the user, in a process in which the user drives the vehicle to the first parking area, the recommended parking area may be switched from the first parking area to the second parking area due to the driving behavior of the user. In this way, the vehicle can prompt the user with an updated recommended parking area in time. This improves user parking efficiency, and improves user parking experience.

In some possible implementations, the second driving behavior includes second gear information and/or second steering information of a steering wheel. The second steering information of the steering wheel corresponds to a second steering direction of a wheel.

With reference to the first aspect, in some implementations of the first aspect, the method further includes: determining a parking mode of the vehicle based on the relative position relationship and a third driving behavior of the user, where the parking mode includes pulling in a parking area or pulling out of a parking area.

In this embodiment of this application, before determining the recommended parking area, the vehicle may first determine the parking mode based on the relative position relationship between the vehicle and each parking area and the driving behavior of the user. In this way, the vehicle can prompt the user with the recommended parking area in the parking mode, and does not need to provide the user with information about the parking area when the parking area is pulled in or out. Therefore, the parking area is recommended to better satisfy a parking intention of the user. This avoids incorrect recommendation of the parking area, and improves user parking efficiency.

In some possible implementations, the third driving behavior includes one or more of gear information, steering information of a steering wheel, information about whether the vehicle is powered on within first preset duration before the parking mode of the vehicle is determined, and an automatic parking mode that the vehicle is in before the parking mode of the vehicle is determined.

In some possible implementations, it may be determined, based on one or more of the following conditions, that the parking mode is pulling in the parking area; The vehicle can identify a parking space, but the vehicle is not in the parking space, or the vehicle is not completely pulled in the parking space; the vehicle switches from a state in which the vehicle is not in a parking space to a state in which the vehicle enters one or more parking spaces (for example, in a process of manually pulling in a parking space, the user does not pull the vehicle in the parking space through a plurality of gear changes); the vehicle switches from a state in which the vehicle is not in a parking space to a state in which the vehicle is pulled in the parking space, but the vehicle is not parked in the middle of the parking space (for example, in a time period before the vehicle is not parked in the middle of the parking space, the vehicle detects an operation that the user manually pulls the vehicle in the parking space); and before the parking mode is determined, the vehicle detects that the vehicle enters an automatic pulling-in mode, and actively or passively exits the automatic pulling-in mode when the vehicle is not pulled in a parking space.

In some possible implementations, it may be determined, based on one or more of the following conditions, that the parking mode is pulling out of the parking area; The vehicle can identify a parking space, and the vehicle is in the parking space and parks in the middle; when the vehicle is powered on and started for the first time, the vehicle can identify a parking space and the vehicle is in the parking space; before the parking mode is determined, the vehicle detects that the vehicle enters an automatic pulling-out mode, and the vehicle actively or passively exits the automatic pulling-out mode when the vehicle is not pulled out of a parking space; and the vehicle is in a parking space, and the vehicle detects that the vehicle does not completely leave the parking space after the user drives the vehicle for one or more times.

In some possible implementations, if the parking mode is pulling in the parking area, the relative position relationship information may further include whether the vehicle has entered a parking area. If the vehicle has entered the parking area, the parking area may be determined as the recommended parking area.

With reference to the first aspect, in some implementations of the first aspect, the first driving behavior includes first gear information of the vehicle and first steering information of a steering wheel of the vehicle, the first steering information of the steering wheel corresponds to a first steering direction of a wheel, and the parking mode is pulling in the parking area; and the recommending a first parking area to a user based on the relative position relationship and a first driving behavior of the user includes; recommending the first parking area to the user based on the first gear information and an included angle between the first steering direction and a direction of a first side of each parking area, where the first side corresponds to a direction in which the vehicle is pulled in the parking area.

In this embodiment of this application, the recommended parking area is determined with reference to an included angle between a wheel steering direction and a direction of an outermost parking space line of the opening of the parking area. This helps accelerate a process in which the user selects a proper parking area from the plurality of parking areas, and helps prevent the user from manually selecting a parking area in which parking is difficult; and helps improve user parking efficiency, and improve user parking experience and efficiency on the whole.

With reference to the first aspect, in some implementations of the first aspect, the relative position relationship further includes information about a distance between the vehicle and each parking area, and an included angle between a direction of a second side of the vehicle and a connection line between a wheel central point of the second side and a central point of a parking space line on the first side, and the first side and the second side correspond to the direction in which the vehicle is pulled in the parking area.

In this embodiment of this application, the recommended parking area is determined based on a distance between the vehicle and the parking area and an included angle between a direction of the wheel and a direction of the parking space line. This helps accelerate a process in which the user selects a proper parking area from the plurality of parking areas, and helps prevent the user from manually selecting a parking area in which parking is difficult; and helps improve user parking efficiency, and improve user parking experience on the whole.

With reference to the first aspect, in some implementations of the first aspect, before the determining a parking mode of the vehicle, the method further includes; determining that a speed of the vehicle is less than or equal to a preset speed threshold.

In this embodiment of this application, the recommended parking area may be determined with reference to the information about the distance between the vehicle and each parking area, and the included angle between the direction of the wheel and the connection line between the wheel center point of the vehicle and the center point of the outermost parking space line of the opening of the parking area. This helps accelerate a process in which the user selects a proper parking area from the plurality of parking areas, and helps prevent the user from manually selecting a parking area in which parking is difficult; and helps improve user parking efficiency, and improve user parking experience on the whole.

With reference to the first aspect, in some implementations of the first aspect, the method further includes; determining information about a parking trajectory from a current position of the vehicle to the first parking area based on a pose of the vehicle and the information about the first parking area; and prompting the user with the information about the parking trajectory.

In this embodiment of this application, after determining the recommended parking area, the vehicle may automatically plan the information about the parking trajectory from the current position of the vehicle to the recommended parking area, so that the user can conveniently drive the vehicle to the first parking area based on the information about the parking trajectory. This helps improve user parking efficiency, improve user parking experience, and also helps ensure user parking safety.

With reference to the first aspect, in some implementations of the first aspect, the information about the parking trajectory includes one or more of a number of planned gear changes, a planned parking path, and planned parking duration from the current position of the vehicle to the first parking area. The method further includes; when one or more of the following conditions are met, prompting the user to use an automatic parking function; detecting that a number of gear changes of the user in a process of driving from the current position to the first parking area is greater than or equal to the number of planned gear changes; detecting that a length of a driving path of the vehicle from the current position to the first parking area is greater than or equal to a length of the planned parking path; or detecting that duration of parking of the vehicle from the current position to the first parking area is greater than or equal to the planned parking duration.

In this embodiment of this application, when the vehicle detects that the user has a parking difficulty in a manual parking process, the vehicle can prompt the user to use the automatic parking function in time, so that the user can conveniently switch from manual parking to the automatic parking in time. This helps improve parking efficiency, and also helps ensure user parking safety.

With reference to the first aspect, in some implementations of the first aspect, the method further includes; when the vehicle is pulled in the first parking area and the vehicle is not parked in the middle of the first parking area, prompting the user that the vehicle is not parked in the middle of the first parking area, or prompting the user to use an automatic parking function.

In this embodiment of this application, after the vehicle is pulled in the first parking area, the vehicle detects that the vehicle is not parked in the middle of the first parking area. In this case, the vehicle may notify the user that the vehicle is not parked in the middle, or the vehicle may prompt the user to park the vehicle in the middle of the parking area through the automatic parking function. This helps reduce a risk of scratching or a violation caused by not parked in the middle, and helps improve user experience.

With reference to the first aspect, in some implementations of the first aspect, the second driving behavior includes second gear information of the vehicle and second steering information of a steering wheel of the vehicle, the second steering information of the steering wheel corresponds to a second steering direction of a wheel, the parking mode is pulling in the parking area, and the recommending a second parking area to a user based on the relative position relationship and a second driving behavior of the user includes; recommending the second parking area to the user based on the second gear information, and an included angle between the second steering direction and a direction of a first side of each parking area, where the first side corresponds to a direction in which the vehicle is pulled in the parking area.

According to a second aspect, a parking apparatus is provided. The apparatus includes; an obtaining unit, configured to obtain information about a plurality of parking areas, where the obtaining unit is further configured to obtain a relative position relationship between a vehicle and each of the plurality of parking areas; and a recommendation unit, configured to recommend a first parking area to a user based on the relative position relationship and a first driving behavior of the user, where the plurality of parking areas include the first parking area.

With reference to the second aspect, in some implementations of the second aspect, the recommendation unit is further configured to recommend a second parking area to the user based on the relative position relationship and a second driving behavior of the user, where the plurality of parking areas include the second parking area.

With reference to the second aspect, in some implementations of the second aspect, the apparatus further includes; a first determining unit, configured to; before the obtaining unit obtains the information about the plurality of parking areas, determine a parking mode of the vehicle based on the relative position relationship and a third driving behavior of the user, where the parking mode includes pulling in a parking area or pulling out of a parking area.

With reference to the second aspect, in some implementations of the second aspect, the first driving behavior includes first gear information of the vehicle and first steering information of a steering wheel of the vehicle, the first steering information of the steering wheel corresponds to a first steering direction of a wheel, and the parking mode is pulling in the parking area; and the recommendation unit is specifically configured to recommend the first parking area to the user based on the first gear information and an included angle between the first steering direction and a direction of a first side of each parking area where the first side corresponds to a direction in which the vehicle is pulled in the parking area.

With reference to the second aspect, in some implementations of the second aspect, the relative position relationship further includes information about a distance between the vehicle and each parking area, and an included angle between a direction of a second side of the vehicle and a connection line between a wheel central point of the second side and a central point of a parking space line on the first side, and the first side and the second side correspond to the direction in which the vehicle is pulled in the parking area.

With reference to the second aspect, in some implementations of the second aspect, the first determining unit is further configured to; before determining the parking mode of the vehicle, determine that a speed of the vehicle is less than or equal to a preset speed threshold.

With reference to the second aspect, in some implementations of the second aspect, the apparatus further includes; a second determining unit, configured to determine information about a parking trajectory from a current position of the vehicle to the first parking area based on a pose of the vehicle and information about the first parking area; and a first prompting unit, configured to prompt the user with the information about the parking trajectory.

With reference to the second aspect, in some implementations of the second aspect, the information about the parking trajectory includes one or more of a number of planned gear changes, a planned parking path, and planned parking duration from the current position of the vehicle to the first parking area; the first prompting unit is further configured to; when one or more of the following conditions are met, prompt the user to use an automatic parking function; detecting that a number of gear changes of the user in a process of driving from the current position to the first parking area is greater than or equal to the number of planned gear changes; detecting that a length of a driving path of the vehicle from the current position to the first parking area is greater than or equal to a length of the planned parking path; or detecting that duration of parking of the vehicle from the current position to the first parking area is greater than or equal to the planned parking duration.

With reference to the second aspect, in some implementations of the second aspect, the apparatus further includes; a second prompting unit, configured to; when the vehicle is pulled in the first parking area and the vehicle is not parked in the middle of the first parking area, prompt the user that the vehicle is not parked in the middle of the first parking area, or prompt the user to use the automatic parking function.

According to a third aspect, an apparatus is provided. The apparatus includes; a memory, configured to store computer instructions; and a processor, configured to execute the computer instructions stored in the memory, to enable the apparatus to perform the method in the first aspect.

According to a fourth aspect, a vehicle is provided, and the vehicle includes the apparatus according to any one of the second aspect or the third aspect.

According to a fifth aspect, a computer program product is provided. The computer program product includes computer program code, and when the computer program code is run on a computer, the computer is enabled to perform the method in the first aspect.

All or some of the computer program code may be stored in a first storage medium. The first storage medium may be encapsulated together with a processor, or may be encapsulated separately from a processor. This is not specifically limited in embodiments of this application.

According to a sixth aspect, a computer-readable medium is provided. The computer-readable medium stores program code, and when the computer program code is run on a computer, the computer is enabled to perform the method in the first aspect.

According to a seventh aspect, an embodiment of this application provides a chip system. The chip system includes a processor, configured to invoke a computer program or computer instructions stored in a memory, to enable the processor to perform the method according to the first aspect.

With reference to the seventh aspect, in a possible implementation, the processor is coupled to the memory through an interface.

With reference to the seventh aspect, in a possible implementation, the chip system further includes a memory, and the memory stores a computer program or computer instructions.

DESCRIPTION OF EMBODIMENTS

The following describes technical solutions in embodiments of this application with reference to the accompanying drawings. In describing embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases; Only A exists, both A and B exist, and only B exists.

In embodiments of this application, prefix words such as "first" and "second" are used only to distinguish between different described objects, and do not limit a position, a sequence, a priority, a quantity, content, or the like of the described objects. For example, if the described object is a "parking area", ordinal numbers before "parking area" in a "first parking area" and a "second parking area" do not limit a position or a sequence of the "parking areas". In embodiments of this application, use of a prefix word such as an ordinal number used to distinguish a described object does not constitute a limitation on the described object. For a description of the described object, refer to the description of the context in the claims or the embodiments, and use of such a prefix word should not constitute an unnecessary limitation. In addition, in the descriptions of this embodiment, unless otherwise specified. "a plurality of" means two or more than two.

Figure 1:
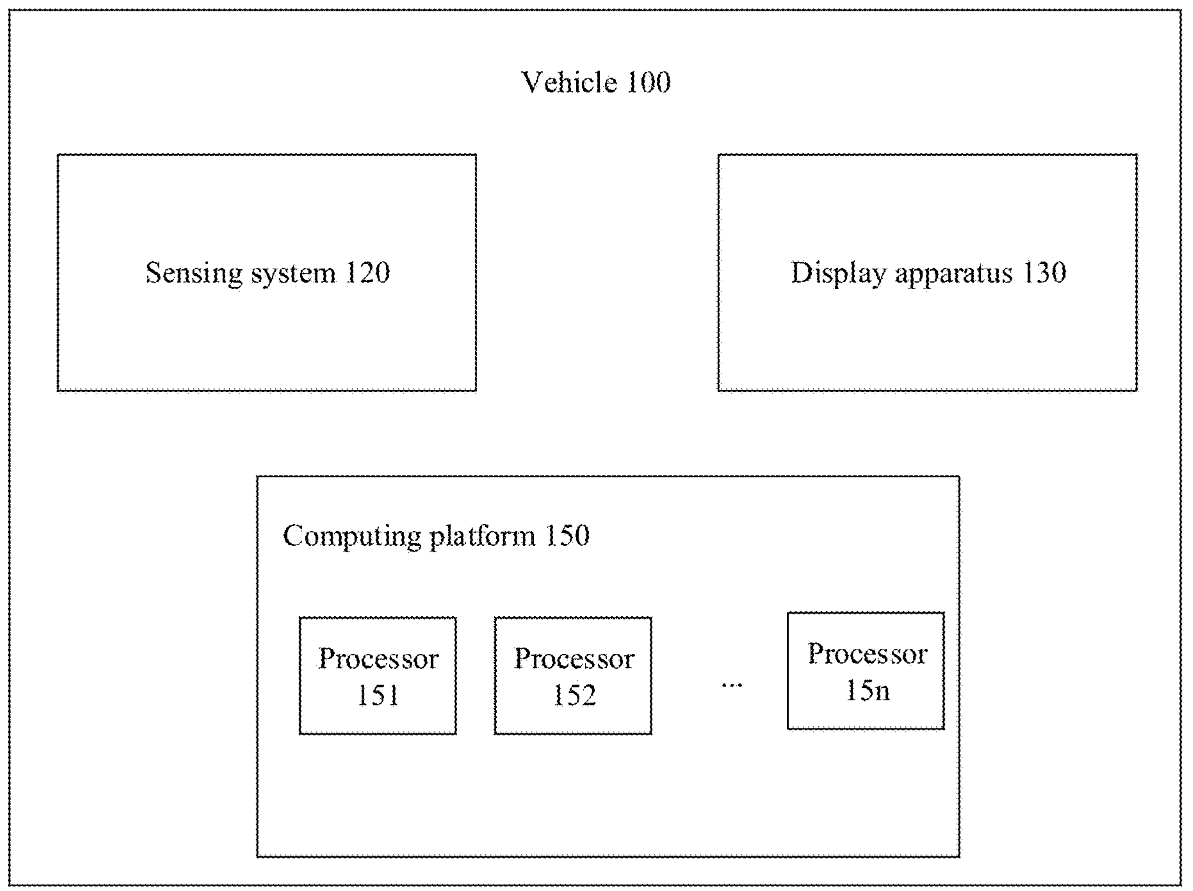
FIG. 1 is a schematic functional block diagram of a vehicle according to an embodiment of this application.

FIG. 1 is a schematic functional block diagram of a vehicle 100 according to an embodiment of this application. The vehicle 100 may include a sensing system 120, a display apparatus 130, and a computing platform 150. The sensing system 120 may include several types of sensors that sense information about an environment around the vehicle 100. For example, the sensing system 120 may include a positioning system. The positioning system may be a global positioning system (GPS), or may be one or more of a BeiDou system or another positioning system, an inertia measurement unit (IMU), a lidar, a millimeter-wave radar, an ultrasonic radar, or a camera apparatus.

Some or all functions of the vehicle 100 may be controlled by the computing platform 150. The computing platform 150 may include processors 151 to 15*n* (n is a positive integer). The processor is a circuit having a signal processing capability. In an implementation, the processor may be a circuit having an instruction reading and running capability, for example, a central processing unit (CPU), a microprocessor, a graphics processing unit (GPU) (which may be understood as a microprocessor), or a digital signal processor (DSP). In another implementation, the processor may implement a specific function by using a logical relationship of a hardware circuit. The logical relationship of the hardware circuit is fixed or reconfigurable. For example, the processor is a hardware circuit implemented by an application-specific integrated circuit (ASIC) or a programmable logic device (PLD), for example, an FPGA. In the reconfigurable hardware circuit, a process in which the processor loads a configuration document to implement hardware circuit configuration may be understood as a process in which the processor loads instructions to implement functions of some or all of the foregoing units. In addition, the professor may be a hardware circuit designed for artificial intelligence, and may be understood as an ASIC, for example, a neural network processing unit (NPU), a tensor processing unit (TPU), or a deep learning processing unit (DPU). In addition, the computing platform 150 may further include a memory. The memory is configured to store instructions. Some or all of the processors 151 to **15*n*** may invoke the instructions in the memory, to implement a corresponding function.

The vehicle 100 may include an advanced driving assistant system (ADAS). The ADAS obtains information from around the vehicle by using a plurality of sensors (including but not limited to the lidar, the millimeter-wave radar, the camera apparatus, an ultrasonic sensor, the global positioning system, and the inertial measurement unit) on the vehicle, and analyzes and processes the obtained information, to implement functions such as obstacle sensing, target recognition, vehicle positioning, path planning, and driver monitoring/reminder, in this way, driving safety, automation, and comfort of vehicle are improved.

Figure 2:
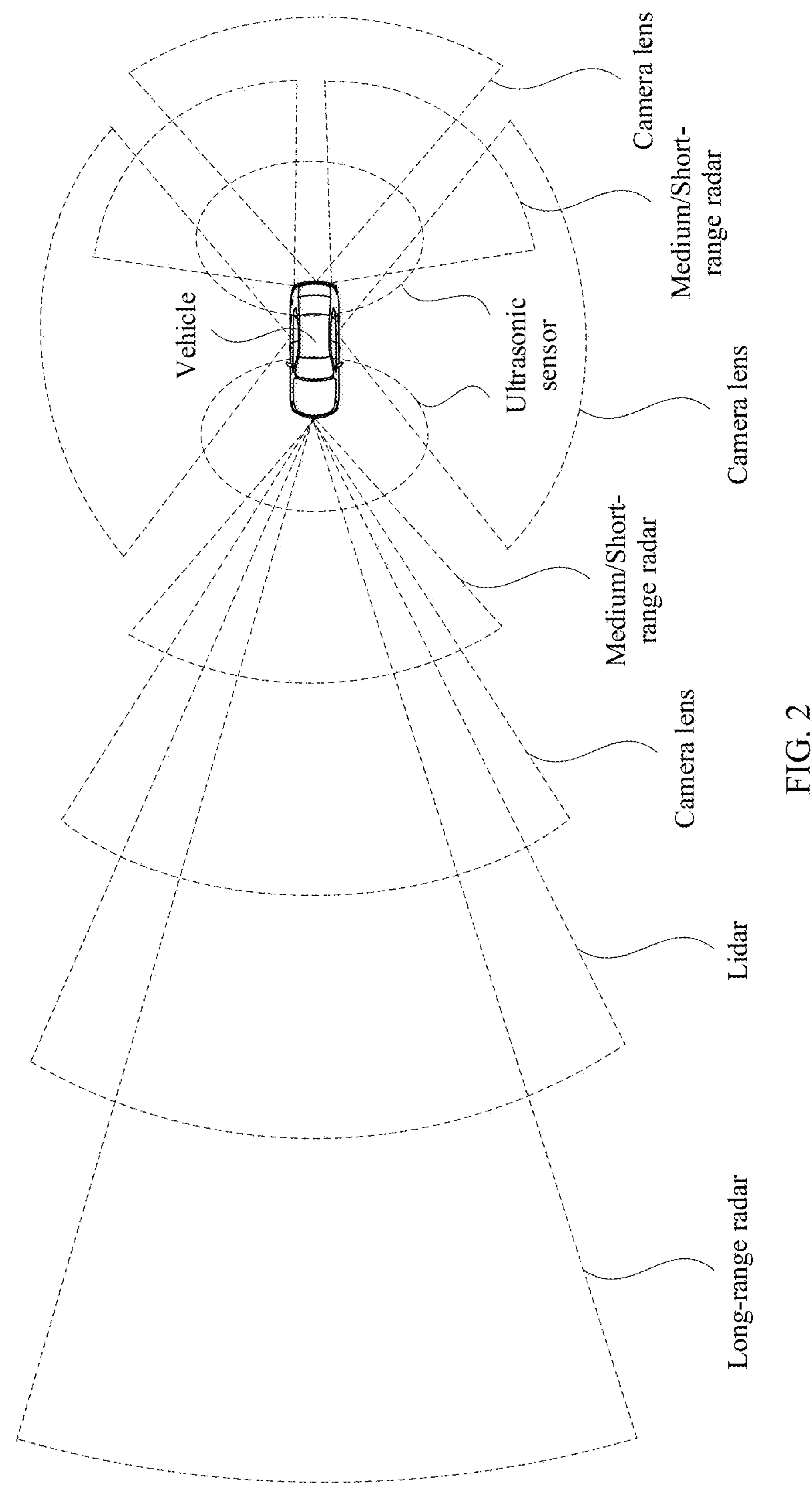
FIG. 2 is a schematic diagram of sensing ranges of various sensors according to an embodiment of this application.

FIG. 2 is a schematic diagram of sensing ranges of various sensors. The sensors may include, for example, the lidar, the millimeter-wave radar, the camera apparatus, and the ultrasonic sensor shown in FIG. 1. The millimeter-wave radar may be classified into a long-range radar and a medium/short-range radar. Currently; a sensing range of the lidar is about 80-150 m, a sensing range of the long-range millimeter-wave radar is about 1-250 m, a sensing range of the medium/short-range millimeter-wave radar is about 30-120 m, a sensing range of a camera lens is about 50-200 m, and a sensing range of the ultrasonic radar is about 0-5 m.

In terms of logical functions, an ADAS system usually includes three main functional modules; a sensing module, a decision-making module, and an execution module. The sensing module senses a surrounding environment of the vehicle body by using a sensor, and inputs corresponding real-time data to a decision-making center. The sensing module mainly includes a vehicle-mounted camera lens, an ultrasonic radar, a millimeter-wave radar, and a lidar. The decision-making module uses a computing apparatus and an algorithm to make a corresponding decision based on information obtained by the sensing module. After receiving the decision signal from the decision module, the execution module takes a corresponding action, for example, driving, lane change, steering, braking, or warning.

Under different autonomous driving levels (L0-L5), the ADAS may implement different levels of autonomous driving assistance based on information obtained by an artificial intelligence algorithm and a multi-sensor. The foregoing autonomous driving levels (L0-L5) are based on level standards of the Society of Automotive Engineers (SAE). L0 indicates no automation, L1 indicates driving assistance, L2 indicates partial automation, L3 indicates conditional automation, L4 indicates high automation, and L5 indicates full automation. The task of monitoring a road and responding to the road at L1-L3 are completed by the driver and the system, and the driver needs to take over a dynamic driving task. The driver may be completely transformed into a passenger at L4 and L5. Currently, functions that can be implemented by the ADAS mainly include but are not limited to; adaptive cruise control, automatic emergency braking, automatic parking, blind spot monitoring, traffic warning/braking at front crossroads, traffic warning/braking at rear crossroads, front vehicle collision warning, lane departure warning, lane keeping assist, rear vehicle anti-collision warning, traffic sign recognition, traffic jam assist, and highway assist. It should be understood that the foregoing functions may have specific modes at different automatic driving levels (L0-L5). A higher automatic driving level indicates a more intelligent mode. For example, automatic parking may include APA, RPA, and AVP. For the APA, the driver does not need to control the steering wheel, but still needs to control a throttle and a brake on the vehicle. For the RPA, the driver may perform, outside the vehicle, remote parking on the vehicle via a terminal (for example, a mobile phone). For the AVP, the vehicle may complete parking without the driver. For a corresponding automatic driving level, the APA is approximately at a level of L1, the RPA is approximately at a level of L2-L3, and the AVP is approximately at a level of L4.

As described above, a current automatic parking technology has a high requirement on the driver. For example, when the driver drives the vehicle, if a posture or a position of the vehicle does not meet a requirement (for example, marked lane violation), the vehicle cannot identify a parking space, the vehicle cannot be pulled in the parking space due to incorrect determining of the vehicle, or the like. As a result, the driver directly misses a proper parking space or opportunity, and automatic parking efficiency is low.

In view of this, embodiments of this application provide a parking method and apparatus, and a transportation means. A vehicle may recommend a parking mode, a parking area, and a parking function to a user based on a pose of the vehicle and a driving behavior of a driver, to help improve user parking efficiency.

Figure 3:
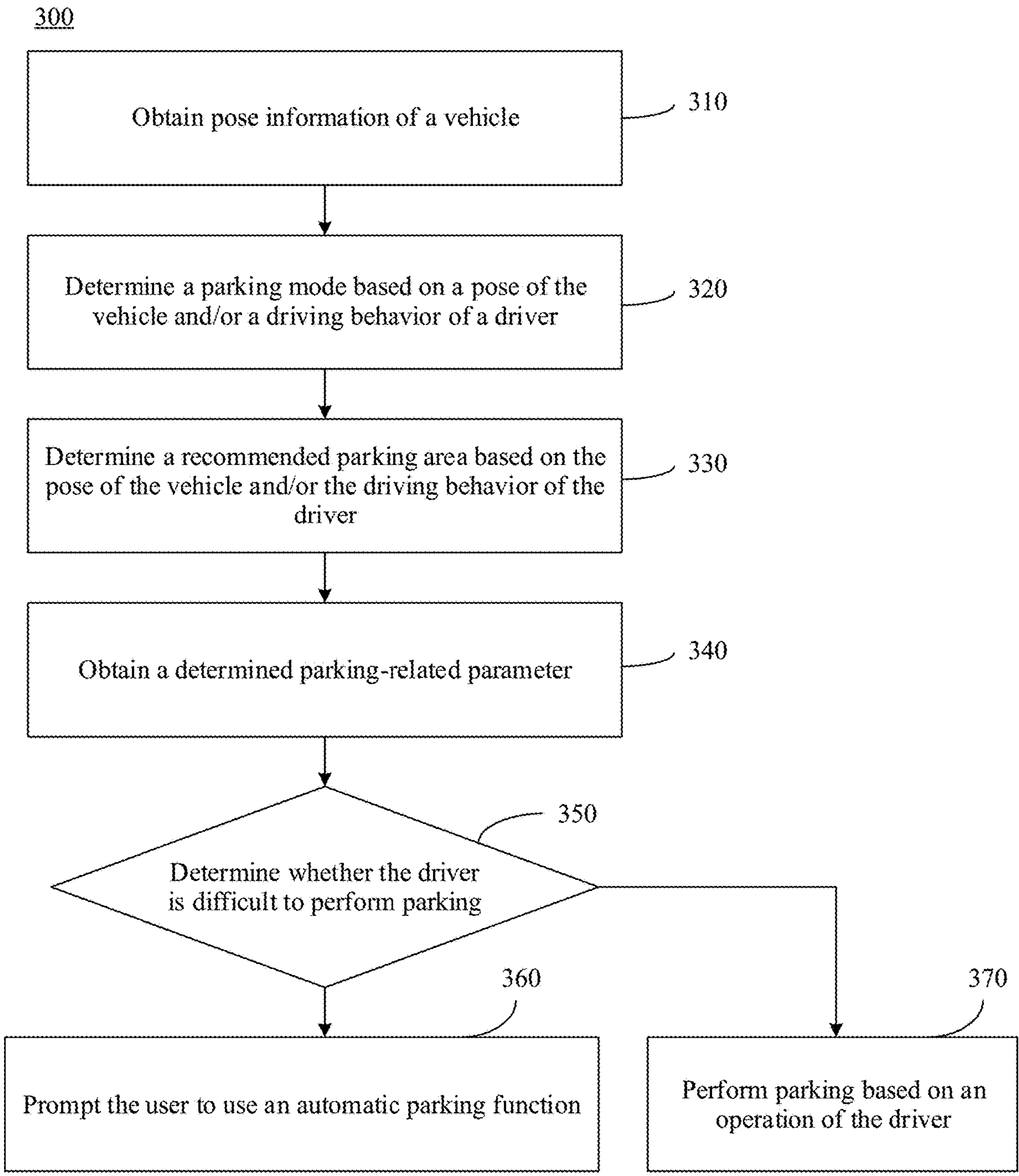
FIG. 3 is a schematic flowchart of a parking method according to an embodiment of this application.
Figure 4A:
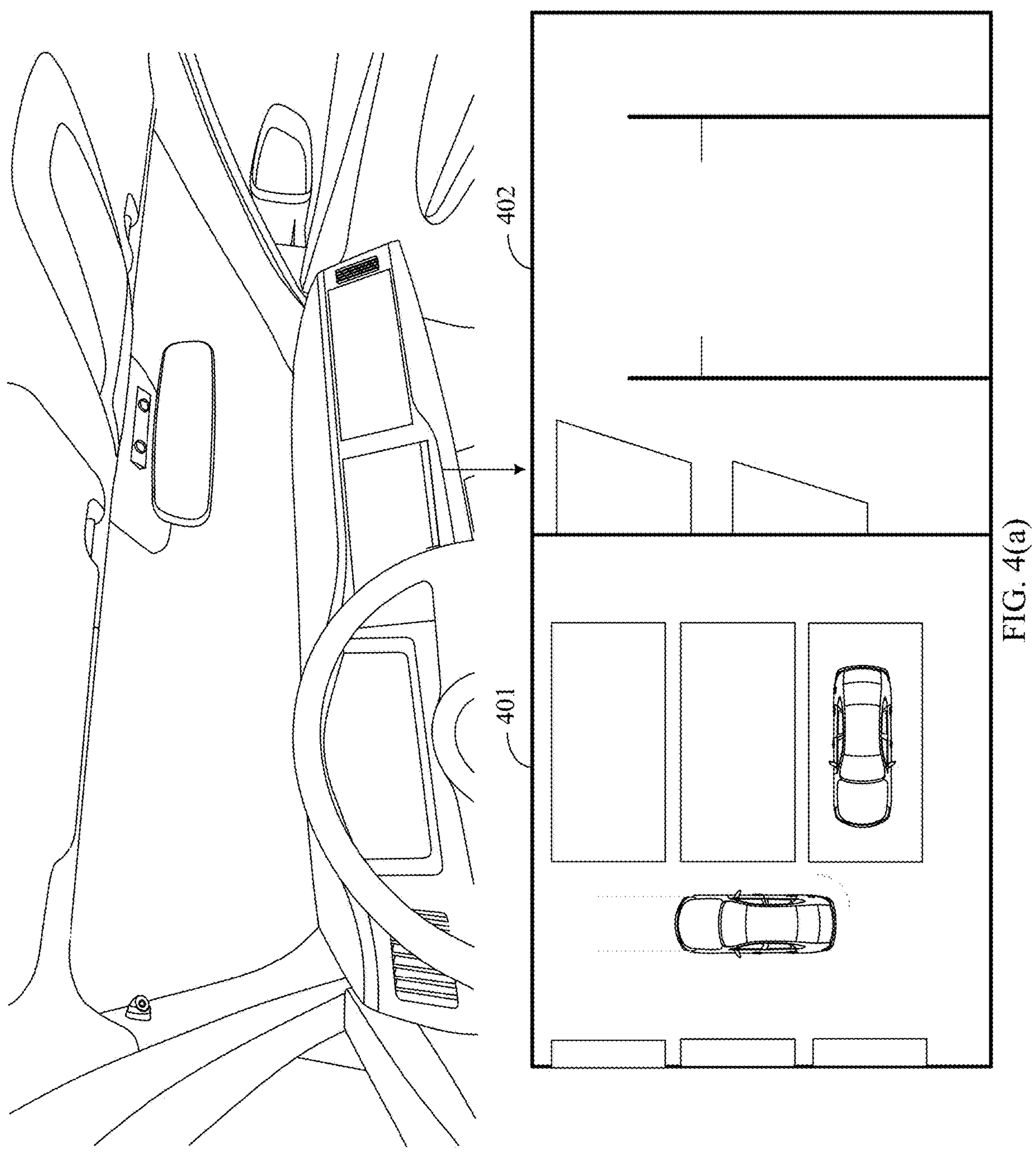
FIG. 4(*a*) to FIG. 4(*d*) show a group of graphical user interfaces GUIs according to an embodiment of this application.
Figure 4B:
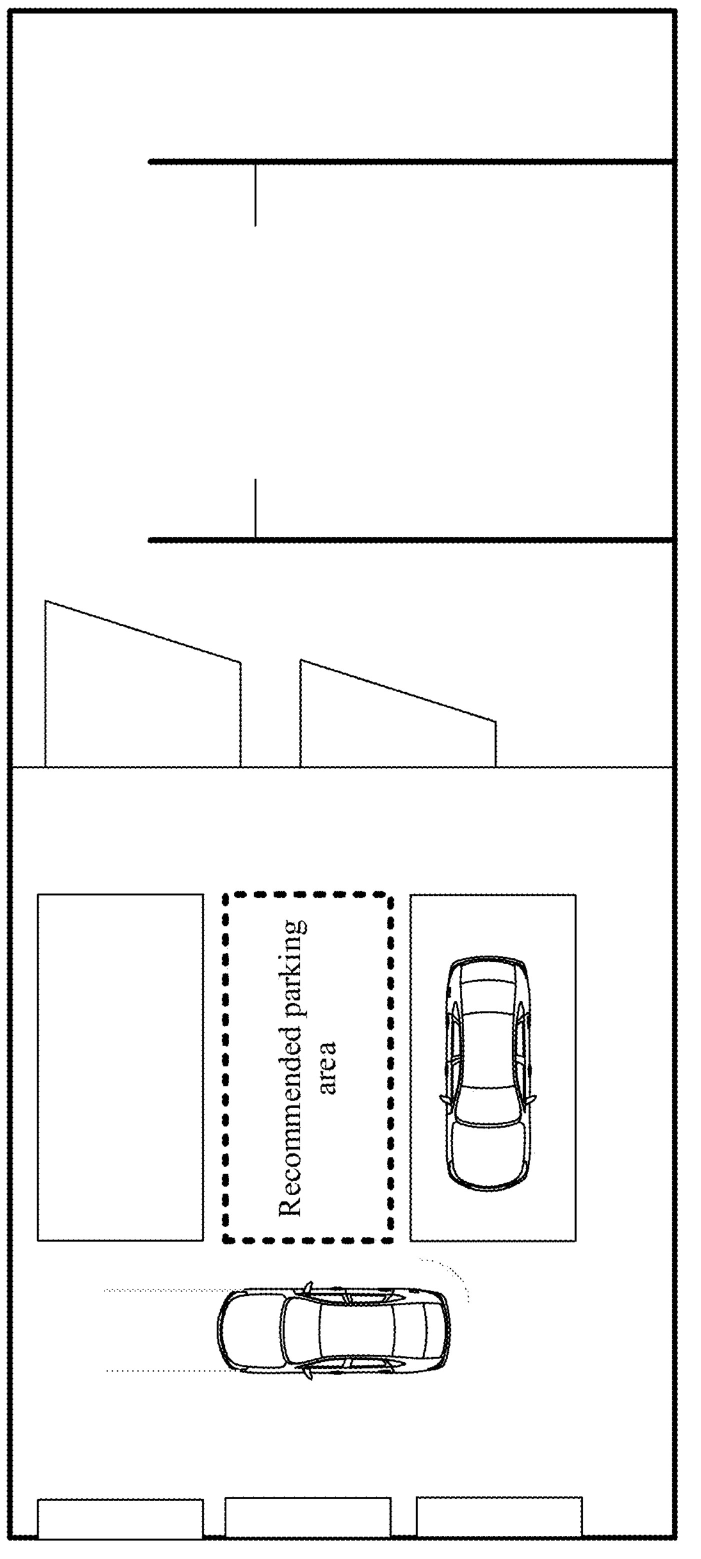
Figure 4C:
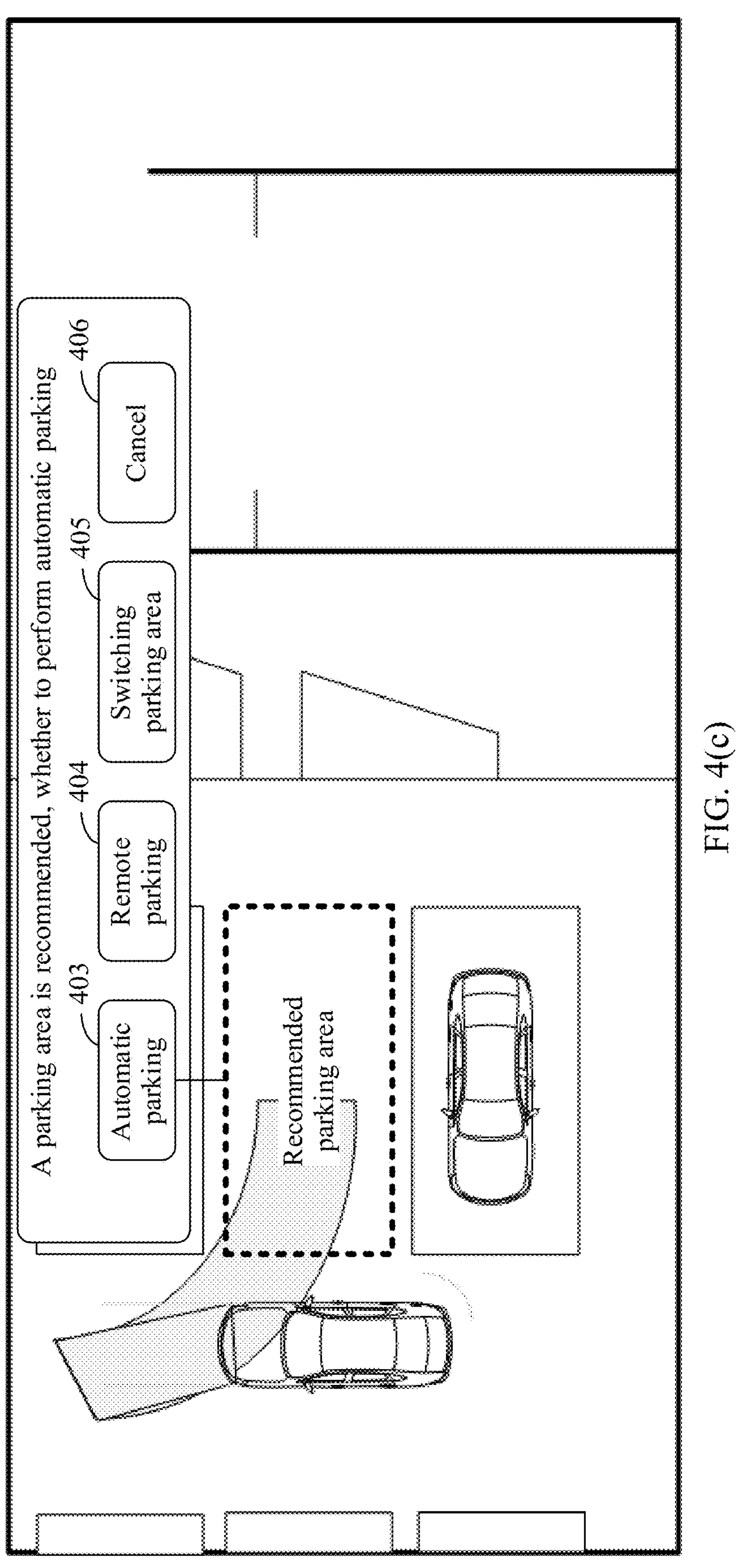
Figure 4D:
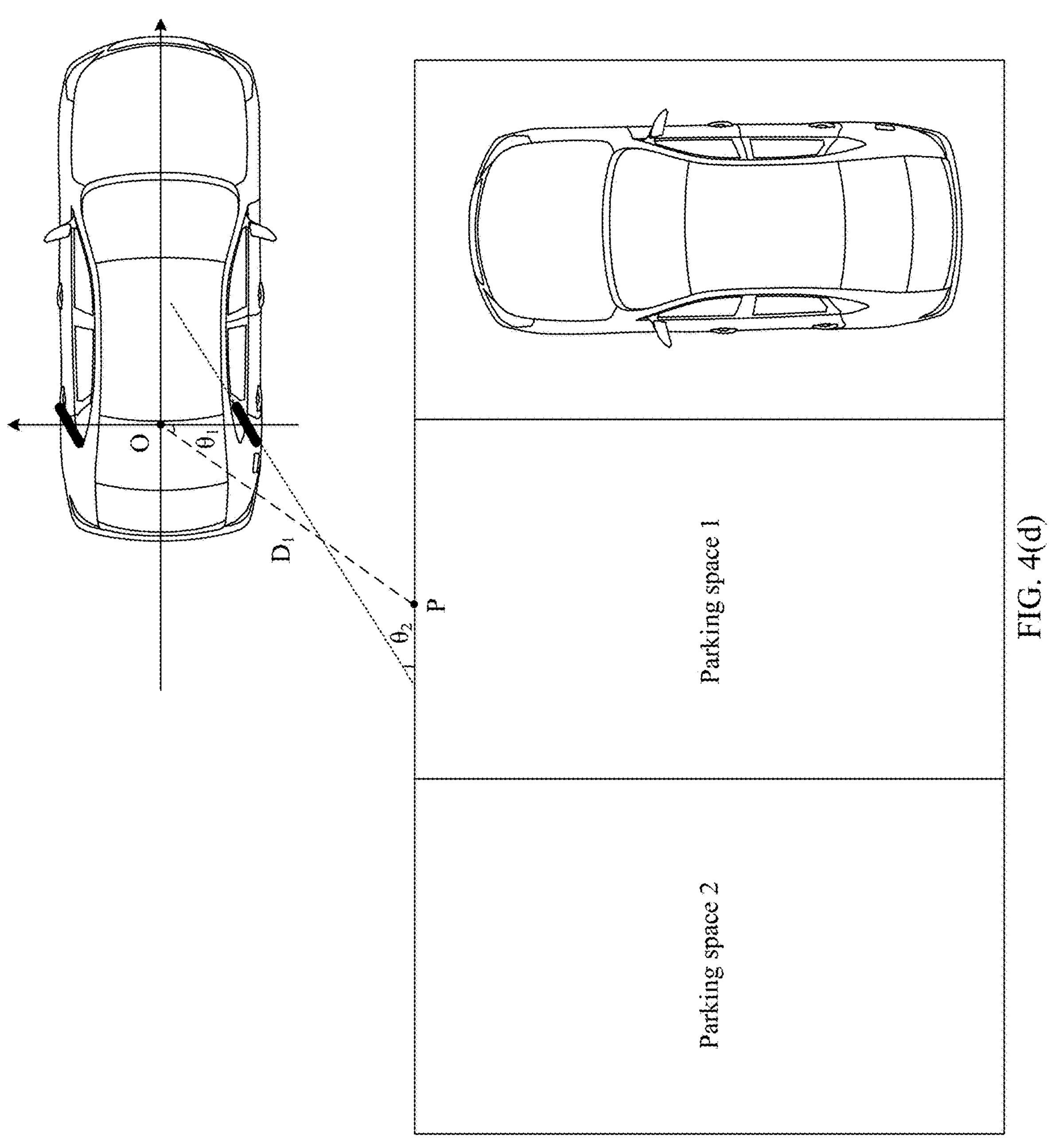

FIG. 3 is a schematic flowchart of a parking method 300 according to an embodiment of this application. As shown in FIG. 3, the method 300 includes the following steps.

S310: Obtain pose information of a vehicle.

The pose information of the vehicle may include position information of the vehicle and posture information of the vehicle. The position information of the vehicle may be obtained by the positioning system in the sensing system 120 shown in FIG. 1, and the posture information may be determined by using data collected by sensors such as the camera apparatus, the lidar, the millimeter-wave radar, the ultrasonic radar, and the IMU in the sensing system 120.

In an embodiment, the method 300 further includes; obtaining one or more of parameter information of the vehicle, surrounding environment information, parking area information, and driving trajectory information.

For example, the parameter information of the vehicle includes but is not limited to body length, width, and wheelbase information of the vehicle.

For example, the surrounding environment information includes but is not limited to information about an obstacle around the vehicle, for example, information about a distance and an angle between the vehicle and a pillar, a road edge, a road verge, or a traffic cone around the vehicle.

For example, the parking area information includes but is not limited to information such as a type of a parking area around the vehicle, a size of the parking area, a position of the parking area, and an idle status of the parking area.

S320: Determine a parking mode based on a pose of the vehicle and/or a driving behavior of a driver, where the parking mode may indicate that the vehicle is currently pulled in a parking area or pulled out of a parking area.

For example, it may be determined, based on one or more of the following conditions, that the parking mode is pulling in the parking area:

(1) The vehicle can identify a parking space, but the vehicle is not in the parking space or is not completely pulled in the parking space.

(2) The vehicle switches from a state in which the vehicle is not in a parking space to a state in which the vehicle enters one or more parking spaces (for example, in a process of manually pulling in a parking space, the user does not pull the vehicle in the parking space through a plurality of gear changes).

(3) The vehicle switches from a state in which the vehicle is not in a parking space to a state in which the vehicle is pulled in the parking space, but the vehicle is not parked in the middle of the parking space (for example, in a time period before the vehicle is not parked in the middle of the parking space, the vehicle detects an operation that the user manually pulls the vehicle in the parking space).

(4) Before the parking mode is determined, the vehicle detects that the vehicle enters an automatic pulling-in mode, and actively or passively exits the automatic pulling-in mode when the vehicle is not pulled in a parking space.

The foregoing gear change may be a process in which the user drives the vehicle to pull in a parking area from a current position of the vehicle. For example, in a process in which the user pulls the vehicle in a specific parking area by switching to the R gear, if the user may directly pull the vehicle in the parking area in the R gear, it may indicate that the user can complete parking through one gear change. If the user cannot directly pull the vehicle in the parking area by switching to the R gear, and the user further needs to switch from the R gear to the D gear and drive the vehicle for a distance, and then switch from the D gear to the R gear to pull the vehicle in the parking area, it may indicate that the user completes parking through two gear changes. By analogy, a larger number of times that the user switches between the D gear and the R gear indicates a larger number of gear changes performed by the user.

In an embodiment, when the one or more of the foregoing conditions are met and a speed of the vehicle is less than or equal to a preset speed threshold, it may be determined that the parking mode is pulling in the parking area.

For example, it may be determined, based on one or more of the following conditions, that the parking mode is pulling out of the parking area:

(1) The vehicle can identify a parking space, and the vehicle is in the parking space and parks in the middle of the parking space.

(2) When the vehicle is powered on and started for the first time, the vehicle can identify a parking space and the vehicle is in the parking space.

(3) Before the parking mode is determined, the vehicle detects that the vehicle enters an automatic pulling-out mode, and the vehicle actively or passively exits the automatic pulling-out mode when the vehicle is not pulled out of a parking space.

(4) A vehicle body is in a parking space, and the vehicle detects that the vehicle body does not completely leave the parking space after the user drives the vehicle for one or more times.

S330; Determine a recommended parking area based on the pose of the vehicle and/or the driving behavior of the driver.

In an embodiment, in a pulling-in state, the recommended parking area may be a recommended pulling-in parking space (for example, a ground parking space or a spatial parking space); and in a pulling-out state, the recommended parking area may be a pulling-out direction and a virtual area in which a corresponding vehicle stops.

In an embodiment, for example, a driving area is on the left side of the vehicle. The recommended parking area may be a parking space with a shortest distance from a line-of-sight direction of the driver to the right side of a vehicle forward direction. If there is a recommended parking area on the right side of the vehicle forward direction, the parking area on the right side is preferentially recommended. If there is no recommended parking area on the right side of the vehicle forward direction, a vacant parking space on the left side is recommended.

FIG. 4(*a*) to FIG. 4(*d*) show a group of graphical user interfaces (GUIs) according to an embodiment of this application.

As shown in FIG. 4(*a*), when a vehicle travels to a position near parking spaces, an inverse perspective mapping (IPM) image 401 and a rear-view image 402 may be displayed by using a display. The IPM image includes information about the current vehicle and information about the parking spaces around the vehicle. When the vehicle detects that a current speed of the vehicle is less than or equal to a preset speed threshold (for example, 5 km/h), the vehicle may display, by using the display, a GUI shown in FIG. 4(*b*).

As shown in FIG. 4(*b*), the vehicle may display a recommended parking area by using the display.

As shown in FIG. 4(*c*), when displaying the recommended parking area by using the display, the vehicle may further display prompt information "A parking area is recommended, whether to perform automatic parking" for prompting a user to enter an automatic parking mode, an "Automatic parking" control 403, a "Remote parking" control 404, a "Switching parking area" control 405, and a "Cancel" control 406.

In an embodiment, for example, a driving area is on the left side of the vehicle. When a driver manually pulls in a parking space, a pose, a rear wheel steering, and surrounding available pulling-in parking space information (including a number of available pulling-in parking spaces, a parking space type, a surrounding obstacle, and the like) of the vehicle are obtained. If all surrounding vehicles are pulled in from the vehicle rear, a probability that the current vehicle is pulled in from the vehicle rear is; (number of vehicles pulled in from the vehicle rear/total number of parking spaces)*100%.

In an embodiment, the vehicle may prompt the user with a parking space with a highest recommendation degree based on recommendation degrees of a plurality of available pulling-in parking spaces.

For example, when the vehicle detects that the driver switches to the R gear, the vehicle identifies all vacant parking spaces available for parking in a current parking area, and calculates a recommendation degree C(x) of each available pulling-in parking space.

For example, the recommendation degree C(x) of the available pulling-in parking space is calculated as follows:

(1) Obtain pose information of the current vehicle and parking space information.

FIG. 4(*d*) is a schematic diagram of a relationship between pose information of the vehicle and parking space information in a vertical parking space. A center of a wheel rear axle of the vehicle is a coordinate origin O, and a midpoint of an outermost parking space line in an opening direction of each vacant parking space is selected (for example, a midpoint of an outermost parking space line in an opening direction of a parking space 1 is P). A relative distance between the coordinate origin O and the parking space midpoint is set to D (when the vehicle is outside the parking space. D is positive; or when the vehicle is inside the parking space. D is negative). As shown in FIG. 4(*d*), a distance between the coordinate origin O and the point P is $D_1$. Correspondingly, it may be determined that an angle between PO and a direction of the wheel rear axle is $\theta_1$. In a parking process, because the vehicle continuously moves, the distance $D_1$ and the angle $\theta_1$ continuously change. In this way, a pose and a relative distance between the vehicle and each parking space in an actual scenario are determined.

For example, Table 1 shows a correspondence between $D_1$ and a recommendation degree.

TABLE 1

| $D_1$ | Recommendation degree $C(D_1)$ |
|---|---|
| $D_1 \leq 2$ m | 100% |
| 2 m < $D_1 \leq 3$ m | 50% |
| $D_1 > 3$ m | 20% |
| . . . | . . . |

It should be understood that the foregoing correspondence between $D_1$ and a recommendation degree is only an example. The correspondence between $D_1$ and a recommendation degree may alternatively be represented by using another value or function relationship. This is not limited in embodiments of this application.

For example, Table 2 shows a correspondence between $\theta_1$ and a recommendation degree.

TABLE 2

| $\theta_1$ | Recommendation degree $C(\theta_1)$ |
|---|---|
| $30° \leq \theta_1 \leq 60°$ | 100% |
| $60° < \theta_1 \leq 90°$ | 50% |
| $\theta_1 > 90°$ | 20% |

It should be understood that the foregoing correspondence between $\theta_1$ and a recommendation degree is only an example. The correspondence between $\theta_1$ and a recommendation degree may alternatively be represented by using another value or function relationship. This is not limited in embodiments of this application.

It should be further understood that a value of $\theta_1$ being positive indicates that deflection from the direction of the wheel rear axle to a direction of PO is clockwise deflection.

(2) Obtain a steering direction of an inner steering wheel or an outer steering wheel of the vehicle based on steering information of a steering wheel.

As shown in FIG. 4(*d*), a rear wheel steering angle $\theta_2$ of the vehicle may be an included angle between the steering direction of the inner steering wheel and a direction of the outermost parking space line in the parking space opening direction.

For example, Table 3 shows a correspondence between $\theta_2$ and a recommendation degree.

TABLE 3

| $\theta_2$ | Recommendation degree $C(\theta_2)$ |
|---|---|
| If the steering direction of the inner steering wheel intersects with the outermost parking space line in the opening direction of the parking space, and $20° \leq \theta_2 \leq 40°$ | 100% |
| If the steering direction of the inner steering wheel does not intersect with the outermost parking space line in the opening direction of the parking space, and $20° \leq \theta_2 \leq 40°$ | 50% |
| . . . | . . . |

It should be understood that the foregoing correspondence between $\theta_2$ and a recommendation degree is only an example. The correspondence between $\theta_2$ and a recommendation degree may alternatively be represented by using another value or function relationship. This is not limited in embodiments of this application.

It should be further understood that a value of $\theta_2$ being positive indicates that deflection from the steering direction of the steering wheel to the direction of the outermost parking space line in the opening direction of the parking space is clockwise deflection.

For example, the recommendation degree of the parking space may be calculated by configuring weights of the relative distance $D_1$, the ego-vehicle pose angle $\theta_1$, and the wheel steering angle $\theta_2$. For example, the weights of the relative distance $D_1$, the ego-vehicle pose angle $\theta_1$, and the wheel steering angle $\theta_2$ are 50%, 20%, and 30% respectively, and a recommendation degree of each pulling-out area is 50%*C $D_1$)+20%*C($\theta_1$)+30% C ($\theta_2$). After the recommendation degree of each parking area is calculated, a parking area with a highest recommendation degree may be prompted to the user.

It should be understood that the weights of the foregoing parameters are only examples, and this is not limited in embodiments of this application.

It should be further understood that the recommendation degree of the parking area is determined by using the three parameters $D_1$, $\theta_1$, and $\theta_2$. This is not limited in embodiments of this application. For example, the recommendation degree of the parking area may alternatively be determined by using any one or any two of the three parameters $D_1$, $\theta_1$, and $\theta_2$.

The foregoing determines a recommendation degree of a parking area based on a correspondence between each parameter and a recommendation degree and a weight of each parameter. In this embodiment of this application, a manner of calculating the recommendation degree C(x) may be further determined by collecting a training sample (for example, a recommendation degree of each parking area and parameter information corresponding to each parking area that are determined by the user in a manual parking process).

For example, a process of collecting the training sample may be as follows; When the driver drives the vehicle to arrive near the parking area, a plurality of parking areas (for example, a parking space 1, a parking space 2, a parking space 3, and a parking space 4) are found. In this case, the driver may prioritize the plurality of parking areas based on an environment. The driver may determine that priorities of the plurality of parking areas in descending order are the parking space 1, the parking space 2, the parking space 3, and the parking space 4.

In this case, the relative position relationship between the vehicle and each parking space and the driving behavior of the driver in this case may be separately recorded, to obtain parameter information corresponding to each parking space. Table 4 shows a correspondence among a parking space identifier, a recommendation degree of a parking space, and parameter information of a parking space.

TABLE 4

| Parking space identifier | Recommendation degree of aparking space | Parameter information of a parking space |
|---|---|---|
| Parking space 1 | [100%, 90%] | ($D1$, $\theta_1$, $\theta_2$) |
| Parking space 2 | [90%, 50%] | ($D2$, $\theta_3$, $\theta_4$) |
| Parking space 3 | [50%, 20%] | ($D3$, $\theta_5$, $\theta_6$) |
| Parking space 4 | [20%, 0%] | ($D4$, $\theta_7$, $\theta_8$) |
| ... | ... | ... |

It should be understood that, for a calculation process of ($D_2$, $\theta_3$, $\theta_4$), ($D_3$, $\theta_5$, $\theta_6$), and ($D_4$, $\theta_7$, $\theta_8$), refer to the foregoing calculation process of $D_1$, $\theta_1$, and $\theta_2$. Details are not described herein again.

Based on a linear regression model and a principle, N training samples are given, and optimal parameters $\alpha_1$, $\alpha_2$, $\alpha_3$, and b are found, so that the model can better fit these training samples. Normalize each parameter to obtain the recommend degree of the parking space.

$$C(x): C(x) = \alpha_1 x_1 + \alpha_2 x_2 + \alpha_3 x_3 + b$$

In addition, a prediction error J ($\alpha_1$) of the parking area may be measured by using a cost function, which may be expressed as;

$$J(\alpha_1) = \frac{1}{2\text{ m}} \sum_{i=1}^{m} (f(x_1) - y_1)^2$$

$f(x_1)$ is a predicted value, and $y_1$ is a real value. A coefficient ai may be obtained according to a least square method (similarly, $\alpha_2$ and $\alpha_3$ may be obtained). Based on this, the formula C(x) may be determined, so that the recommendation degree of the parking space may be calculated. To be specific, when the vehicle is in any pose, the vehicle may calculate a recommendation degree of an identified available pulling-in parking space in the R gear, and prompt the driver with a parking area with a highest recommendation degree; or may alternatively prompt the driver with a recommendation degree for each available pulling-in parking space.

Correspondingly, if the vehicle is pulled in from the vehicle front, the coordinate origin may be determined as a middle point of front wheels of the vehicle, and a parking space with the highest recommendation degree under the D gear is calculated. Correspondingly, the recommendation degree of the parallel parking space and the oblique parking space may be determined in the foregoing manner, to recommend the target parking area.

Figure 5:
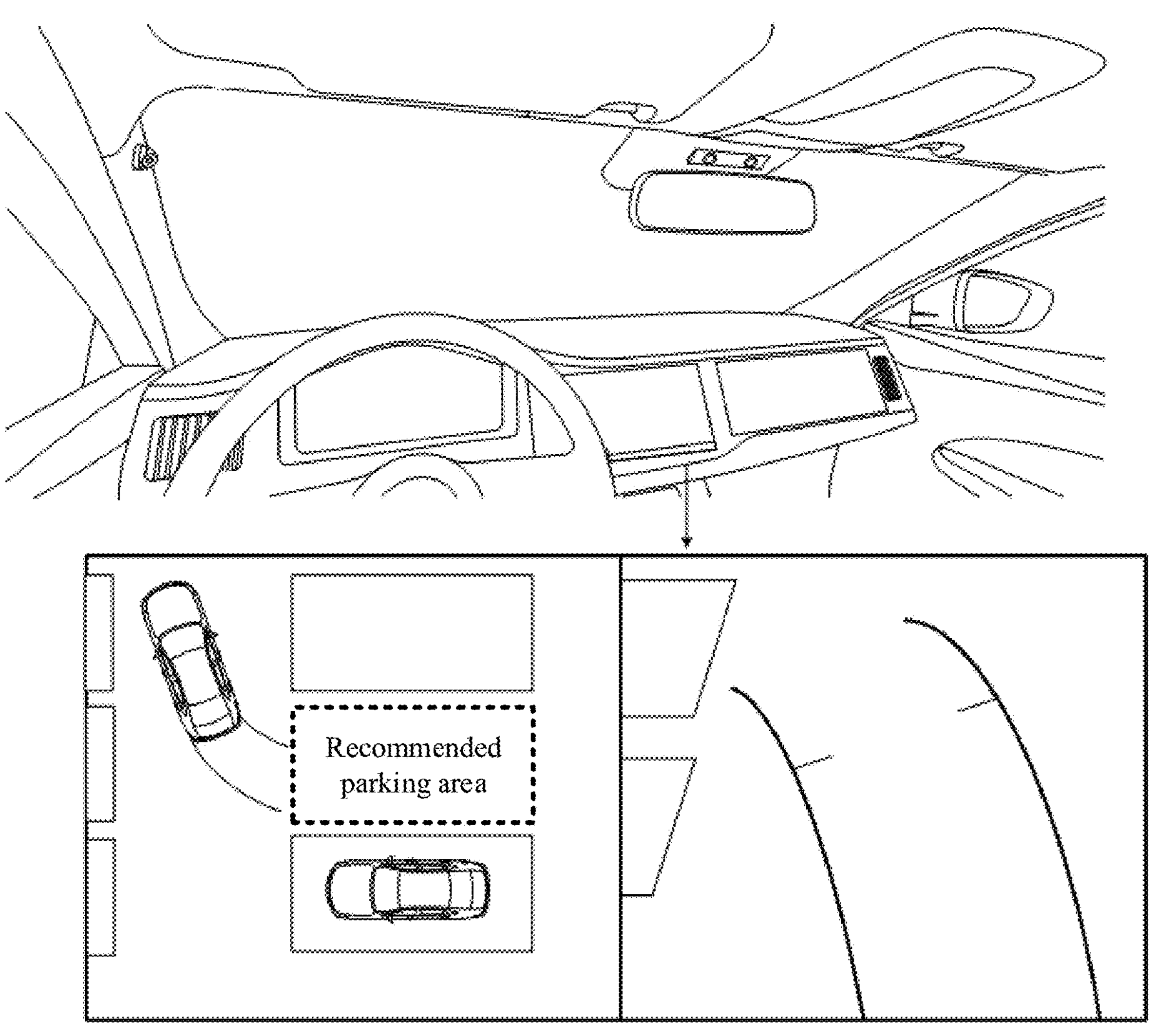
FIG. 5 shows another GUI according to an embodiment of this application.

FIG. 5 shows another GUI according to an embodiment of this application. As shown in FIG. 5, the vehicle may display a recommended parking area (the recommended parking area is displayed by using a dashed line) by using a display based on a relative position relationship between the vehicle and each of the plurality of parking areas and a driving behavior of the user.

Figure 6:
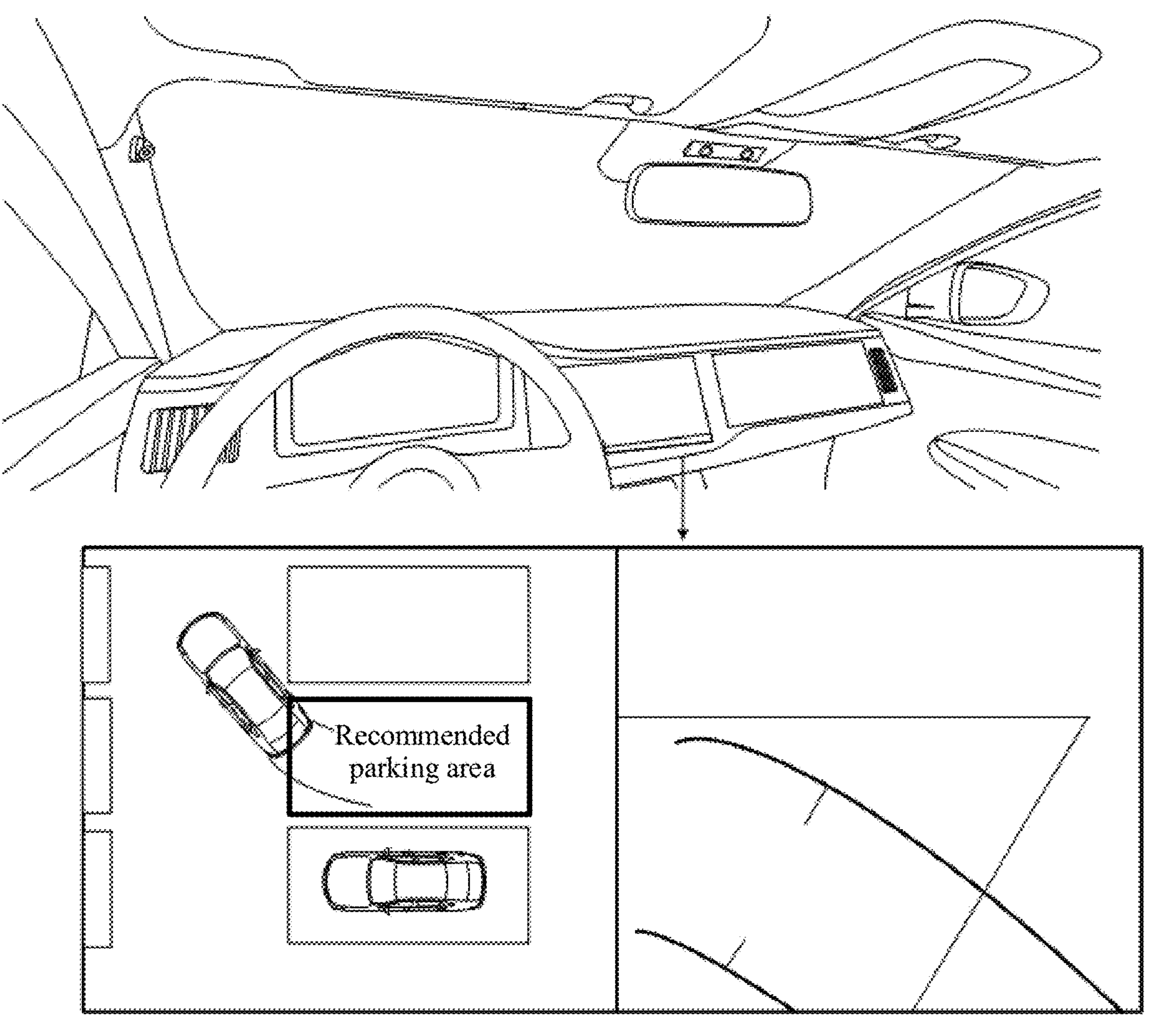
FIG. 6 shows another GUI according to an embodiment of this application.

In an embodiment, when the user repeatedly performs gear changes, when the vehicle detects that the user switches between the D gear and the R gear, the vehicle may recommend both a parking area on a vehicle front side and a parking area on a vehicle rear side. FIG. 6 shows another GUI according to an embodiment of this application. As shown in FIG. 6, when a part of the vehicle has entered the recommended parking area, the vehicle may target the recommended parking area (the recommended parking area is displayed by a thick solid line).

Figure 7:
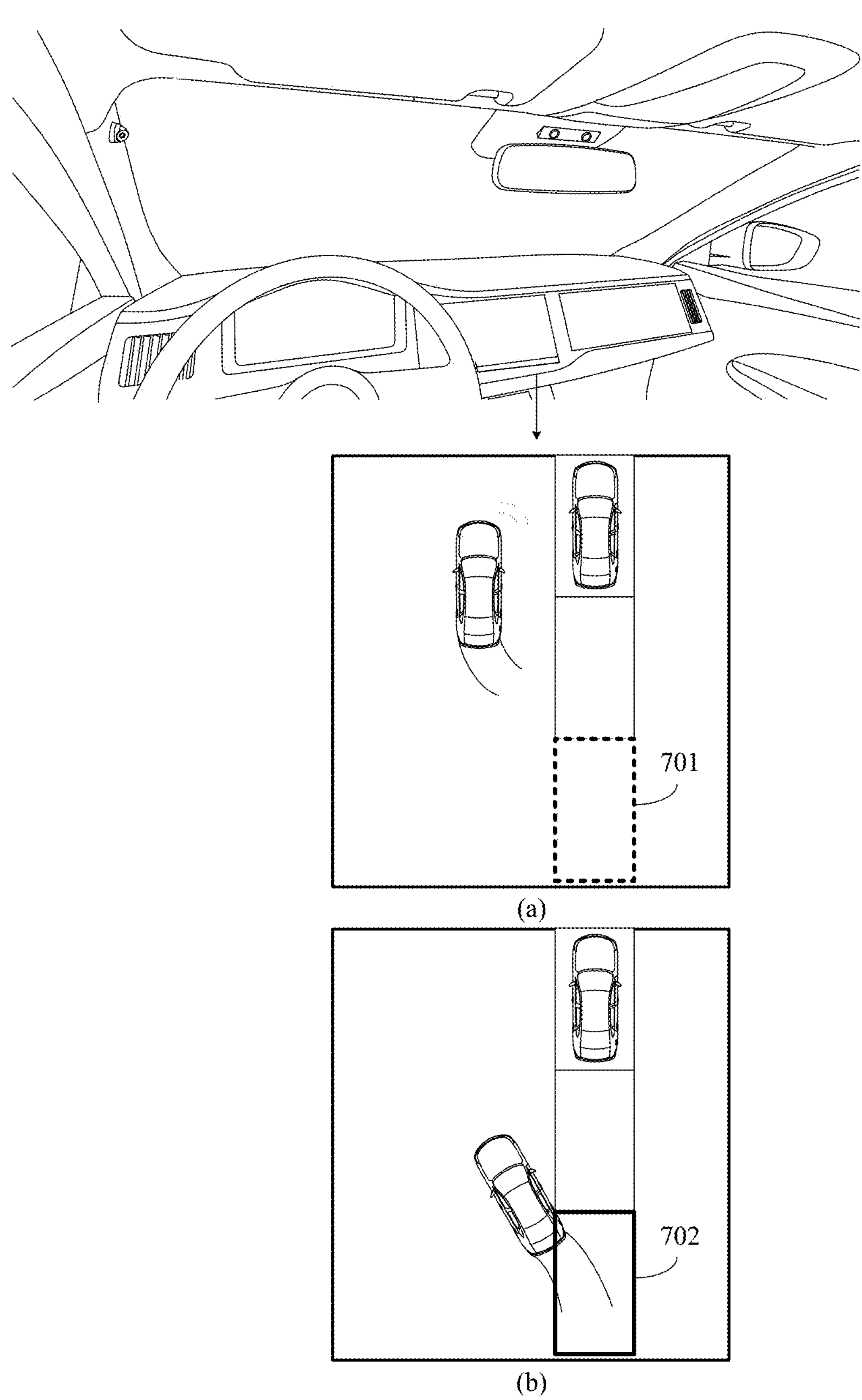
FIG. 7 shows another group of GUIs according to an embodiment of this application.

FIG. 7 shows another group of GUIs according to an embodiment of this application.

As shown in (a) in FIG. 7, when the vehicle is pulled in a parallel parking space in a manner of pulling-in from a vehicle rear, the vehicle may display a recommended parking area (a dashed box 701 shown in (a) in FIG. 7) by using a display based on a vehicle body steering direction and a relative position relationship between the vehicle and the parking space. When a part of the vehicle has entered the recommended parking area (for example, a distance between any position of the vehicle body and the recommended parking area is less than or equal to 30 cm) or the vehicle has entered the recommended parking area, the vehicle may target the recommended parking area (a solid box 702 shown in (b) in FIG. 7) by using the display.

Figure 8:
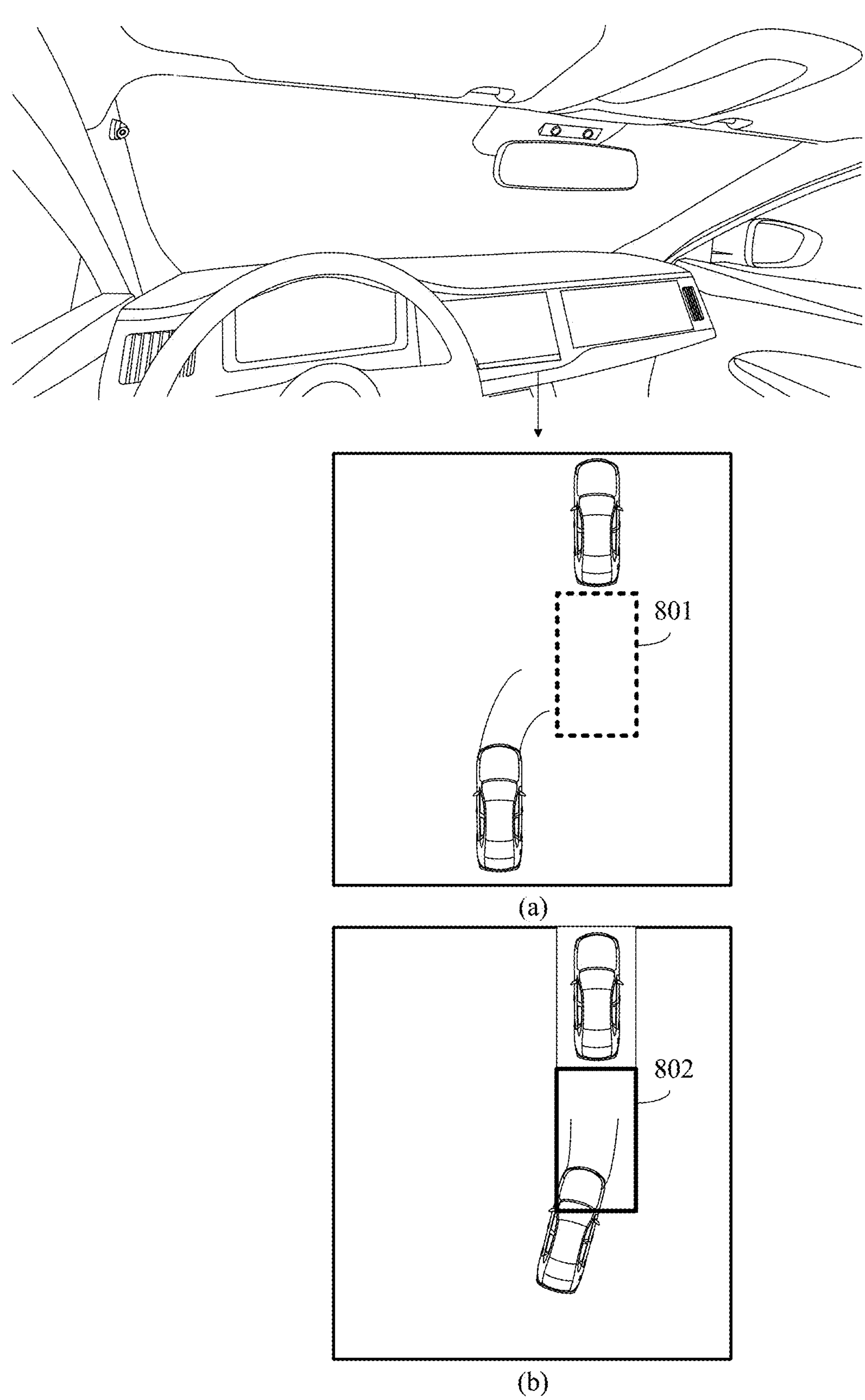
FIG. 8 shows another group of GUIs according to an embodiment of this application.

FIG. 8 shows another group of GUIs according to an embodiment of this application.

As shown in (a) in FIG. 8, when the vehicle is pulled in a parallel parking space in a manner of pulling-in from a vehicle front, the vehicle may display a recommended parking area (a dashed box 801 shown in (a) in FIG. 8) by using a display based on a vehicle body steering direction and a position relationship between the vehicle and the parking space. When a part of the vehicle has entered the recommended parking area (for example, a distance between any position of the vehicle body and the recommended parking area is less than or equal to 30 cm) or the vehicle has entered the recommended parking area, the vehicle may target the recommended parking area (a solid box 802 shown in (b) in FIG. 8) by using the display.

In an embodiment, when the vehicle detects that the vehicle enters a parking space or a frequency at which the vehicle enters a parking space within a preset time is greater than or equal to a preset frequency, the vehicle may determine the parking space as the recommended parking area.

In an embodiment, if the user has selected a target parking area during the previous automatic parking, and the vehicle is not pulled in or exits in the pulling-in process, in this case, the vehicle may determine, by default, the target parking area selected last time as the recommended parking area.

In an embodiment, when the vehicle detects that the driver parks the vehicle out of a vertical parking space and an oblique parking space, if the vehicle is pulled out from the vehicle front, the parking direction may be determined based on steering wheel steering and vehicle body steering when the driver switches to the D gear. If the vehicle is parked out from the vehicle rear, the parking direction may be determined based on steering wheel steering and vehicle body steering when the driver switches to the R gear. When the vehicle detects that the vehicle driven by the driver is pulled out of the parallel parking space, the vehicle may determine that a front direction of the vehicle front is the pulling-out direction.

Figure 9:
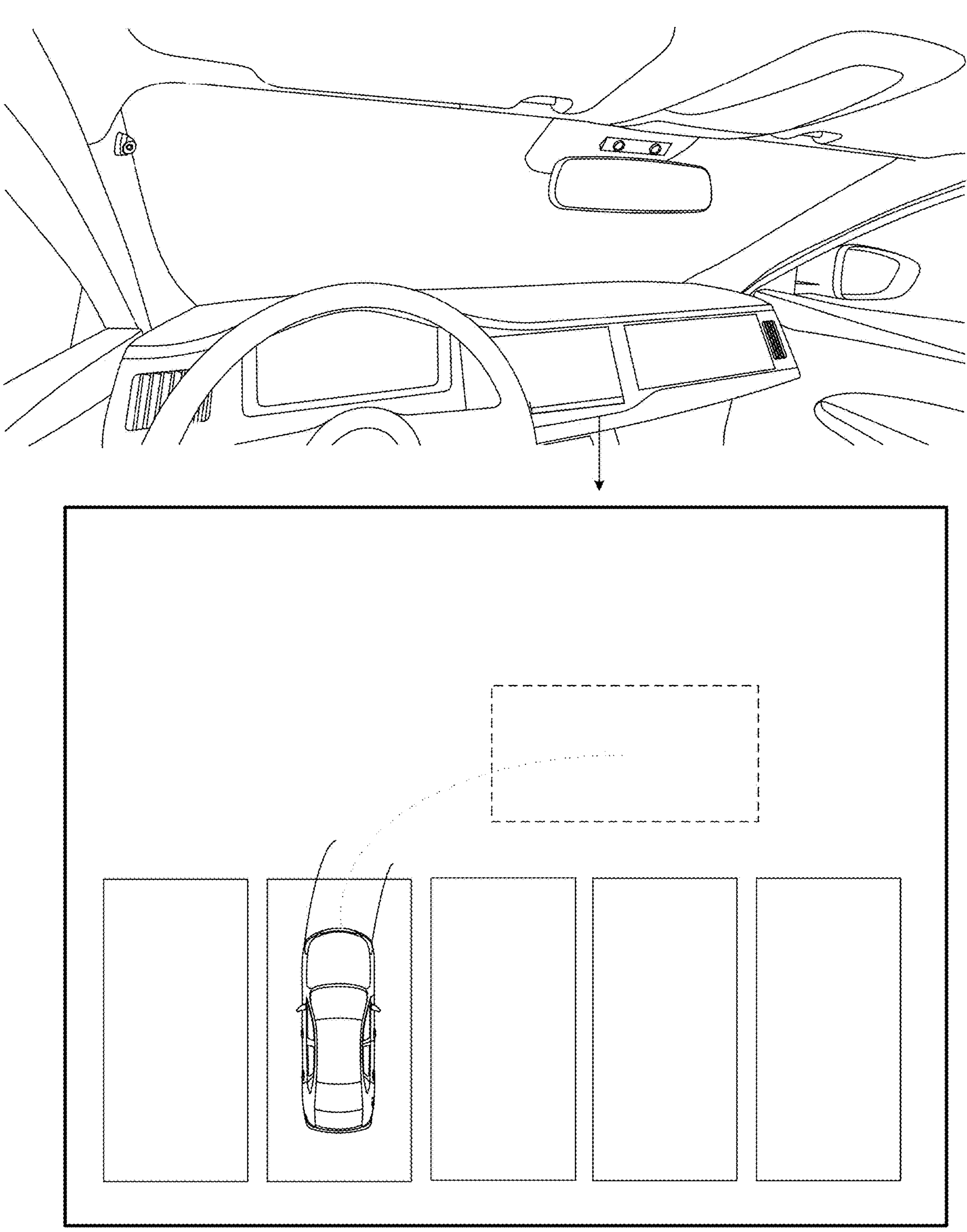
FIG. 9 shows another group of GUIs according to an embodiment of this application.

FIG. 9 show another group of GUIs according to an embodiment of this application. As shown in FIG. 9, when the vehicle is pulled out of a vertical parking space in a manner of pulling-out from a vehicle front, the vehicle may display a parking direction and a parking area (as shown by a dashed box in FIG. 9) by using a display based on a steering wheel direction of the driver when the driver switches to the D gear.

S340; Determine a parking-related parameter.

In an embodiment, after a parking mode and a recommended parking area (or a pulling-out direction) are determined, the vehicle may plan information such as a parking path $L_1$, a quantity $N_1$ of gear changes, and parking duration $T_1$.

S350; Determine, based on the parking-related parameter, whether it is difficult for the driver to perform parking.

In an embodiment, if it is determined in S320 that the parking mode is that the vehicle is currently pulled in a parking space, when one or more of the following parking conditions are met, the vehicle may determine that it is difficult for the current driver to pull in, so that an automatic parking control is displayed on the display, and the user is prompted and guided to perform the automatic parking;

(1) A parking duration $T_2$ of the driver is greater than or equal to the planned parking duration $T_1$.

(2) A quantity $N_2$ of gear changes is greater than or equal to the planned quantity $N_1$ of gear changes.

(3) A total parking path $L_2$ is greater than or equal to the planned parking path $L_1$, or an actual parking path of the driver deviates from the planned path of the vehicle and a deviation distance is not within a preset range $[D_1, D_2]$.

(4) A target parking space is a narrow parking space (a distance between any position and an obstacle is less than 30 cm).

In an embodiment, when the parking-related parameter is determined in S340, the vehicle may also directly prompt the user to use an automatic parking function to perform parking.

S360: If it is difficult for the driver to perform parking, prompt the user to use the automatic parking function.

Figure 10:
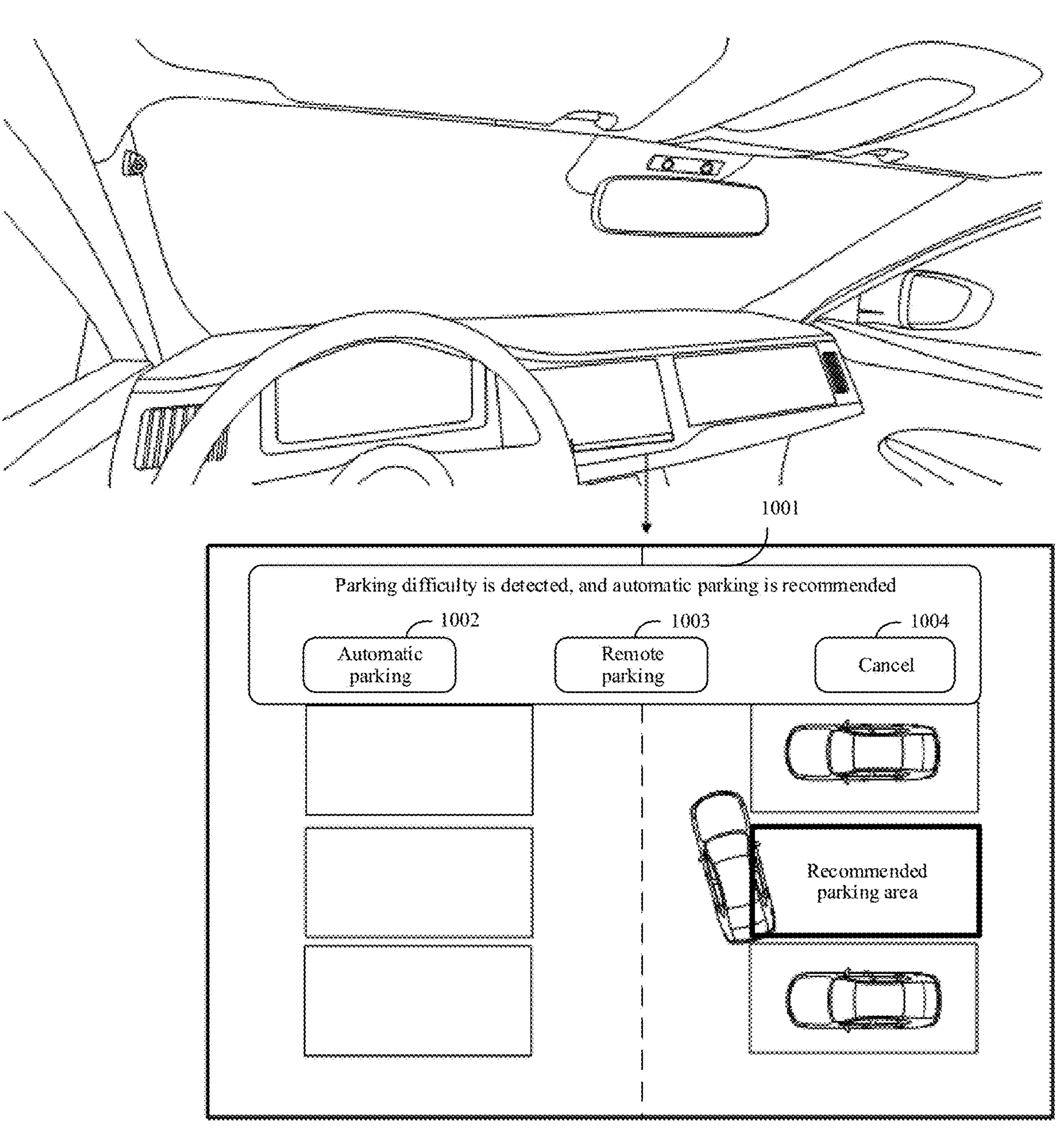
FIG. 10 shows another GUI according to an embodiment of this application.

FIG. 10 shows another GUI according to an embodiment of this application. As shown in FIG. 10, when the vehicle detects that it is difficult for the driver to park, the vehicle may display a prompt box 1001. The prompt box 1001 includes prompt information "Parking difficulty is detected, and automatic parking is recommended", an "Automatic parking" control 1002, a "Remote parking" control 1003, and a "Cancel" control 1004. When the vehicle detects an operation of tapping the "Automatic parking" control 1002 by the user, the vehicle may plan a parking path based on a current pose of the vehicle and a relative position relationship between the current pose of the vehicle and a recommended parking area, to pull the vehicle in the recommended parking area based on a planned parking path. When the vehicle detects an operation of tapping the "Remote parking" control 1003 by the user, the vehicle may be pulled in the recommended parking area based on a parking instruction from a vehicle key or another terminal (for example, a mobile phone).

After detecting that the driver enables the automatic parking function, the vehicle obtains the current gear information, and plans a trajectory to reach the recommended parking area by using the current pose as a start point, so that the vehicle can be automatically pulled in or out of the parking space.

S370; If it is not difficult for the driver to park the vehicle, perform parking the vehicle based on an operation of the driver.

For example, when the parking duration $T_2$ of the driver is less than the planned parking duration $T_1$, the quantity $N_2$ of gear changes is less than the planned quantity $N_1$ of gear changes, and the total parking path $L_2$ is less than the planned parking path $L_1$, the vehicle may not prompt the user to use the automatic parking function. The vehicle may be parked based on an operation of the driver.

In an embodiment, when detecting that the user completes parking, the vehicle may learn of an operation (for example, a path and a speed during manual parking) performed by the driver during parking, to optimize an automatic parking manner. For example, a default speed of automatic parking is $v_1$, and an average speed of the vehicle controlled by the driver during manual parking for a plurality of times is $v_2$. The vehicle may update the default speed of automatic parking from $v_1$ to $v_2$. For another example, in an automatic parking process, the vehicle is in a middle position in the parking area by default. During manual parking for a plurality of times, the user controls the vehicle to be in a left position in the parking area. In this case, the vehicle may update the position of the vehicle in the parking area in the automatic parking process from the middle position to the left position.

In an embodiment, in a manual parking process or an automatic parking process, if the vehicle determines that the recommended parking area is a narrow parking space, the vehicle may prompt the user to use a remote parking function to park the vehicle.

In this embodiment of this application, the parking mode and the parking area are more accurately recommended based on the relative position relationship between the vehicle and the parking area and the driving behavior of the driver, to help the driver park the vehicle. When it is detected that the driver has difficulty in parking, the driver may be further prompted to select the automatic parking function. In this way, a manual parking capability and an automatic parking capability complement each other, to help the driver smoothly switch from the manual parking capability to the automatic parking capability. This helps improve parking efficiency of the driver, and also helps reduce parking difficulty of the driver.

Figure 11:
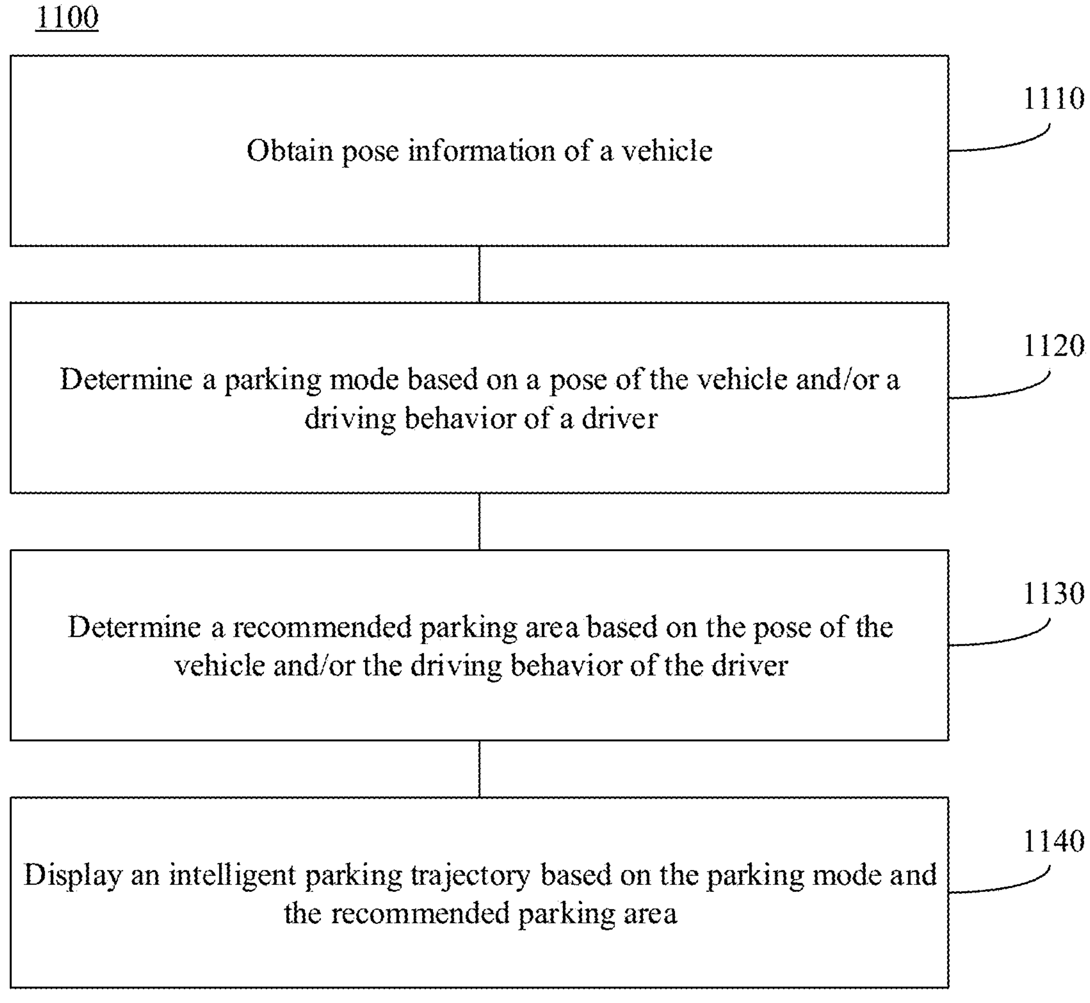
FIG. 11 is a schematic flowchart of a parking method according to an embodiment of this application.

FIG. 11 is a schematic flowchart of a parking method 1100 according to an embodiment of this application. As shown in FIG. 11, the method 1100 includes the following steps.

S1110: Obtain pose information of a vehicle.

S1120: Determine a parking mode based on a pose of the vehicle and/or a driving behavior of a driver, where the parking mode may indicate that the vehicle is currently pulled in a parking space or pulled out of a parking space.

S1130: Determine a recommended parking area based on the pose of the vehicle and/or the driving behavior of the driver.

It should be understood that, for S1110 to S1130, refer to the foregoing descriptions of S310 to S330. For brevity, details are not described herein again.

S1140: Display an intelligent parking trajectory based on the parking mode and the recommended parking area.

In an embodiment, the vehicle may plan an automatic parking path based on the parking mode and the recommended parking area, and the vehicle may convert the automatic parking path into a corresponding wheel steering angle, driving distance, vehicle body coverage area, or the like. It should be understood that the intelligent parking trajectory may be determined by parameters such as the wheel steering angle, the driving distance, and the vehicle body coverage area.

In an embodiment, when the vehicle detects an operation of opening the intelligent parking trajectory by a user, the vehicle may display the intelligent parking trajectory by using a display.

In an embodiment, the vehicle may also automatically display the intelligent parking trajectory based on the driving behavior of the driver.

For example, a trigger condition for automatically displaying the intelligent parking trajectory by the vehicle may include one or more of the following conditions;

(1) The vehicle predicts, based on a current steering angle and a driving speed, that the vehicle collides with a surrounding obstacle or a vehicle.

(2) When pulling in the parking space, the vehicle predicts, based on the current steering angle, that the vehicle cannot be parked in the middle of the parking space after the vehicle is pulled in the parking space, or cannot be pulled in the parking space.

After the intelligent parking trajectory is displayed by the vehicle, the driver can view the planned driving path, a recommended gear, wheel steering, and a driving distance in an IPM image and a rear view image. The driver can drive the vehicle based on the recommended trajectory to ensure safe parking.

Figure 12A:
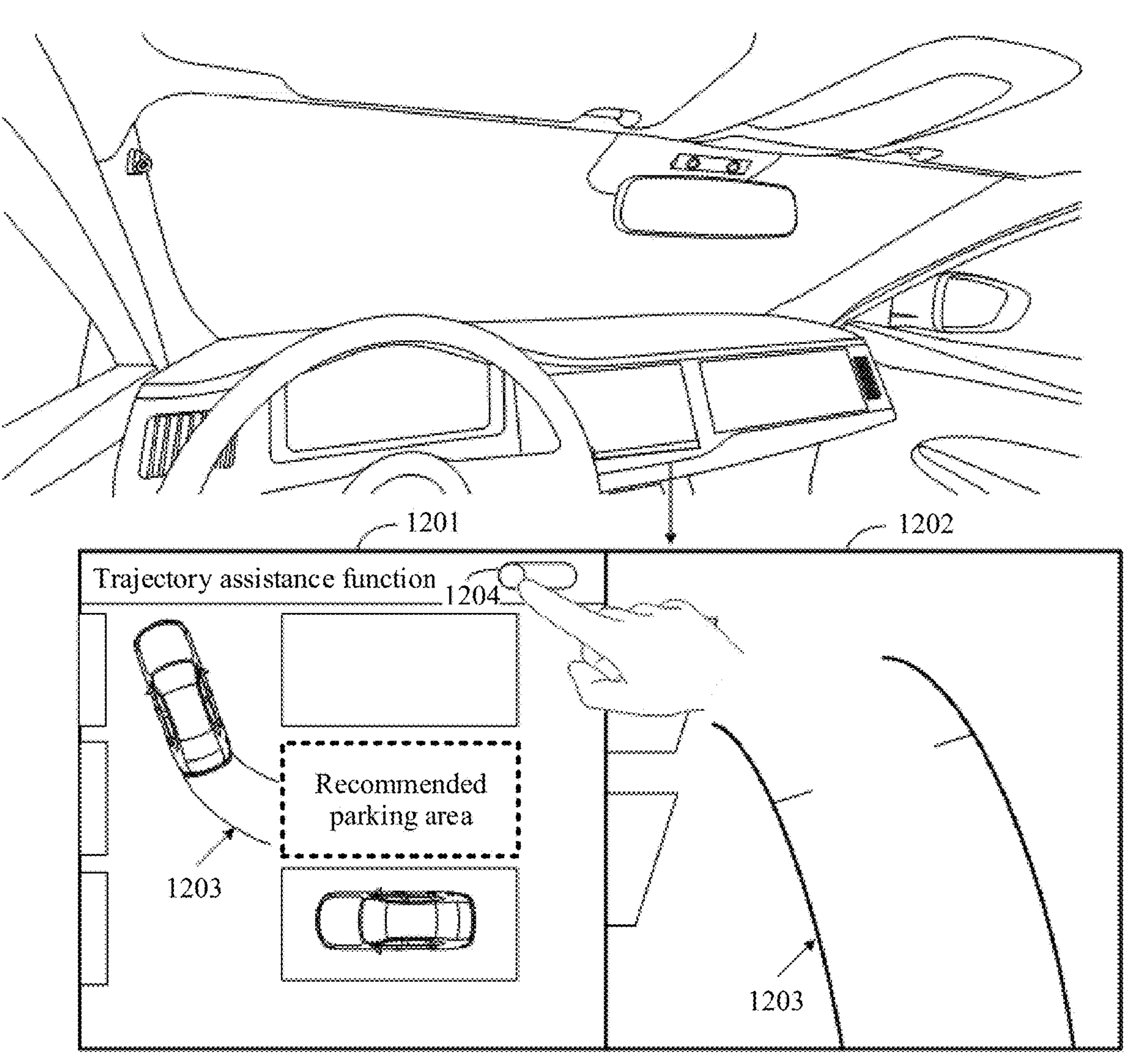
FIG. 12(*a*) and FIG. 12(*b*) show another group of GUIs according to an embodiment of this application.
Figure 12B:
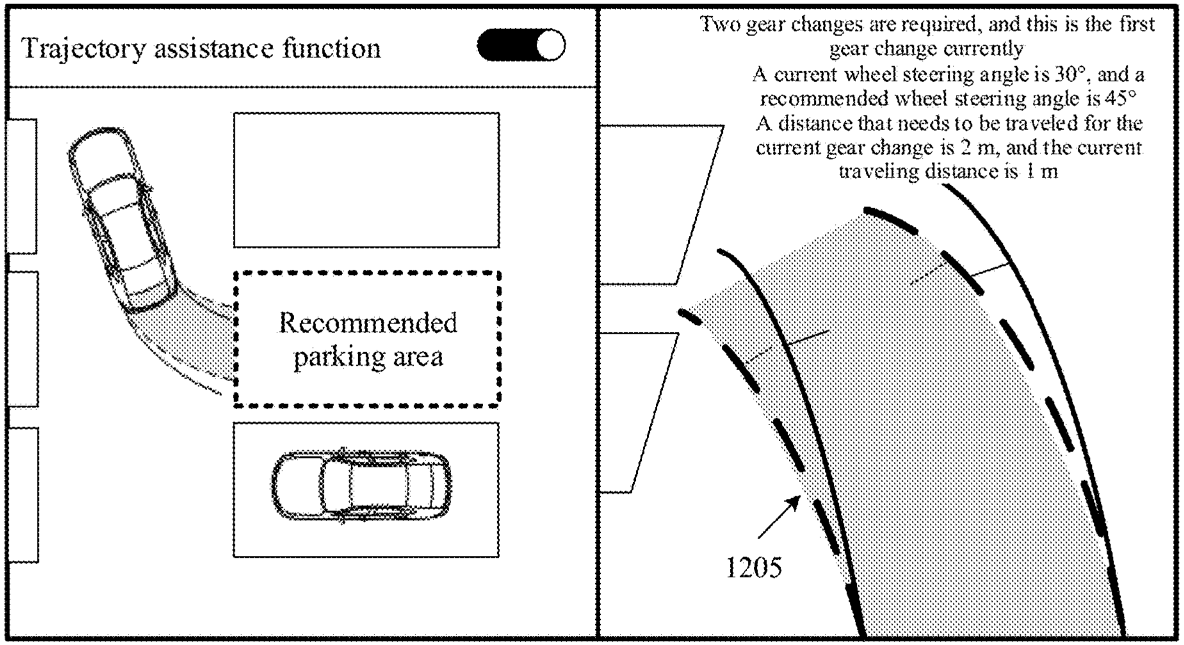

FIG. 12(*a*) and FIG. 12(*b*) show another group of GUIs according to an embodiment of this application.

As shown in FIG. 12(*a*), a vehicle may display an IPM image 1201 and a rear-view image 1202 by using a display. A dynamic prediction trajectory 1203 of the vehicle is separately displayed in the IPM image 1201 and the rear-view image 1202. The dynamic prediction trajectory 1203 of the vehicle may be determined based on a driving behavior of a driver (for example, the driver controls a rotation angle of a steering wheel). When the vehicle detects an operation of enabling a trajectory assistance function 1204 by the user, the vehicle may display, by using the display, a GUI shown in FIG. 12(*b*).

As shown in FIG. 12(*b*), the vehicle may separately display an intelligent parking trajectory in the IPM image and the rear-view image. For example, in the rear-view image, a black solid line indicates the dynamic prediction trajectory 1203 of the vehicle, and a black dashed line indicates an intelligent parking trajectory 1205. The rear-view image further includes information indicating a number of gear changes required for parking and a current number of gear changes (for example. "Two gear changes are required, and this is the first gear change currently"), information about a current wheel steering angle, and information about a recommended wheel steering angle (for example, "A current wheel steering angle is 30°, and a recommended wheel steering angle is 45°"), information about a distance that needs to be traveled for the current gear change, and information about a distance that has been traveled by the current vehicle (for example, "A distance that needs to be traveled for the current gear change is 2 m, and the current traveling distance is 1 m").

In the IPM image, the black solid line indicates the dynamic prediction trajectory of the vehicle, and the shadow area indicates a vehicle coverage area when the vehicle travels based on the intelligent parking trajectory.

Figure 13:
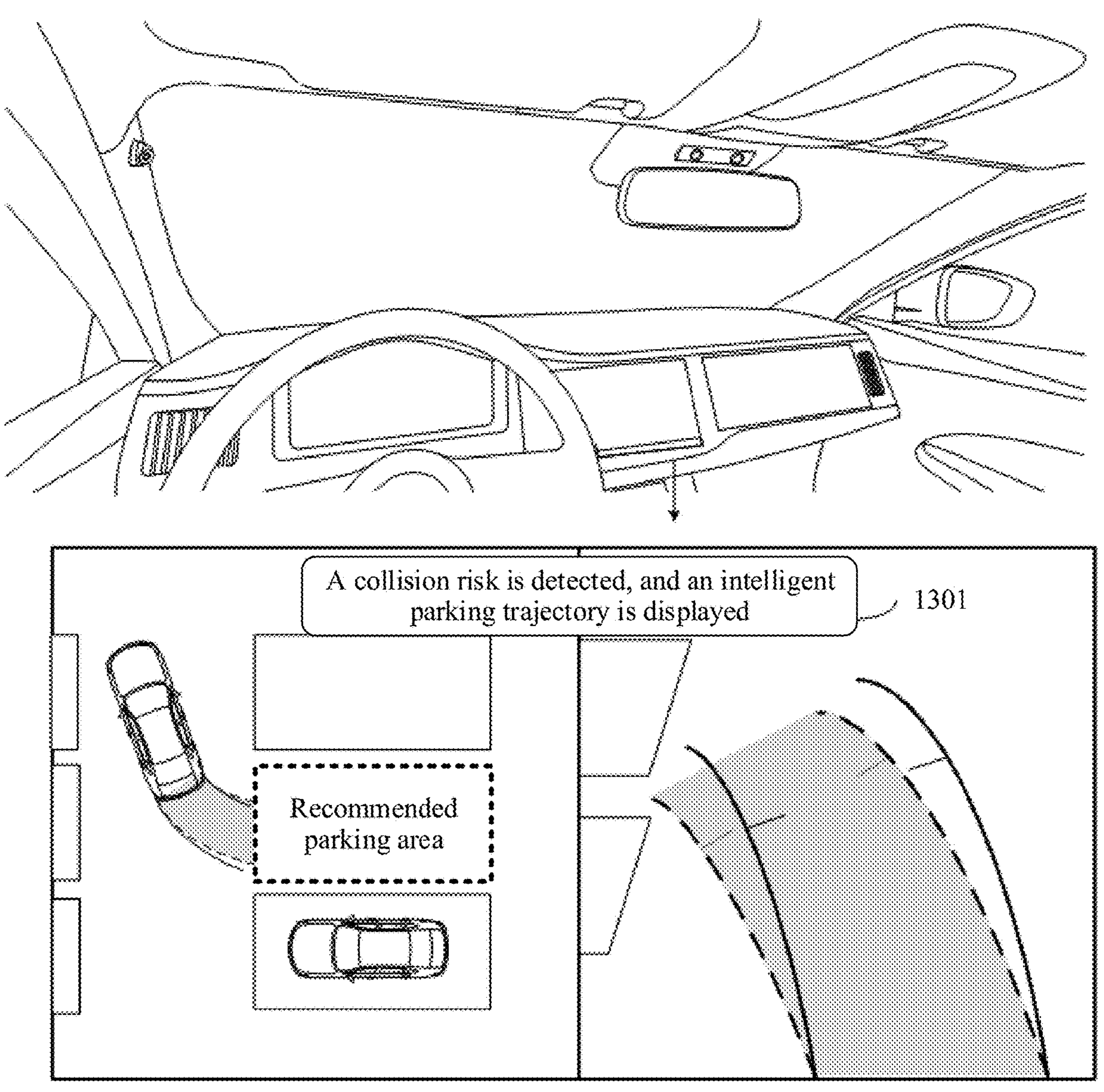
FIG. 13 shows another GUI according to an embodiment of this application.

FIG. 13 shows another GUI according to an embodiment of this application.

As shown in FIG. 13, when a vehicle detects, based on a driving behavior of a driver, that the vehicle cannot be pulled in or pulled out of a parking space, and the vehicle detects a collision risk or a pose of the vehicle is not right after the vehicle is pulled in the parking space, the vehicle may automatically display an intelligent parking trajectory. For example, when the vehicle detects the collision risk, prompt information 1301 "A collision risk is detected, and an intelligent parking trajectory is displayed" may be automatically displayed on a display, a dynamic prediction trajectory of the vehicle, and the intelligent parking trajectory. In this way, the driver can complete parking based on the intelligent parking trajectory.

In an embodiment, when the intelligent parking trajectory includes a plurality of segments of trajectories, the display may further display a number of gear changes, and a recommended trajectory and a recommended traveling distance during a current gear change.

In an embodiment, if the vehicle is in a recommended parking gear, the intelligent parking trajectory may be directly displayed by using the display; or if the vehicle is not in a recommended parking gear, the driver is prompted to switch to a correct gear.

When the driver parks the vehicle based on the intelligent parking trajectory or the vehicle performs automatic parking, the driver may observe a dynamic trajectory of the vehicle and the intelligent parking trajectory, and rotate a steering wheel in a braking or low-speed driving state, to align the dynamic trajectory of the vehicle with the intelligent parking trajectory. In an embodiment, when the dynamic trajectory of the vehicle is aligned with the intelligent parking trajectory, or when a degree of alignment between the dynamic trajectory of the vehicle and the intelligent parking trajectory is greater than or equal to a preset value, the vehicle may notify the user that the dynamic trajectory of the vehicle is aligned with the intelligent parking trajectory. For example, the vehicle may give a sound prompt by using a speaker, or notify the user that the dynamic trajectory of the vehicle is aligned with the intelligent parking trajectory by using a change of a color of an ambient light.

The intelligent parking trajectory can be divided into a plurality of segments of trajectories based on the number of gear changes. After a single segment of the trajectory ends, a next segment of a local trajectory guide path is automatically switched and displayed. The driver repeats the foregoing steps until the vehicle is pulled in or pulled out of the parking space. If a deviation between the actual driving trajectory of the vehicle and the intelligent parking trajectory exceeds a threshold, the vehicle may recalculate a parking path and update the intelligent parking trajectory.

In an embodiment, the intelligent parking trajectory may be determined by the vehicle after a recommended parking area is determined. If the recommended parking area is canceled, the vehicle may stop displaying the intelligent parking trajectory.

In an embodiment, if the vehicle cannot determine the intelligent parking trajectory based on a current parking intention and the recommended parking area, the vehicle may prompt the user to change the recommended parking area or check a surrounding environment.

In this embodiment of this application, in a scenario in which manual parking or automatic driving cannot be started, the intelligent parking trajectory may be planned based on the recommended parking area, and displayed by using an image, to assist a driver in obtaining a driving path by using a correct guidance, and control the vehicle to be pulled in or pulled out of a parking space.

The foregoing describes, with reference to FIG. 11 to FIG. 13, a technical solution of providing the intelligent parking trajectory during parking. The following describes, with reference to FIG. 14 and FIG. 15, a technical solution of providing a narrow-lane auxiliary function when a vehicle travels through a narrow road.

Figure 14:
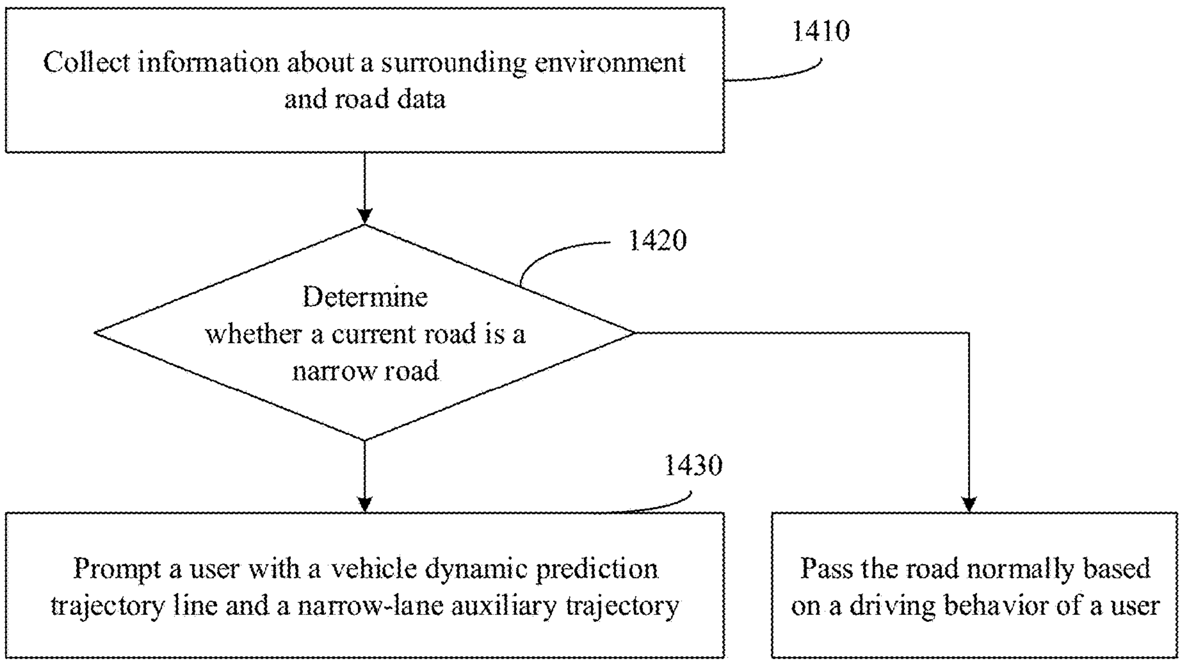
FIG. 14 is a schematic flowchart of a method for enabling a narrow-lane auxiliary function according to an embodiment of this application.

FIG. 14 is a schematic flowchart of a method 1400 for enabling a narrow-lane auxiliary function according to an embodiment of this application. As shown in FIG. 14, the method 1400 includes the following steps.

S1410: Collect information about a surrounding environment and road data.

For example, a vehicle may collect the information about the surrounding environment and the road data, and determine distances/distance between a wheel and road edges on both sides or an obstacle, so that a width of a current road may be determined based on the distance.

S1420: Determine whether a current road is a narrow road.

Based on the collected information about the surrounding environment and road data, when the vehicle determines that the vehicle is currently on the narrow road and needs to travel through the narrow road, the narrow-lane auxiliary function is automatically invoked. The vehicle may automatically plan a narrow-lane auxiliary trajectory to safely travel through the narrow road. The vehicle may further convert the narrow-lane auxiliary trajectory into a corresponding wheel steering angle, driving distance, and predicted vehicle body coverage area based on a road width, a surrounding obstacle, and a parameter of an ego vehicle body, and display the information on a display, to guide a driver to drive.

For example, a narrow road may be classified into a parallel narrow lane and a vertical narrow lane.

For example, if the road width is b and a wheel distance of the vehicle is a, when b>4 m, the vehicle may determine that the current road is a non-narrow lane and can travel normally.

For example, when b<1.4a, the vehicle may determine that the road ahead is narrow and the vehicle cannot travel.

For example, when 1.4a≤b≤4 m, the vehicle may determine that the current road is the parallel narrow lane, so that driving path planning and reminding may be performed based on a pose. When the vehicle is traveling, and a vehicle speed is less than or equal to 15 km/h, the narrow-lane auxiliary function is activated. The vehicle may detect a road condition in a range of a vehicle driving direction L1 to L2 (for example, 100-200 m).

For example, when the vehicle identifies that the straight-through road section ends and there is a left-turn or right-turn direction, it may be determined that the current road is a vertical narrow lane. For example, when a wheelbase of the vehicle is d, is perpendicular to a width of a road surface on a current road, and is greater than or equal to d+x (for example, a value range of x may be 0.4-1 m), the vertical narrow lane may be travelled; otherwise, a user is prompted that the vertical narrow lane cannot be driven.

In an embodiment, if the current road is not a narrow road, the vehicle may not prompt the user, and the vehicle may normally travel through the road based on a driving behavior of the user.

S1430: Prompt the user with a dynamic prediction trajectory of the vehicle and the narrow-lane auxiliary trajectory.

Figure 15:
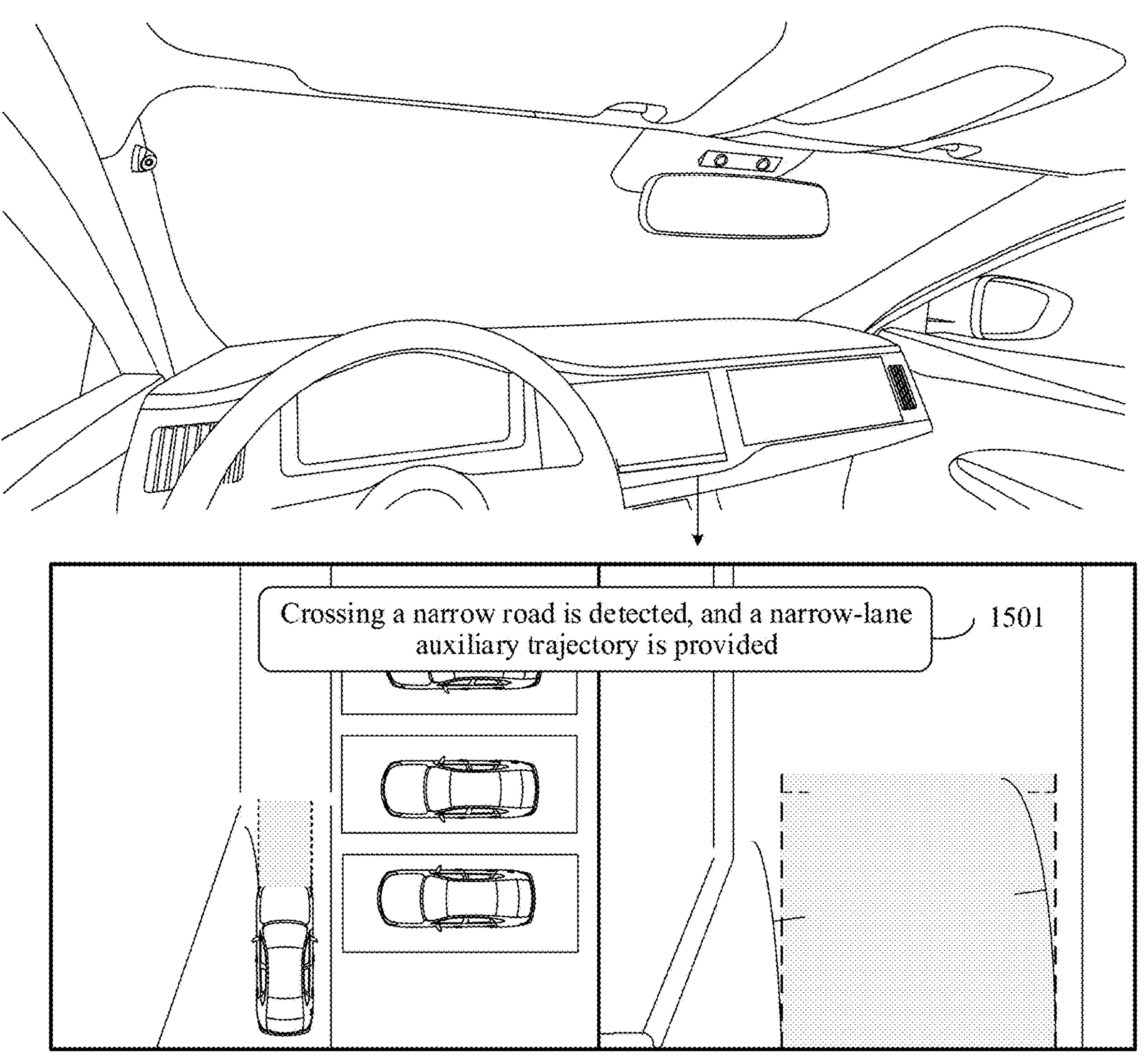
FIG. 15 shows another GUI according to an embodiment of this application.

FIG. 15 shows another GUI according to an embodiment of this application. As shown in FIG. 15, when a vehicle determines that the vehicle travels through a narrow road currently, the vehicle may display, by using a display, prompt information 1501 "Crossing a narrow road is detected, and a narrow-lane auxiliary trajectory is provided", a dynamic prediction trajectory of the vehicle, and a narrow-lane auxiliary trajectory. For example, in FIG. 15, a black solid line indicates the dynamic prediction trajectory of the vehicle, a black dashed line indicates the narrow-lane auxiliary trajectory, and a shadow part indicates a vehicle body coverage area when the vehicle travels based on the narrow-lane auxiliary trajectory. A driver can rotate a steering wheel to control a brake and a throttle, and align the dynamic prediction trajectory of the vehicle with the narrow-lane auxiliary trajectory, so that the vehicle travels through the narrow road.

In an embodiment, the vehicle may estimate a rendezvous position based on a movement speed of a dynamic obstacle (for example, an oncoming vehicle or a person) in the road. A driving trajectory is planned based on a preset rendezvous position, to prompt the driver with a proper driving path by using the planned driving trajectory, or prompt the driver to decelerate and stop, and display a proper parking avoidance point.

In an embodiment, when the vehicle detects that a user switches to the R gear to reverse the vehicle, the vehicle may also identify a parallel narrow lane or a vertical narrow lane. When the parallel narrow lane and the vertical narrow lane are identified, the driving trajectory may be planned for the user.

In an embodiment, when the vehicle detects that the vehicle is about to travel through the vertical narrow lane, the vehicle may assist in determining a steering intention of the driver by using an indicator light. For example, when the vehicle detects that the driver turns on a left indicator light, the vehicle plans a corresponding path to the left and displays a narrow-lane auxiliary trajectory based on information about a lane in which an ego vehicle is located, a pose, and a vertical lane.

In an embodiment, when the vehicle detects that the vehicle is about to travel through the parallel narrow lane and detects that the driver turns on the left indicator light, the vehicle may plan a narrow-lane U-turn trajectory for the driver; and when the vehicle detects that the vehicle is about to travel through the parallel narrow lane and detects that the driver turns on a right indicator light, the vehicle identifies a distance between a wheel and a road edge and plans a trajectory about pulling over.

In this embodiment of this application, when the vehicle travels through the narrow road, a correct driving path may be automatically calculated and intelligent guidance is provided, so that the driver can quickly correct a direction and a distance through comparison guidance. This ensures safe driving.

The foregoing describes, with reference to the embodiments, the technical solution of parking provided in embodiments of this application and the technical solution of enabling the narrow-lane auxiliary function when the vehicle travels through a narrow road. The following describes, with reference to the accompanying drawings, the technical solution of abnormal detection on a parking pose and automatic adjustment on a parking pose provided in embodiments of this application.

When the vehicle is pulled in a parking area, the vehicle can automatically monitor a parking posture of the vehicle in the parking area. Based on data collected by sensors such as radar and a camera lens, the vehicle can identify and determine whether marked lane violation is performed on the vehicle, tilted, near an obstacle/an obstacle vehicle, or cannot open the vehicle door.

In an embodiment, the vehicle may use a deviation distance between a center point of the vehicle projected on the ground and a center point of the parking area, a rotation angle between a central axis of the vehicle projected on the ground and a central axis of the parking area, and a distance between any position of the vehicle body and a surrounding obstacle/a surrounding obstacle vehicle.

Figure 16A:
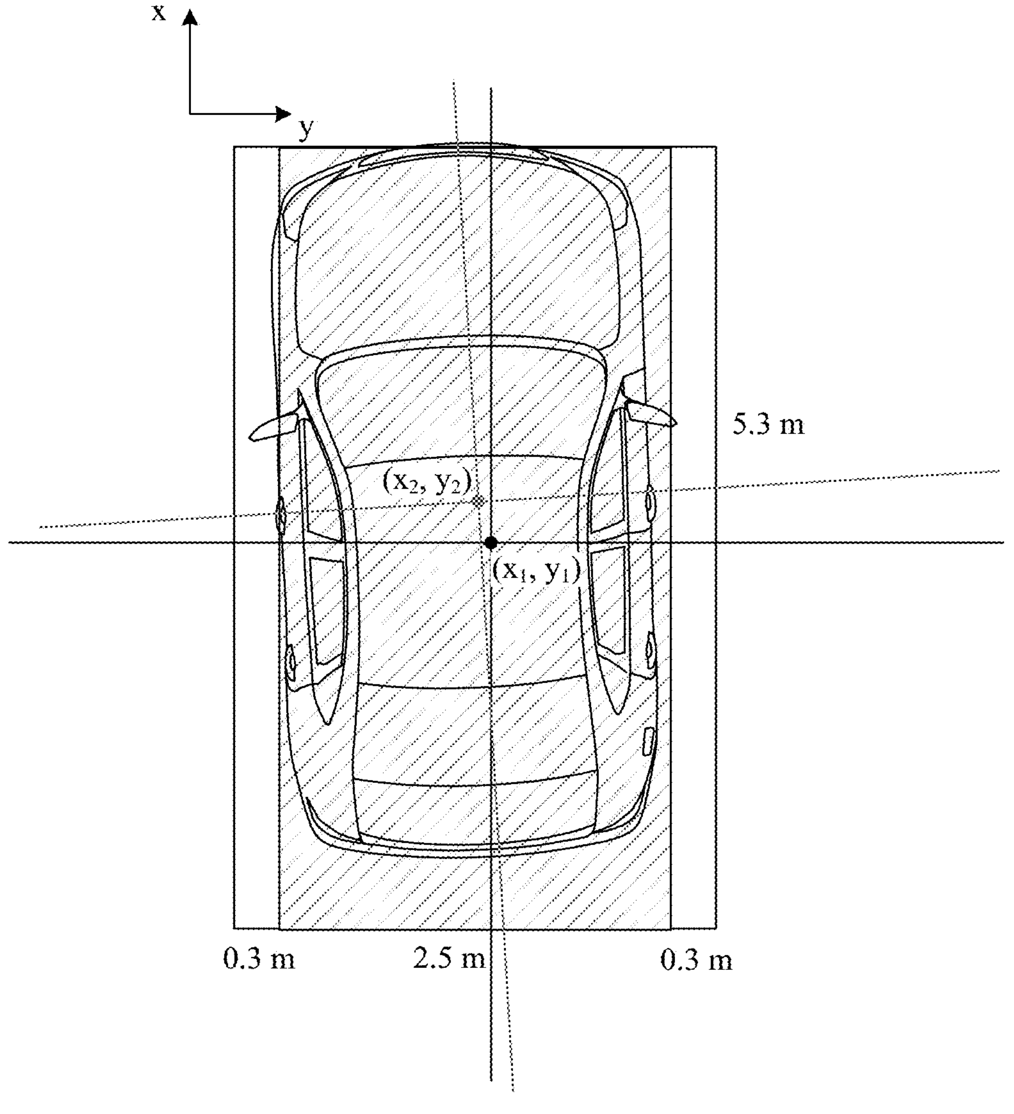
FIG. 16(*a*) to FIG. 16(*c*) each are a schematic diagram of a parking area according to an embodiment of this application.
Figure 16B:
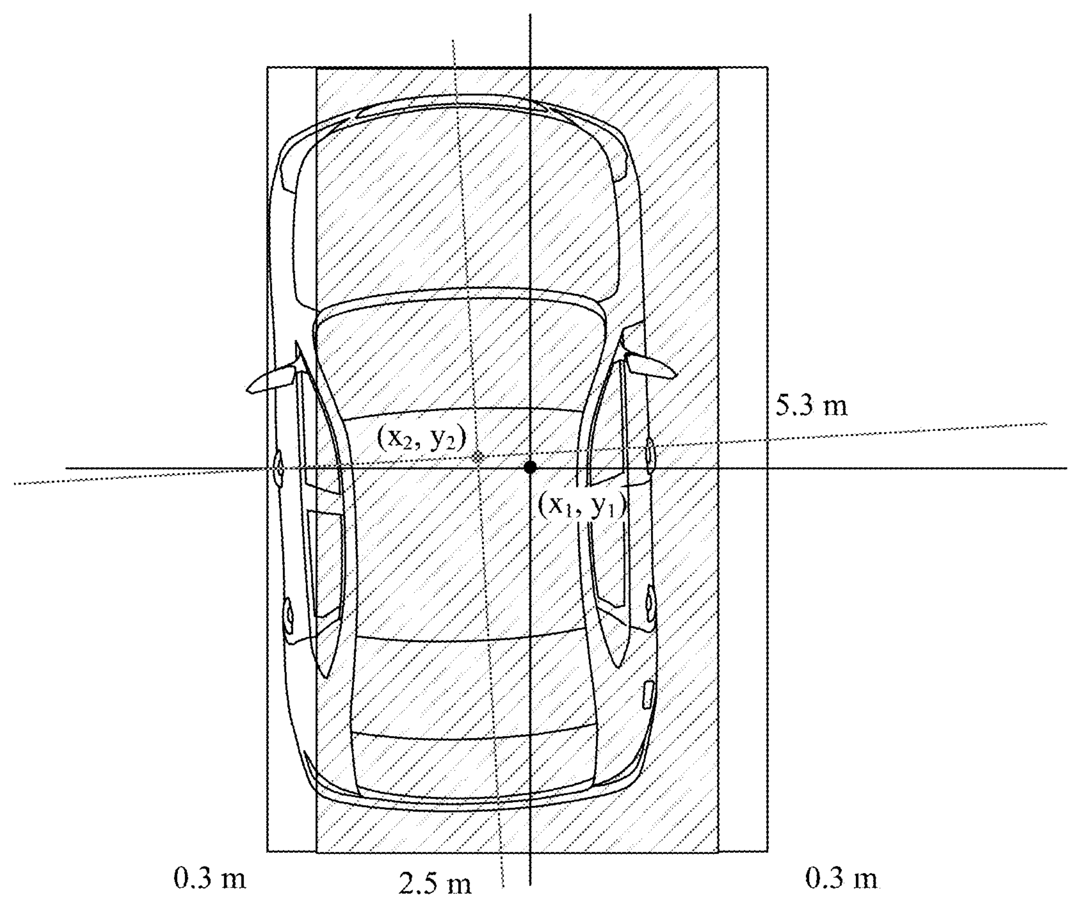
Figure 16C:
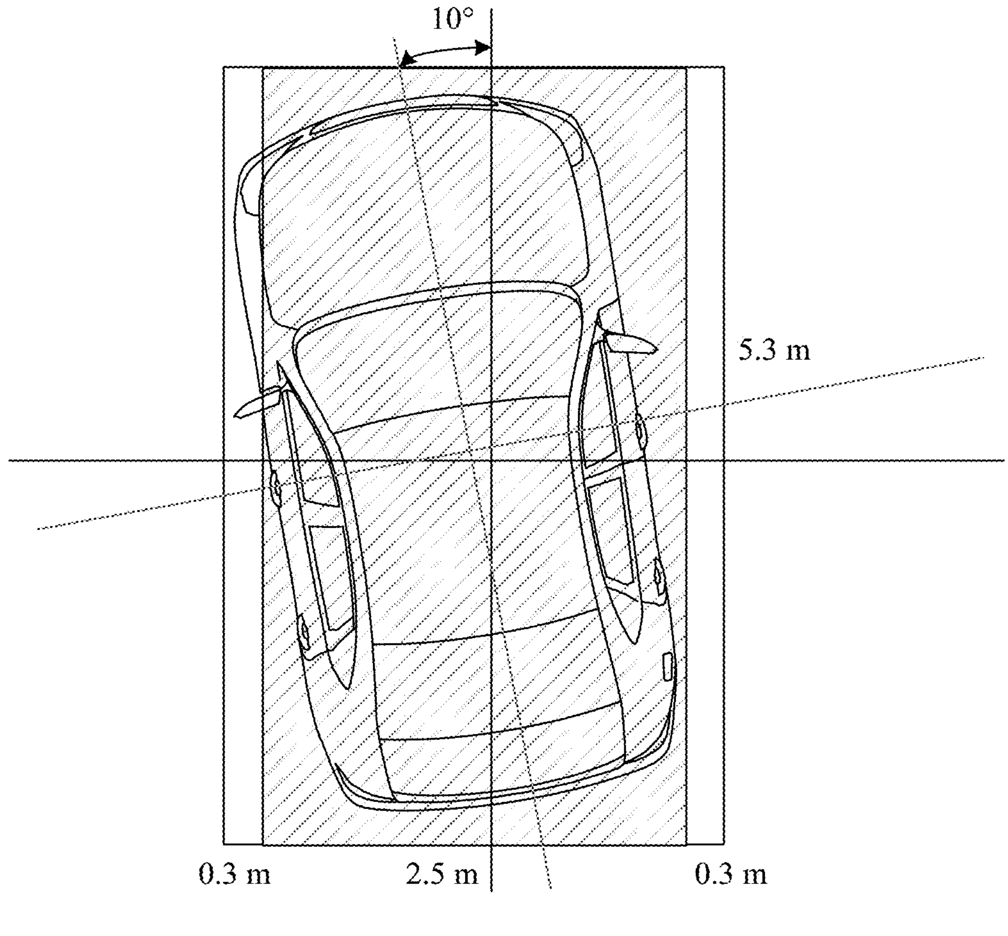

For example, FIG. 16(*a*) to FIG. 16(*c*) each are a schematic diagram of a parking area. As shown in FIG. 16(*a*), a length of a parking space is 5.3 m and a width is 2.5 m, a black solid line is a parking space line, an area 0.3 m inward two sides of the parking space line is an area where the vehicle is parked inside the parking space and is an area that can detect that a vehicle is not in the middle through monitoring, and a shadowed area is a middle parking area. Coordinates of a central point of the vehicle are ($x_2$, $y_2$), coordinates of a central point of the parking area are ($x_1$, $y_1$), and an included angle between a vehicle central axis and a central axis of the parking area is θ. When a distance between the center point of the vehicle projected on the ground and the center point of the parking area is less than or equal to a first preset difference (for example, the first preset difference is 0.3 m), and the included angle θ is less than or equal to a preset angle (for example, 3°), it is determined that the vehicle is parked in the middle.

In an embodiment, when the distance between the center point of the vehicle projected on the ground and the center point of the parking area is greater than the preset difference, the vehicle may determine that a current parking pose of the vehicle is abnormal. As shown in FIG. 16(*a*), if a distance of a projection of the connection line in the y-axis direction is greater than a second preset difference (for example, the second preset difference is 0.2), the vehicle may determine that the current parking pose is abnormal and a front-to-back deviation is obvious.

As shown in FIG. 16(*b*), if the distance of a projection of the distance in the x-axis direction is greater than a third preset difference (for example, the third preset difference is 0.2 m), the vehicle may determine that the current parking pose is abnormal and a left-to-right deviation is obvious.

As shown in FIG. 16(*c*), if the vehicle determines that the included angle θ is 10°, the vehicle may determine that the current parking pose is abnormal and the vehicle is clearly skewed.

In an embodiment, when the vehicle determines that the parking pose is normal, there may be no reminder on a display, and the driver may leave the vehicle. Alternatively, when the vehicle determines that the parking pose is normal, the display may display the parking space in green, and prompt the driver that the parking space is normal.

In an embodiment, when the vehicle determines that the parking pose is abnormal, an abnormal status of the vehicle may be displayed by using the display, so that the driver perceives the abnormal scenario. In addition, if the driver is still in the vehicle, the display may be used to prompt the driver to perform automatic pose adjustment.

Figure 17:
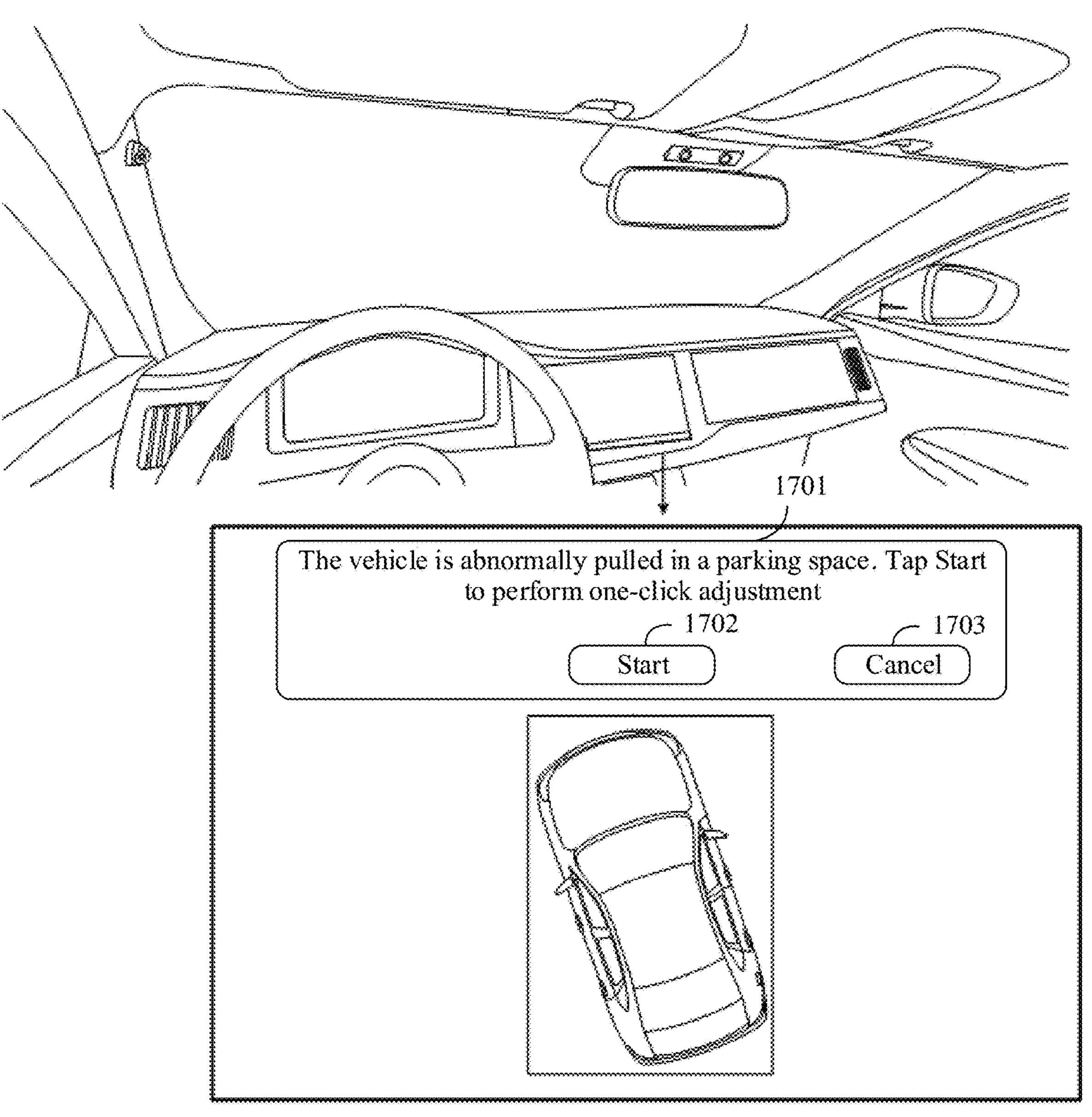
FIG. 17 shows another GUI according to an embodiment of this application.

FIG. 17 shows another GUI according to an embodiment of this application. As shown in FIG. 17, when a vehicle detects that a current parking pose is abnormal, the vehicle may display, by using a display, prompt information 1701 "The vehicle is abnormally pulled in a parking space. Tap Start to perform one-click adjustment", a "Start" control 1702, and a "Cancel" control 1703. When the vehicle detects an operation of tapping the "Start" control 1702 by the user, the vehicle may select a current parking area as a target parking area and automatically plan a parking trajectory for parking in the middle. After a driver releases a brake, the vehicle may adjust the parking pose of the vehicle by controlling the brake, a throttle, and a steering wheel based on the parking trajectory for parking in the middle, so that the vehicle is parked in the middle of the parking area.

In an embodiment, the vehicle may determine, based on a type of the current parking area and a distance between the vehicle and an obstacle, whether the driver or a passenger can get off conveniently (for example, when a distance between a vehicle door and the obstacle is greater than 30 cm, it may be considered that the driver or the passenger can get off conveniently) after the vehicle is pulled in. If the driver or passenger can get off the vehicle conveniently; the vehicle automatically adjusts to the middle position of the parking area and then automatic parking ends. If the driver or the passenger cannot get off conveniently, when the vehicle detects that the current parking pose is abnormal and the vehicle detects that a user chooses to automatically adjust the parking pose, the vehicle may prompt the user that the vehicle is to be pulled out from the parking area to a position at which the vehicle door can be opened, and prompt the user to get off at the position. When the vehicle detects that the user in the vehicle gets off and closes the vehicle door, the vehicle is automatically pulled in the parking area.

Figure 18:
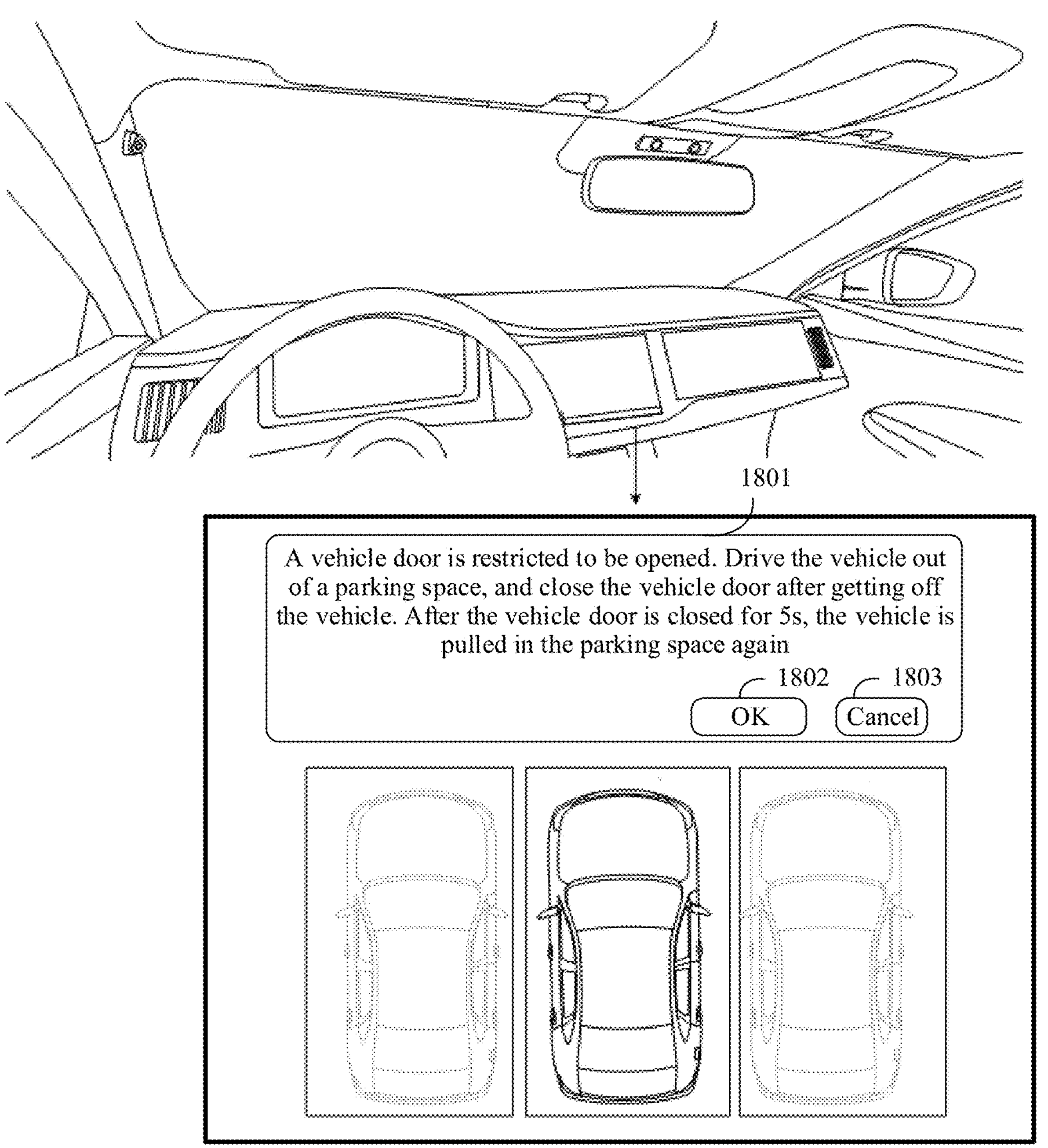
FIG. 18 shows another GUI according to an embodiment of this application.

FIG. 18 shows another GUI according to an embodiment of this application. As shown in FIG. 18, when a vehicle detects that a current parking pose is abnormal and the vehicle determines that a driver or a passenger cannot get off the vehicle easily, the vehicle may display, by using a display, prompt information 1801 "A vehicle door is restricted to be opened. Drive the vehicle out of a parking space, and close the vehicle door after getting off the vehicle. After the vehicle door is closed for 5 s, the vehicle is pulled in the parking space again", an "OK" control 1802, and a "Cancel" control 1803. When the vehicle detects an operation of tapping the "OK" control 1802 by a user, the vehicle may travel away from a parking area after receiving a driving instruction of the user. After the vehicle detects that the user gets off the vehicle and closes the vehicle door, the vehicle may perform automatic parking and park in the middle of the parking area.

Figure 19A:
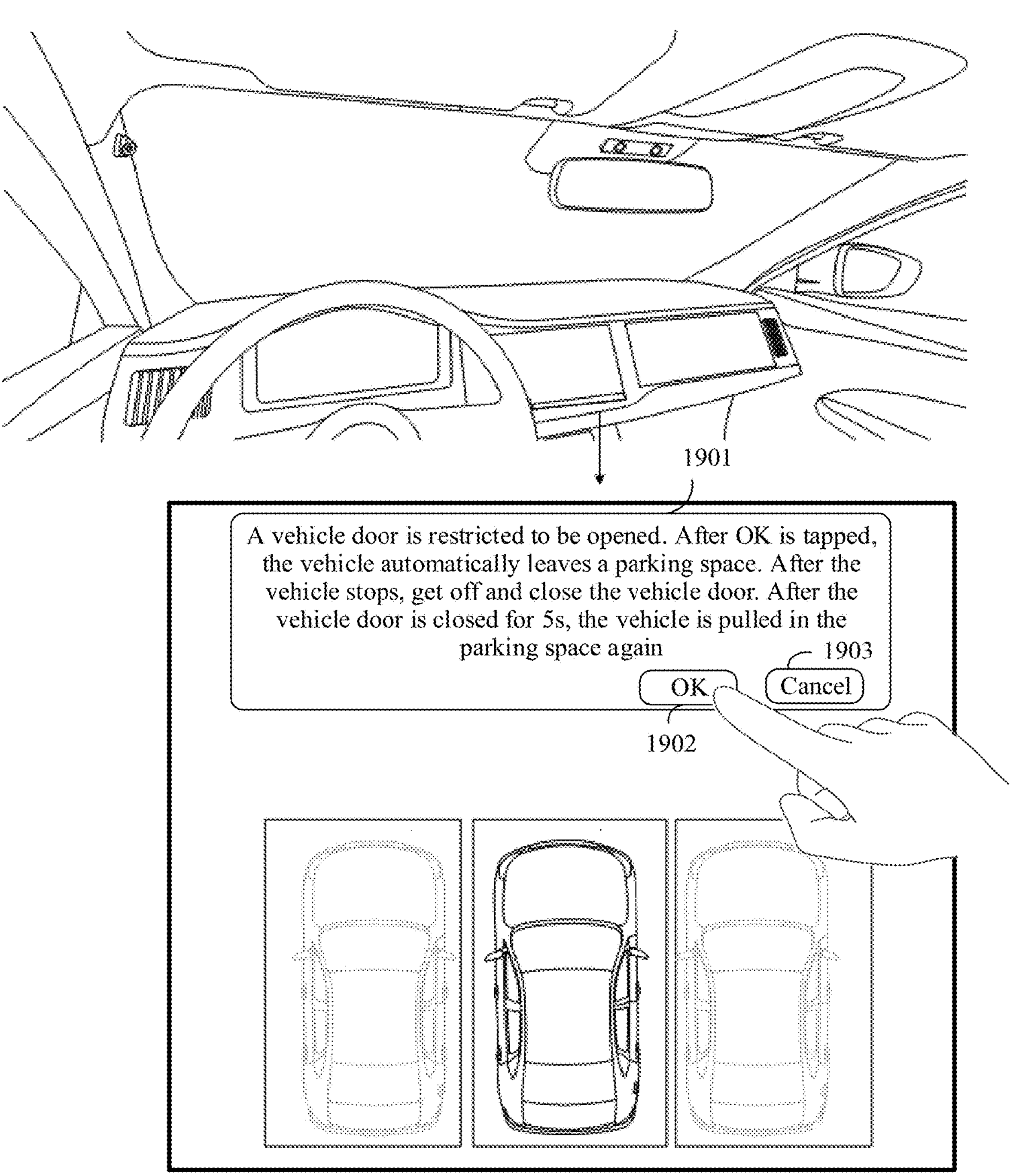
FIG. 19(*a*) and FIG. 19(*b*) show another group of GUIs according to an embodiment of this application.
Figure 19B:
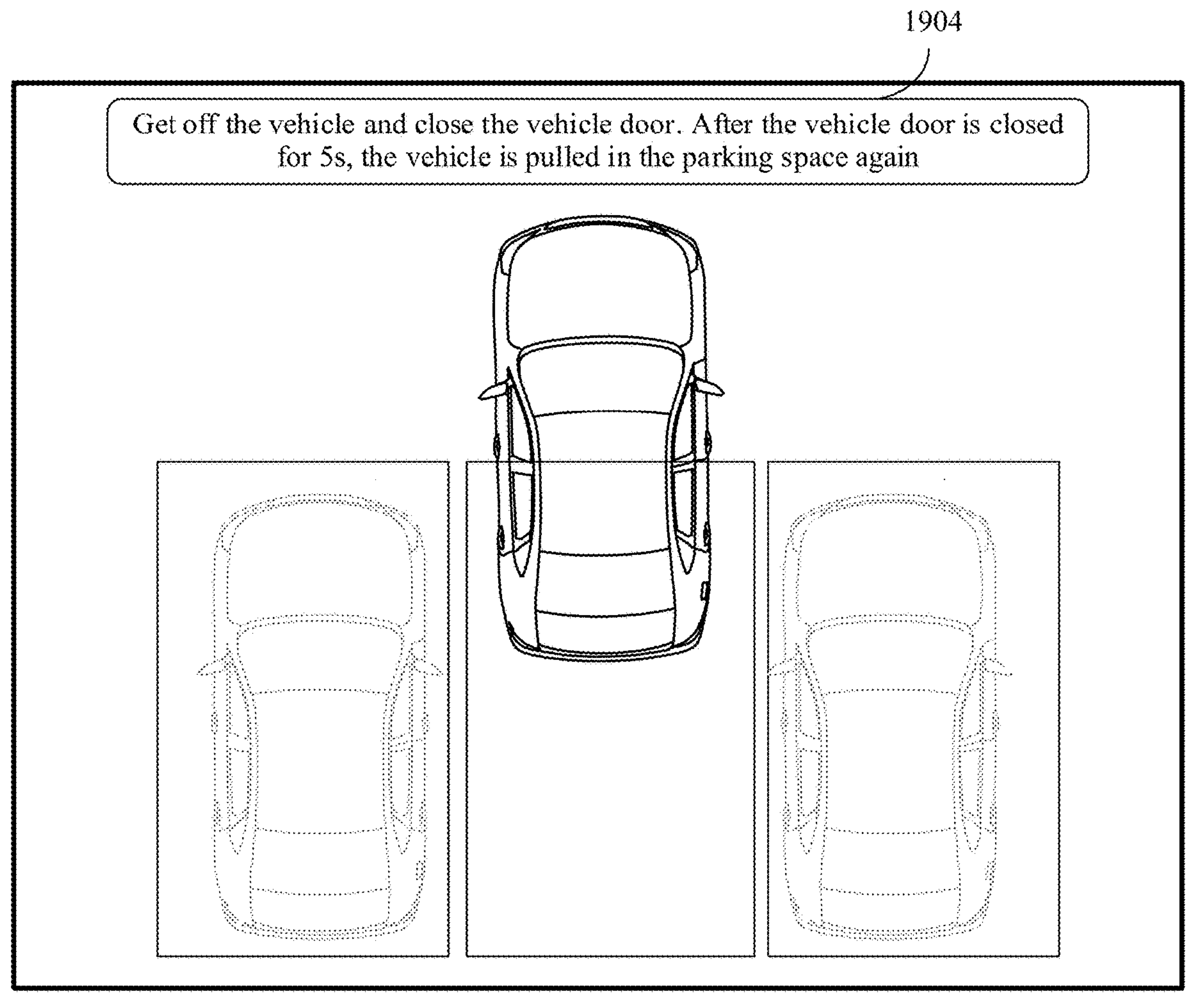
Figure 20A:
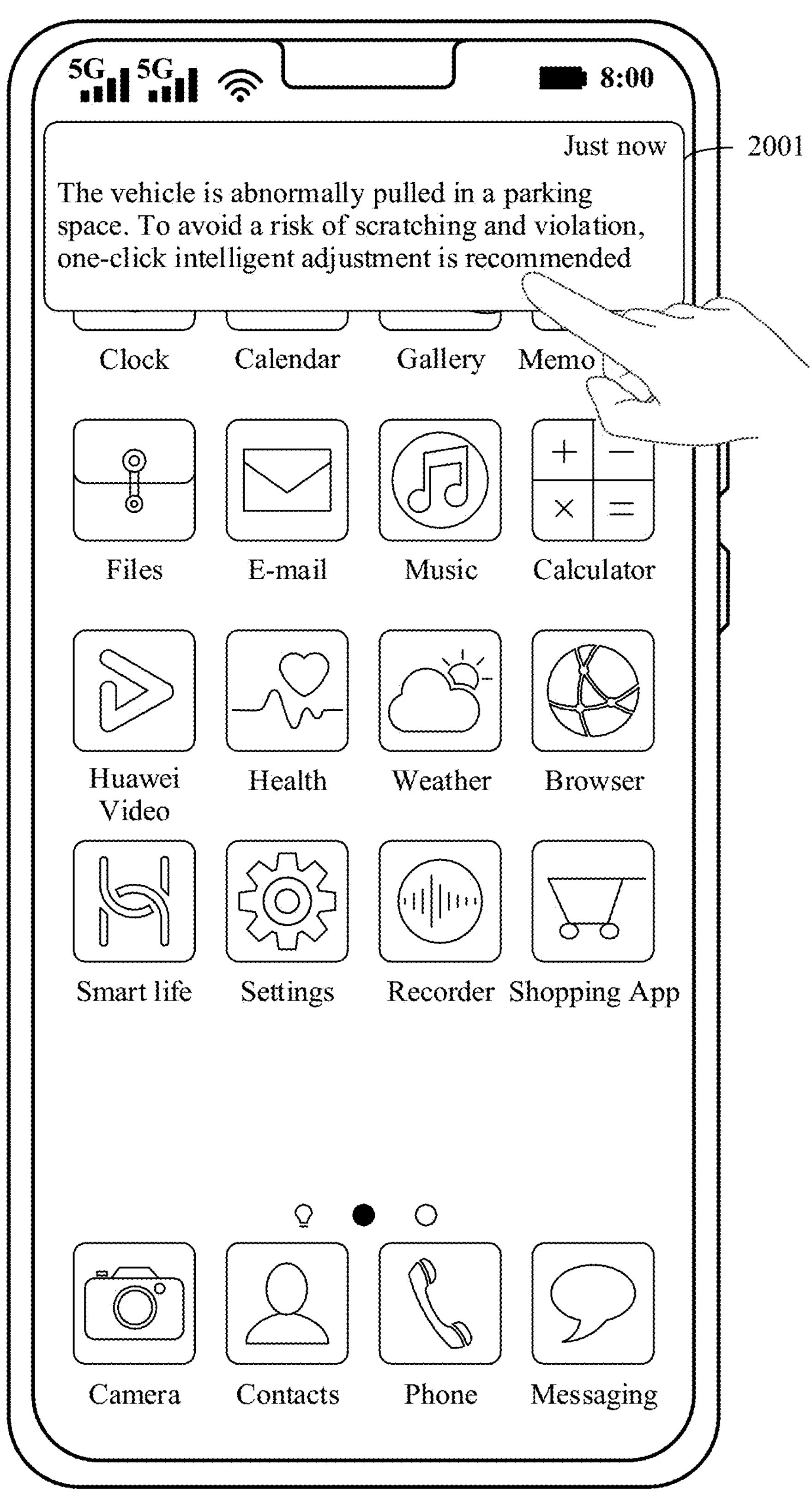
FIG. 20(*a*) to FIG. 20(*d*) show another group of GUIs according to an embodiment of this application.
Figure 20B:
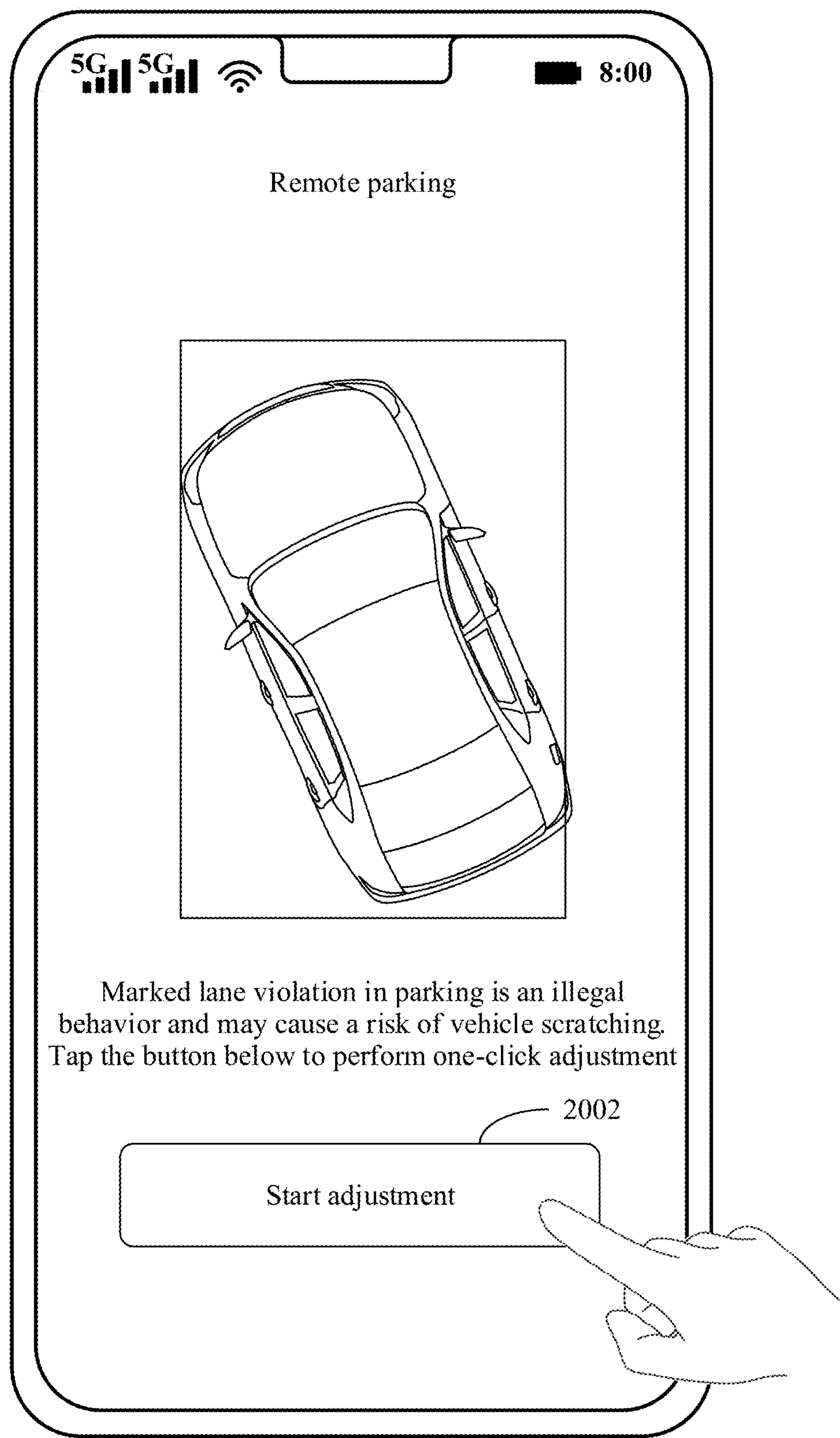
Figure 20C:
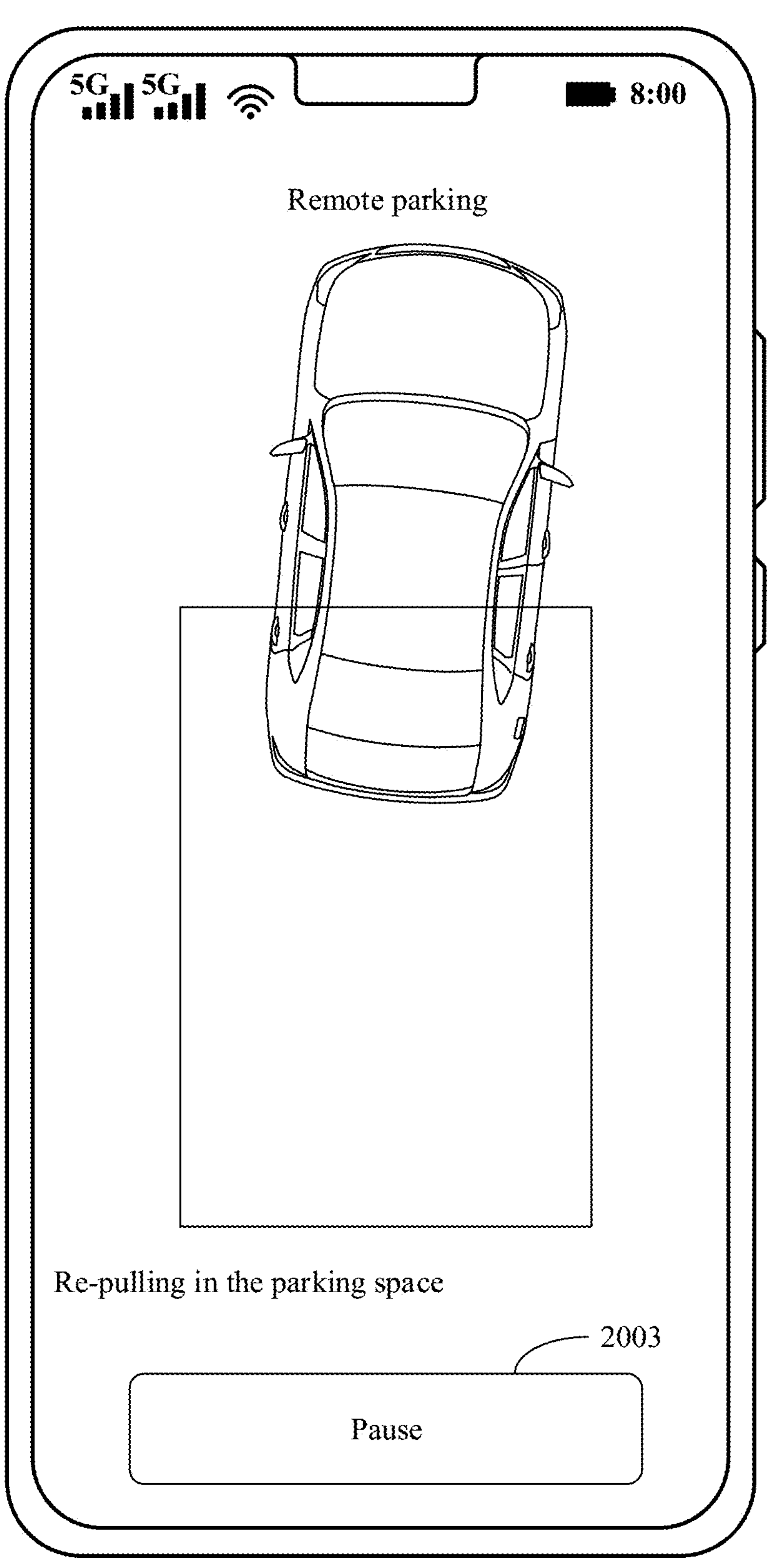
Figure 20D:
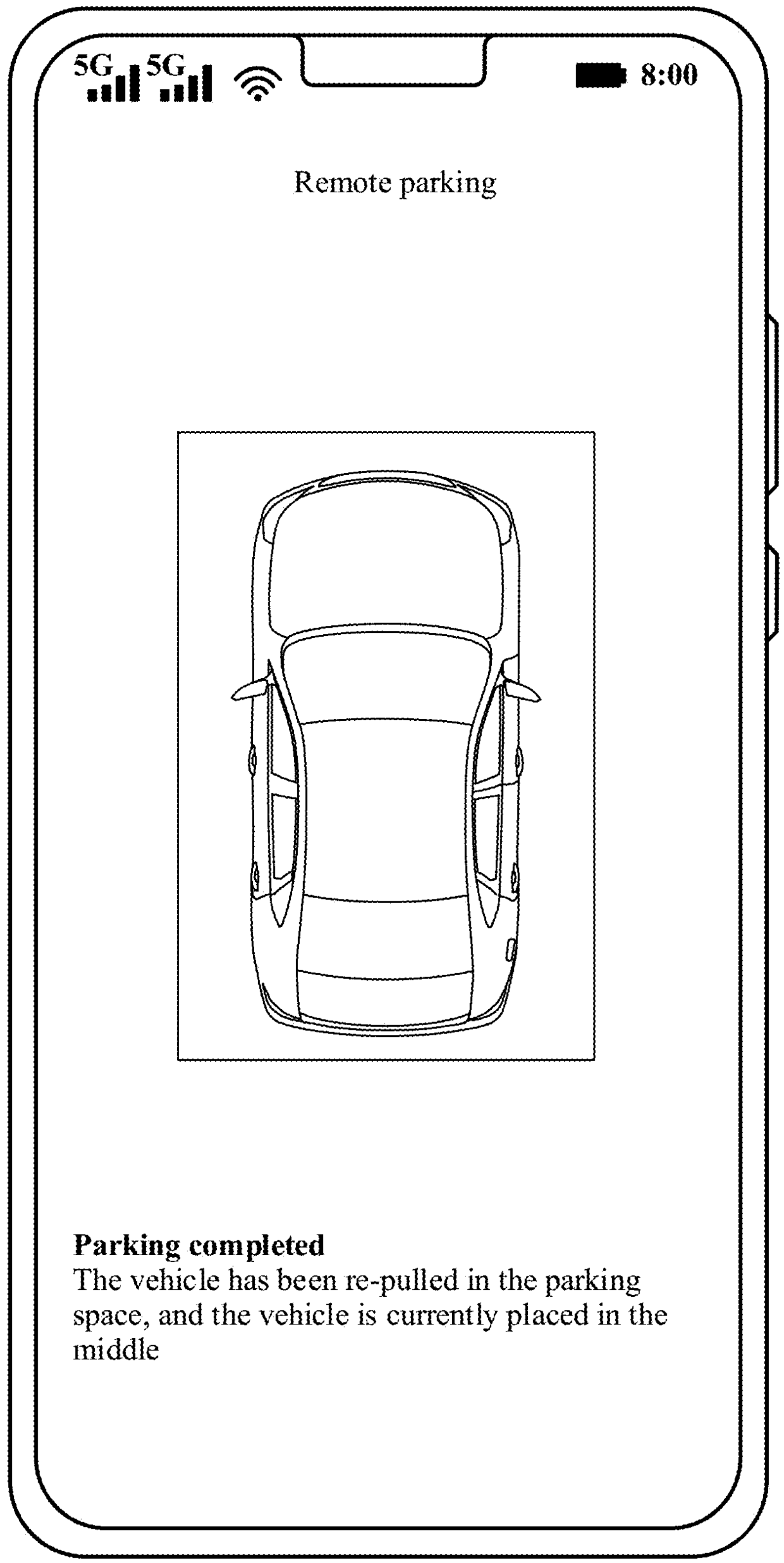

FIG. 19(*a*) and FIG. 19(*b*) show another group of GUIs according to an embodiment of this application. As shown in FIG. 19(*a*), when a vehicle detects that a current parking pose is abnormal and the vehicle determines that a driver or a passenger cannot get off easily, the vehicle may display, by using a display, prompt information 1901 "A vehicle door is restricted to be opened. After OK is tapped, the vehicle automatically leaves a parking space. After the vehicle stops, get off and close the vehicle door. After the vehicle door is closed for 5 s, the vehicle is pulled in the parking space again", an "OK" control 1902, and a "Cancel" control 1903. As shown in FIG. 19(*b*), when the vehicle detects an operation of tapping the "OK" control 1902 by a user, the vehicle may travel away from a parking space and park at a position at which the vehicle door is easy to open. The vehicle may further display, by using a display, prompt information 1904 "Please get off the vehicle and close the vehicle door, and pull in the parking space again after the vehicle door is closed for 5 s". After the vehicle detects that the user gets off the vehicle and closes the vehicle door, the vehicle may perform automatic parking and park in the middle of a parking area.

In an embodiment, if it is detected that the driver or the passenger does not get off within preset duration (for example, 20 s) after the vehicle travels from the parking space and parks at a position at which the vehicle door is easy to be opened, the vehicle may continue to perform automatic parking. In an embodiment, if a distance between the vehicle door on the driver side and an obstacle is less than or equal to a preset distance (for example, 30 cm), the vehicle may be parked on the right by default.

In an embodiment, if the vehicle determines that the driver or the passenger cannot get off the vehicle conveniently, the vehicle may further directly prompt the user to use a remote parking function.

In an embodiment, if the driver leaves the vehicle when the current parking pose is abnormal, the vehicle may send prompt information to a mobile terminal of the user, where the prompt information prompts the user to adjust the pose of the vehicle through remote control.

FIG. 20(*a*) to FIG. 20(*d*) show another group of GUIs according to an embodiment of this application.

As shown in FIG. 20(*a*), after receiving prompt information sent by a vehicle, a mobile phone may display a prompt window 2001, where the prompt window 2001 includes prompt information "The vehicle is abnormally pulled in a parking space. To avoid a risk of scratching and violation, one-click intelligent adjustment is recommended". When the mobile phone detects an operation of tapping the prompt window 2001 by the user, the mobile phone may display a GUI shown in FIG. 20(*b*).

As shown in FIG. 20(*b*), the mobile phone may display a display interface of automatic parking. The display interface includes prompt information "Marked lane violation in parking is an illegal behavior and may cause a risk of vehicle scratching. Tap the button below to perform one-click adjustment" and a "Start adjustment" control 2002. When the mobile phone detects an operation of tapping the "Start adjustment" control 2002 by the user, the mobile phone may display an automatic parking process of the vehicle.

As shown in FIG. 20(*c*), the mobile phone may display a display interface of automatic parking of the vehicle. The display interface may display information about adjusting a parking pose of the vehicle, information about a parking area, prompt information "Re-pulling in the parking space", and a "Pause" control 2003.

In an embodiment, if the mobile phone detects an operation of tapping the "Pause" control 2003 by the user, the mobile phone may send indication information to the vehicle, where the indication information indicates the vehicle to stop automatic parking. In response to receiving the indication information, the vehicle may control the vehicle to stop traveling.

As shown in FIG. 20(*d*), after the vehicle completes adjustment of the parking pose, the vehicle may indicate, to the mobile phone, that automatic parking is completed. The mobile phone may display another display interface of automatic parking of the vehicle. The display interface includes prompt information "The vehicle has been re-pulled in the parking space, and the vehicle is currently placed in the middle".

In this embodiment of this application, the vehicle comprehensively considers an abnormal parking pose and whether a user in the vehicle can easily get off the vehicle, and provides an automatic adjustment function and a clear status prompt for the driver, including center adjustment, a reserved getting-off position, automatic pulling-in after leaving the vehicle and remote control adjustment. This helps the driver adjust the parking pose more easily, saves time and energy, and avoids a case of scratching another vehicle, violating a law; being unable to get off the vehicle, and blocking another vehicle.

With reference to FIG. 16(*a*) to FIG. 20(*d*), the foregoing describes a process of adjusting the parking pose of the vehicle according to embodiments of this application. With reference to the accompanying drawings, the following describes a process of switching between automatic parking and remote parking in a parking process provided in embodiments of this application.

When a vehicle is pulled in a parking space, a parking mode can be actively switched from automatic parking to remote parking. For example, after the vehicle detects that the driver starts automatic parking, the vehicle detects, in an automatic parking process, an operation of suspending automatic parking, and prompts, by using a display, the user to complete parking through remote parking. When the vehicle detects that the user determines to switch to the remote parking, and detects that the user in the vehicle leaves the vehicle and the vehicle door is closed, the vehicle may receive control from a mobile terminal, to continue to complete the current parking by using the remote parking, and pull the vehicle in a selected target parking space.

In an embodiment, after detecting that the user starts automatic parking, the vehicle may identify whether it is convenient to open the vehicle door when the vehicle is parked in a target parking area. If it is inconvenient to open the vehicle door, the vehicle may prompt, by using the display, the driver to switch to remote parking. In an embodiment, in an automatic parking prediction path planned by the vehicle, the vehicle may automatically brake at a final position at which the vehicle door is easy to open, and prompt, by using the display, the user to switch to remote parking.

In an embodiment, in a process in which the vehicle detects that the user manually pulls the vehicle in the target parking area, if it is identified that it is inconvenient to open the vehicle door when the vehicle is parked in the target parking area, the vehicle may prompt, by using the display, the user to switch to remote parking.

Figure 21A:
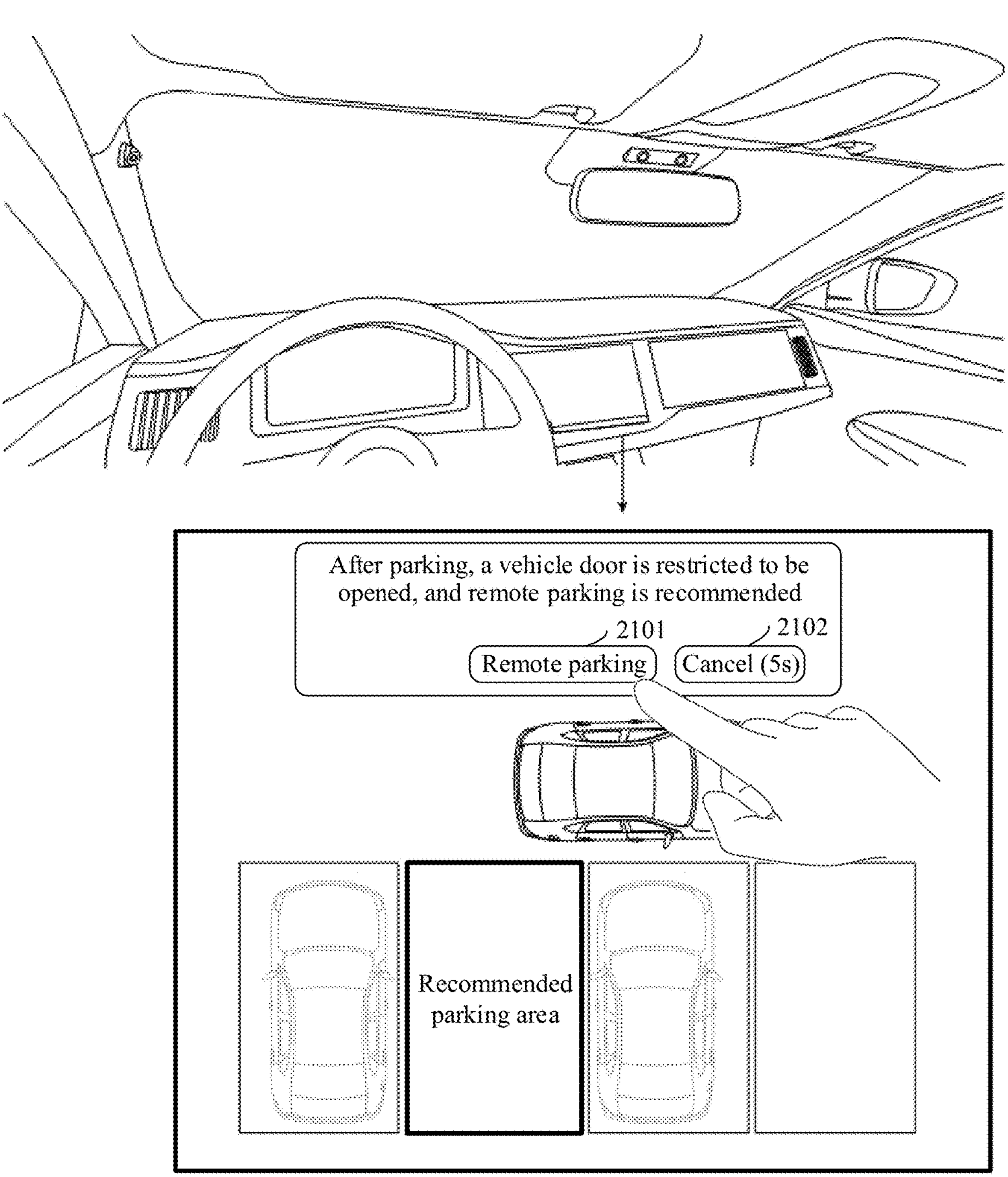
FIG. 21(*a*) and FIG. 21(*b*) show another GUI according to an embodiment of this application.
Figure 21B:
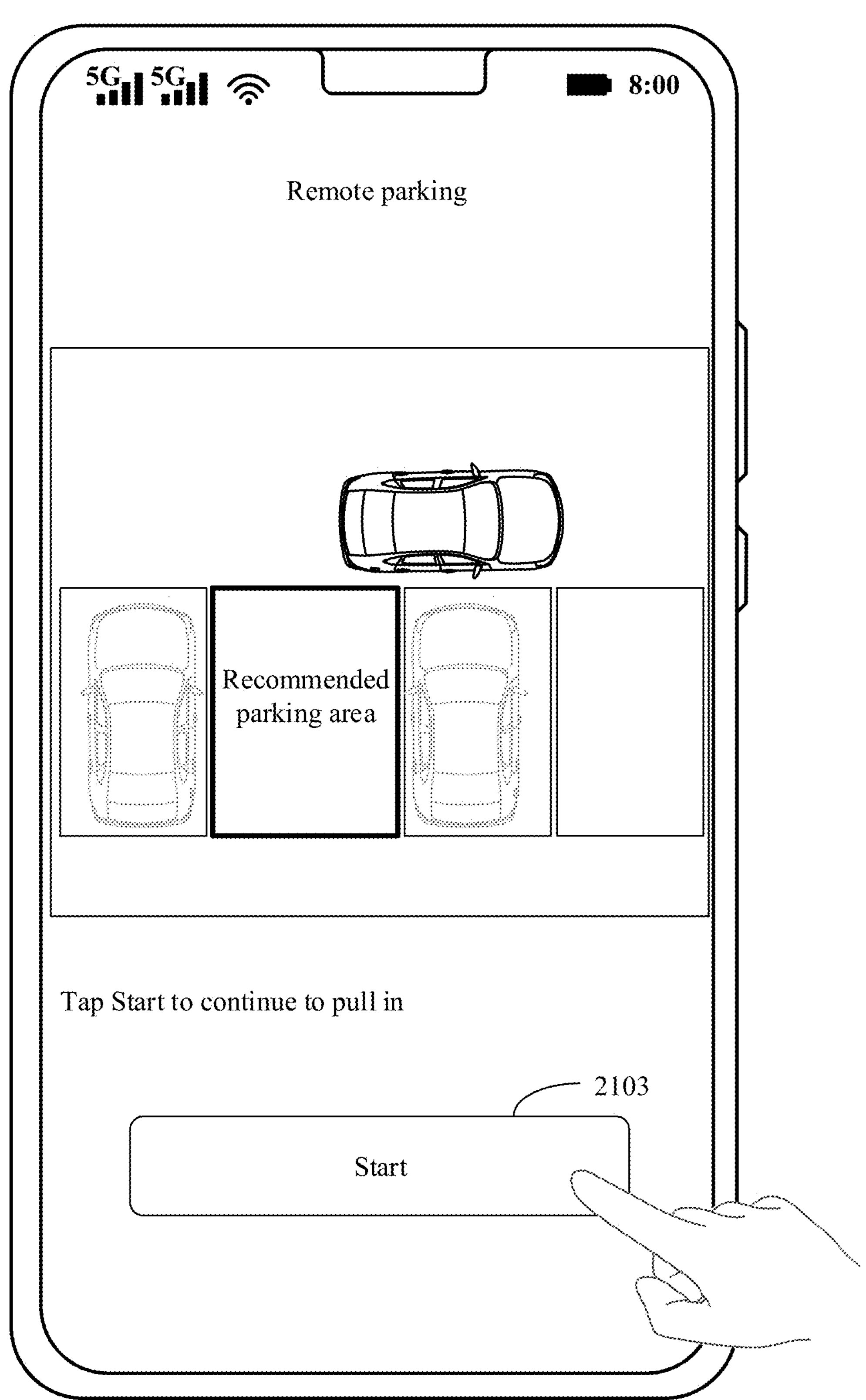
Figure 22A:
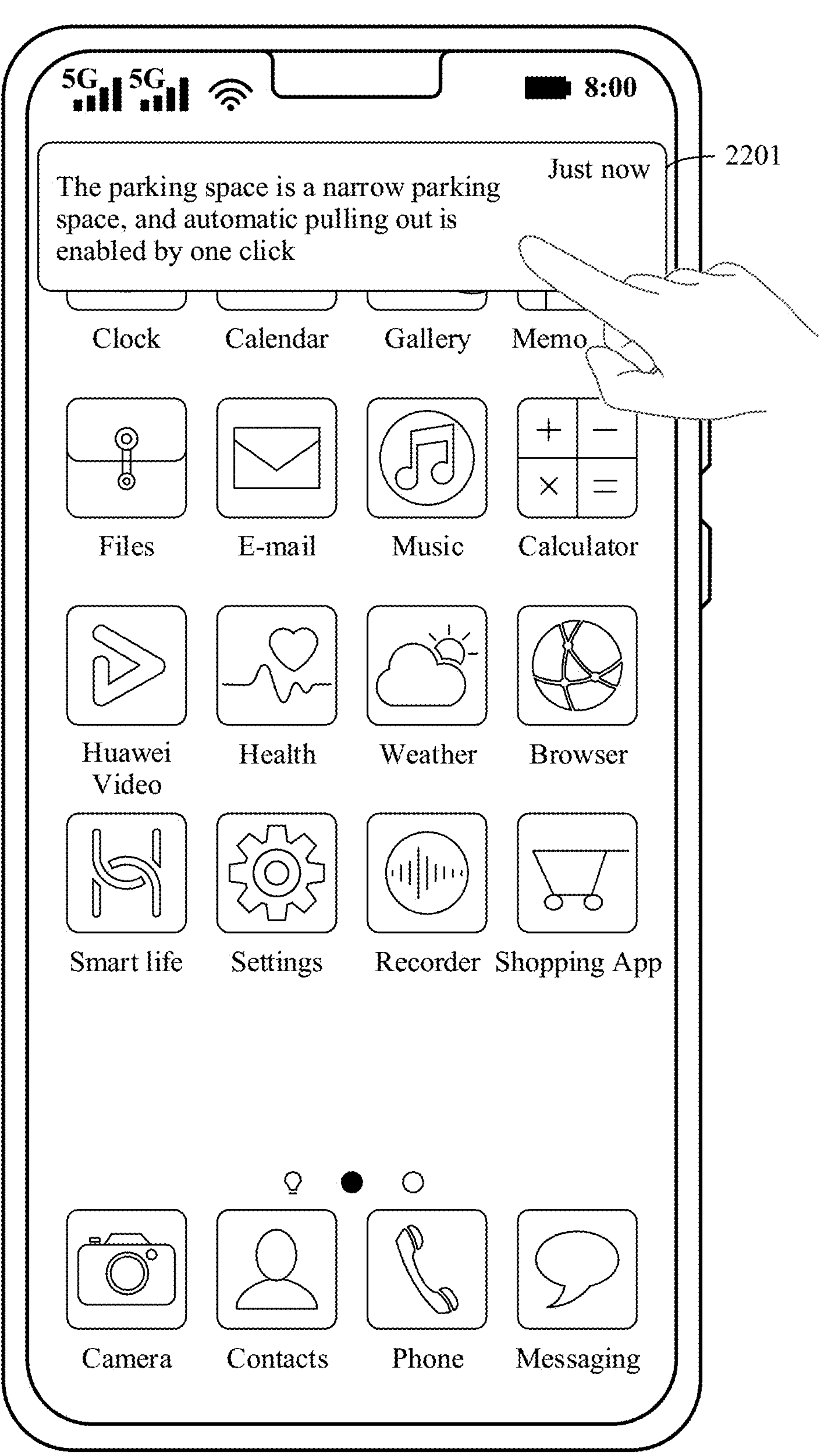
FIG. 22(*a*) to FIG. 22(*d*) show another group of GUIs according to an embodiment of this application.
Figure 22B:
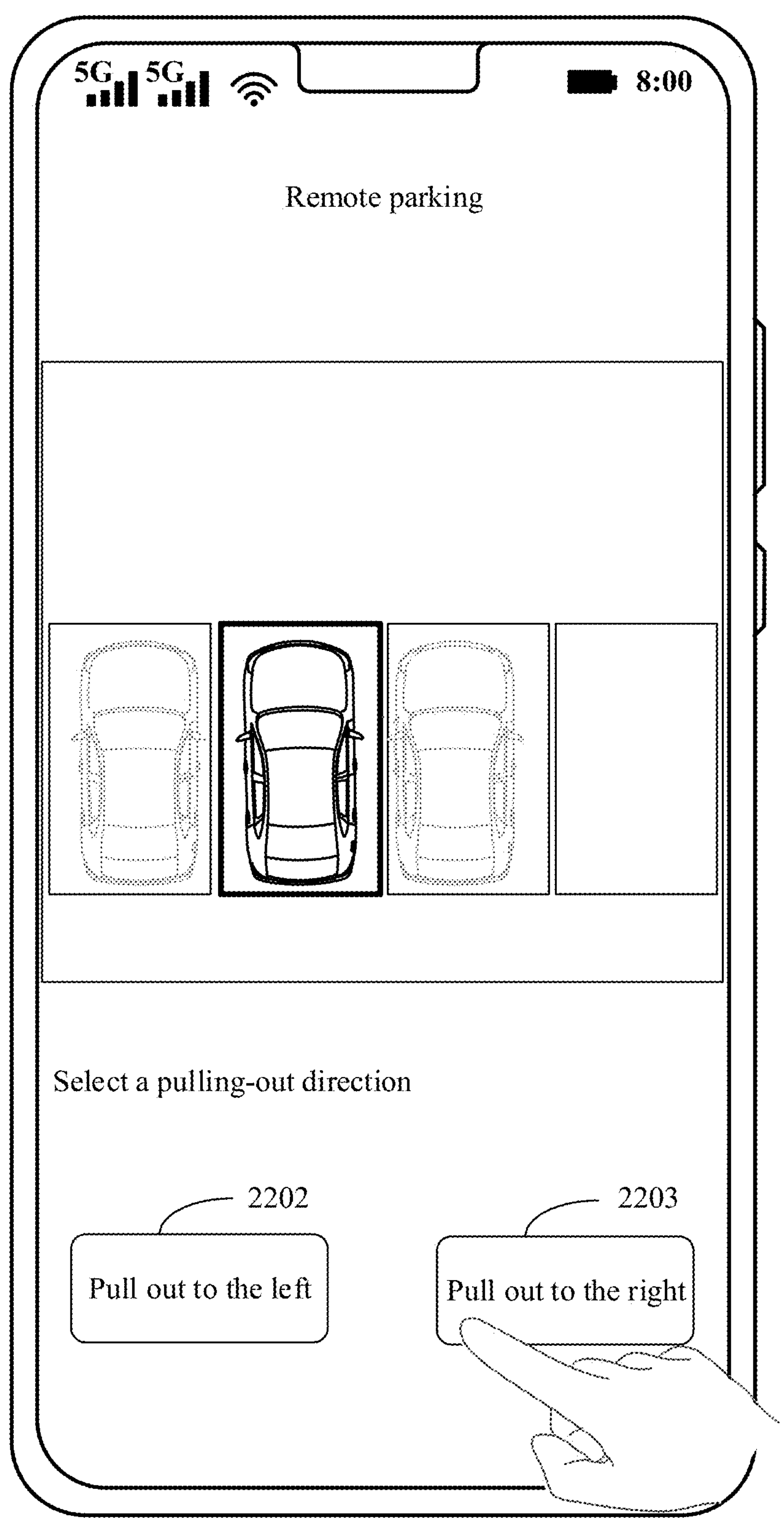
Figure 22C:
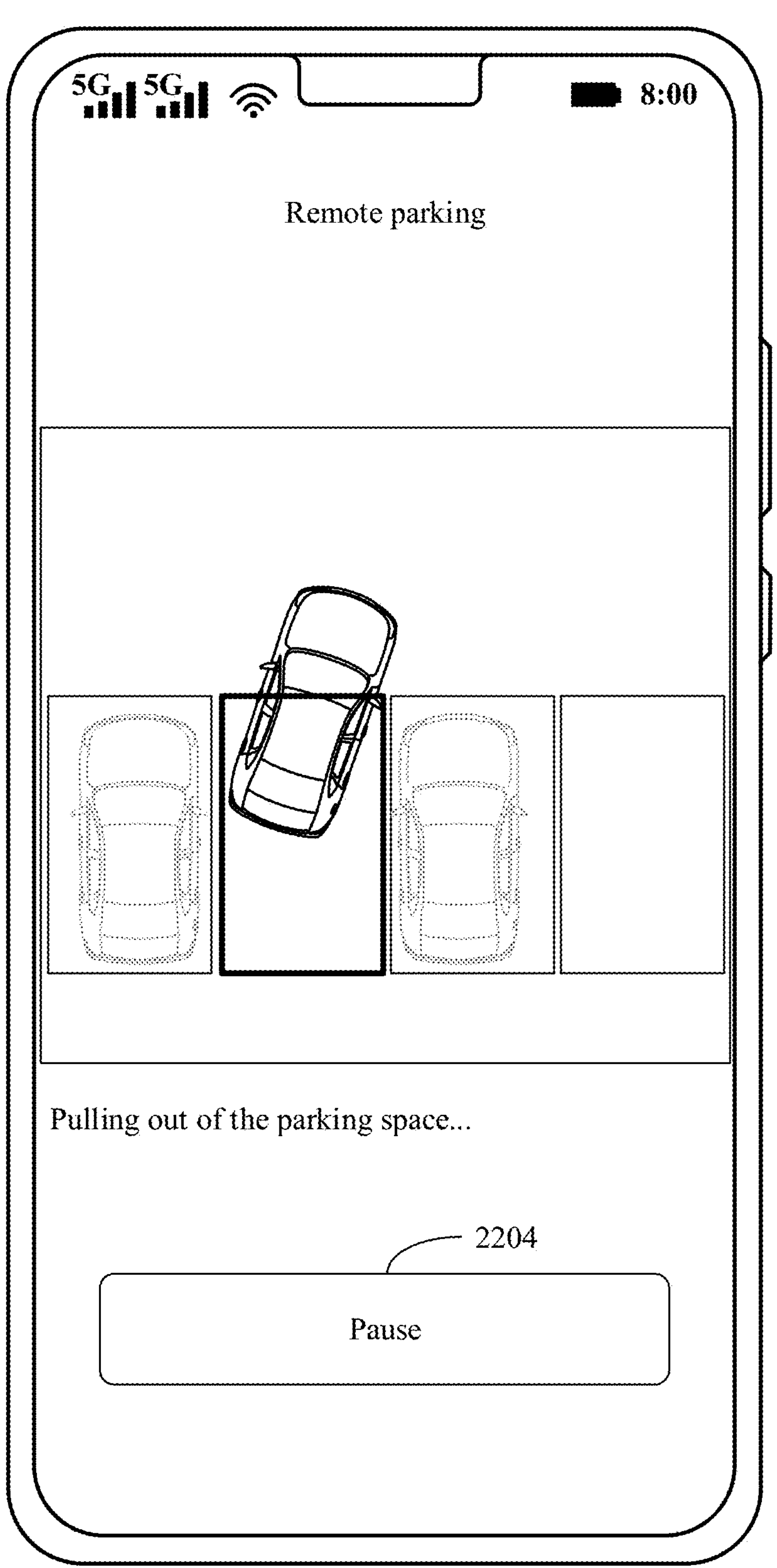
Figure 22D:
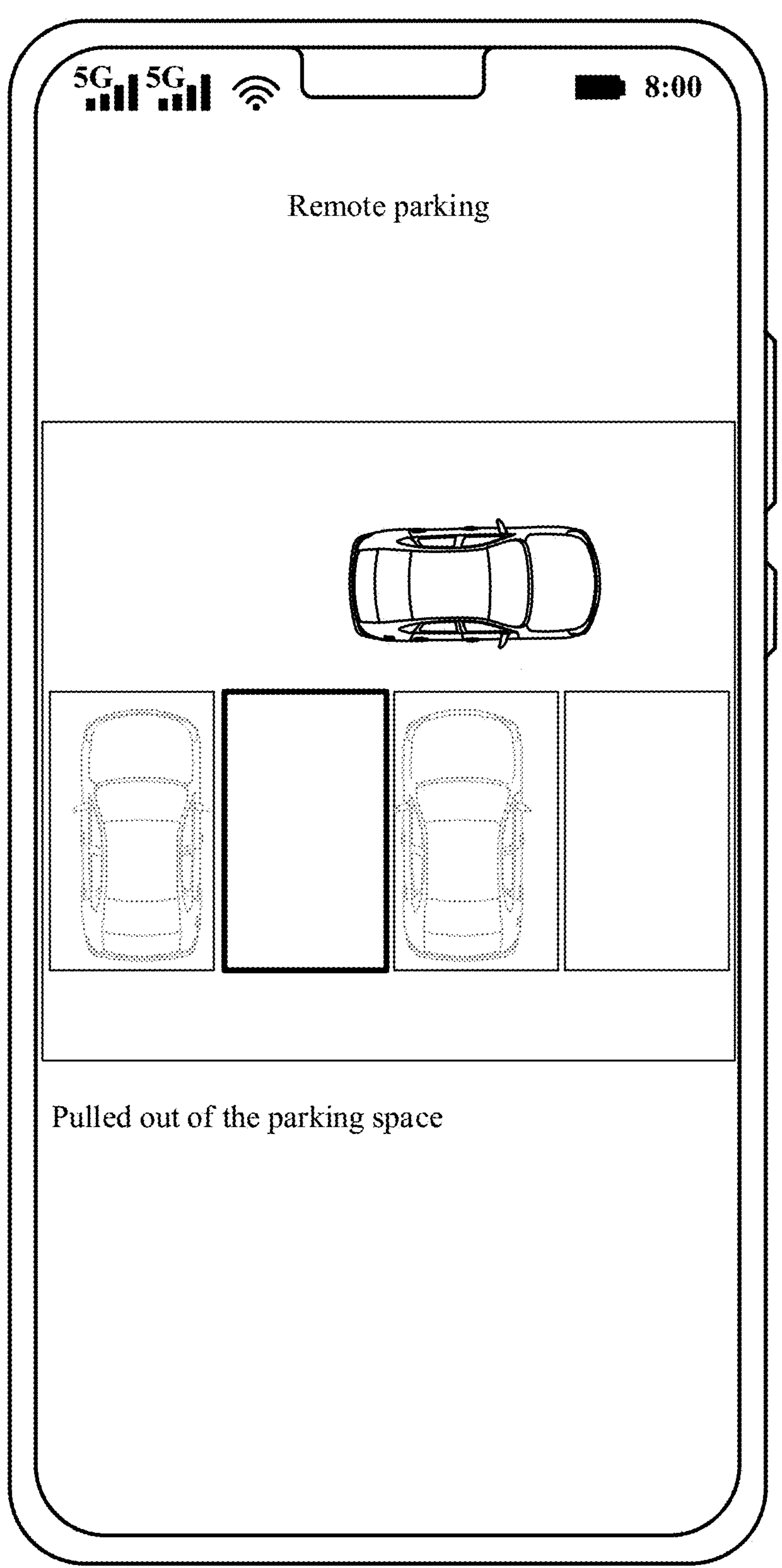

FIG. 21(*a*) and FIG. 21(*b*) show another GUI according to an embodiment of this application.

As shown in FIG. 21(*a*), in a process in which a user pulls a vehicle in a recommended parking area, the vehicle detects that it is inconvenient to open a vehicle door in a target parking area. In this case, the vehicle may display, by using a display, information about the recommended parking area, prompt information "After parking, a vehicle door is restricted to be opened, and remote parking is recommended", a "Remote parking" control 2101, and a "Cancel" control 2102. When the vehicle detects an operation of tapping "Remote parking control" 2101 by the user, the vehicle may receive a parking instruction of a mobile terminal (for example, a mobile phone or a vehicle key).

As shown in FIG. 21(*b*), the mobile phone may display a display interface of remote parking. The display interface includes prompt information "Tap Start to continue to pull in" and a "Start" control 2103. When the mobile phone detects an operation of tapping the "Start" control 2103 by the user, the mobile phone may send a parking instruction to the vehicle, so that the vehicle may pull the vehicle in the target parking area based on the parking instruction.

In this embodiment of this application, switching steps and operation costs between automatic parking and remote parking are simplified, so that parking experience can be more seamless and smooth, and a dilemma that a vehicle cannot get off and re-park is avoided. In addition, a parking mode is recommended in time and in a more intelligent manner, and clear operation instructions are provided on the interface. This helps reduce learning costs.

In an embodiment, after the vehicle is parked in the parking space, the mobile terminal may further perform intelligent parking reminding based on a distance between the mobile terminal and the vehicle.

For example, after the vehicle is pulled in a narrow parking space, the mobile terminal may receive prompt information sent by the vehicle, where the prompt information indicates that a parking space currently parked by the vehicle is the narrow parking space. When the distance between the mobile terminal and the vehicle is less than or equal to a preset distance (for example, 50 m), or the mobile terminal carried by the user is to reach the vehicle after preset duration (for example, 20 s), the mobile terminal may prompt the user to use a parking function.

FIG. 22(*a*) to FIG. 22(*d*) show another group of GUIs according to an embodiment of this application.

As shown in FIG. 22(*a*), when a mobile phone detects that a distance between the mobile phone and a vehicle is less than or equal to 50 m, the mobile phone may display a prompt box 2201, and the prompt box 2201 includes prompt information "The parking space is a narrow parking space, and automatic pulling out is enabled by one click". When the mobile phone detects an operation of tapping the prompt box 2201 by a user, the mobile phone may display a display interface for remote parking.

As shown in FIG. 22(*b*), in response to a detected operation of tapping a control 2202 by the user, the mobile phone may prompt the user "Select a pulling-out direction", the "Pull out to the left" control 2202, and a "Pull out to the right" control 2203.

As shown in FIG. 22(*c*), when the mobile phone detects an operation of tapping the control of pulling out to the right 2203 by the user, the mobile phone may send a parking instruction to the vehicle, where the parking instruction instructs the vehicle to be pulled out to the right. In response to receiving the parking instruction, the vehicle may start to be automatically pulled out to the right. In addition, the vehicle may further send, to the mobile phone in real time, information such as a parking trajectory of the vehicle, pose information of the vehicle, and a surrounding environment. In response to receiving information sent by the vehicle, the mobile phone may display a parking trajectory, surrounding environment information, and the like of the vehicle through a display interface.

As shown in FIG. 22(*d*), after the vehicle completes pulling out, the vehicle may send, to the mobile phone, indication information indicating that the vehicle is pulled out. In response to receiving the indication information, the mobile phone may prompt the user that the vehicle has been pulled out.

In an embodiment, the vehicle may further set a parking time period $[t_1, t_2]$ based on a time period (for example, a time period in which the vehicle is pulled out) of daily vehicle use of the user. In the time period, if a distance between a mobile terminal and the vehicle is less than or equal to a preset distance, the mobile terminal may prompt the user to use a pulling-out function. In an embodiment, the vehicle may also be automatically pulled out the parking space when detecting, within the time period, that the distance between the mobile terminal and the vehicle is less than or equal to the preset distance.

In this embodiment of this application, the mobile terminal may remind, based on the distance between the mobile terminal and the vehicle, the user to use an automatic parking function. This can improve usage of remote parking. In addition, time when the user walks to the vehicle is used to start the vehicle and pull the vehicle out of the parking space, so that the user can directly get on the vehicle when arriving at the parking space. This saves time and reduces waiting time of the user.

Figure 23:
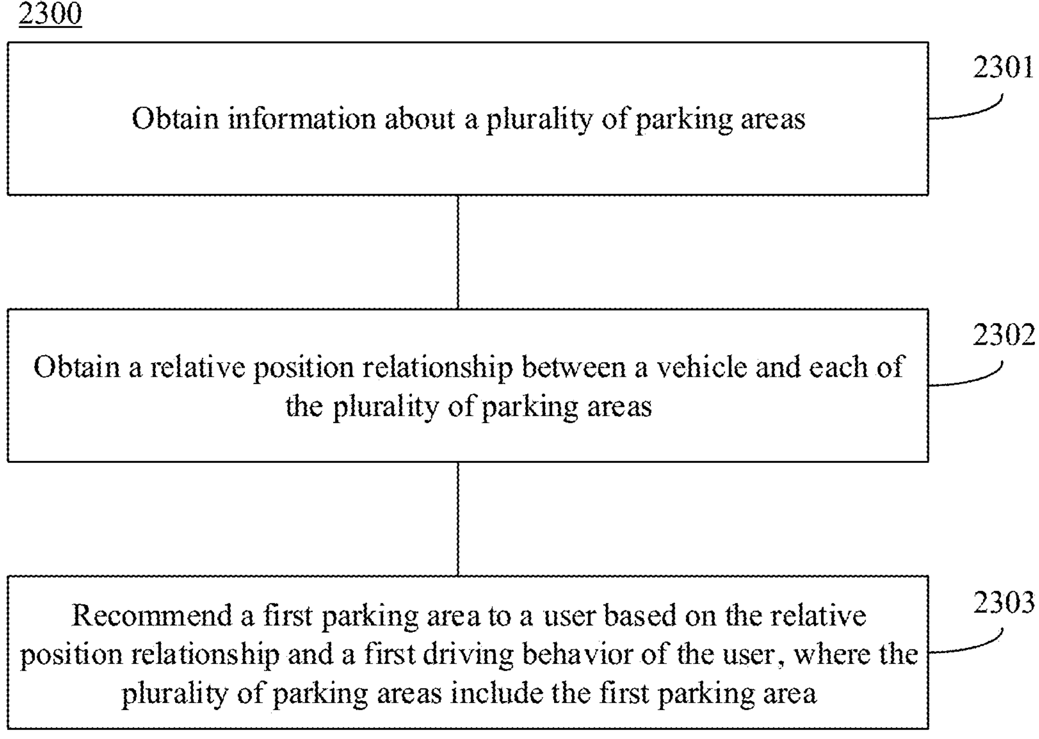
FIG. 23 is a schematic flowchart of a parking method according to an embodiment of this application.

FIG. 23 is a schematic flowchart of a parking method 2300 according to an embodiment of this application. As shown in FIG. 23, the method 2300 includes the following steps.

S2301: Obtain information about a plurality of parking areas.

Optionally, before the obtaining information about a plurality of parking areas, the method further includes; determining a parking mode of a vehicle based on a relative position relationship and a third driving behavior of a user, where a parking mode includes pulling in a parking area or pulling out of a parking area.

For example, the third driving behavior includes but is not limited to one or more of the following; gear information, steering information of a steering wheel, information about whether the vehicle is powered on within first preset duration before a recommended parking area is determined, and an automatic parking mode that the vehicle is in before the recommended parking area is determined.

For example, it may be determined, based on one or more of the following conditions, that the parking mode is pulling in the parking area; The vehicle can identify a parking space, but the vehicle is not in the parking space, or the vehicle is not completely pulled in the parking space; the vehicle switches from a state in which the vehicle is not in a parking space to a state in which the vehicle enters one or more parking spaces (for example, in a process of manually pulling in a parking space, the user does not pull the vehicle in the parking space through a plurality of gear changes); the vehicle switches from a state in which the vehicle is not in a parking space to a state in which the vehicle is pulled in the parking space, but the vehicle is not parked in the middle of the parking space (for example, in a time period before the vehicle is not parked in the middle of the parking space, the vehicle detects an operation that the user manually pulls the vehicle in the parking space); and before the parking mode is determined, the vehicle detects that the vehicle enters an automatic pulling-in mode, and actively or passively exits the automatic pulling-in mode when the vehicle is not pulled in a parking space.

For another example, it may be determined, based on one or more of the following conditions, that the parking mode is pulling out of the parking area; The vehicle can identify a parking space, and the vehicle is in the parking space and parks in the middle; when the vehicle is powered on and started for the first time, the vehicle can identify a parking space and the vehicle is in the parking space; before the parking mode is determined, the vehicle detects that the vehicle enters an automatic pulling-out mode, and the vehicle actively or passively exits the automatic pulling-out mode when the vehicle is not pulled out of a parking space; and the vehicle is in a parking space, and the vehicle detects that the vehicle does not completely leave the parking space after the user drives the vehicle for one or more times.

Optionally, before the determining a parking mode of the vehicle, the method further includes; determining that a speed of the vehicle is less than or equal to a preset speed threshold.

S2302: Obtain a relative position relationship between a vehicle and each of the plurality of parking areas.

Optionally, the relative position relationship further includes information about a distance $D_1$ between the vehicle and each parking area, and an included angle $\theta_1$ between a direction of a second side of the vehicle and a connection line between a wheel central point of the second side and a central point of a parking space line on a first side, and the first side and the second side correspond to the direction in which the vehicle is pulled in the parking area.

It should be understood that for descriptions of the information about the distance $D_1$ and the included angle $\theta_1$, refer to the descriptions in the foregoing embodiment. Details are not described herein again.

S2303: Recommend a first parking area to the user based on the relative position relationship and a first driving behavior of the user, where the plurality of parking areas include the first parking area.

Optionally, the method further includes; recommending a second parking area to the user based on the relative position relationship and a second driving behavior of the user, where the plurality of parking areas include the second parking area.

Optionally, the first driving behavior includes first gear information of the vehicle and first steering information of a steering wheel of the vehicle, the first steering information of the steering wheel corresponds to a first steering direction of a wheel, and the parking mode is pulling in the parking area; and the recommending a first parking area to the user based on the relative position relationship and a first driving behavior of the user includes; recommending the first parking area to a user based on the first gear information and an included angle $\theta_2$ between the first steering direction, and a direction of a first side of each parking area, where the first side corresponds to a direction in which the vehicle is pulled in the parking area.

It should be understood that, for descriptions of the included angle $\theta_2$, refer to the descriptions in the foregoing embodiment. Details are not described herein again.

Optionally, the method further includes; determining information about a parking trajectory from a current position of the vehicle to the first parking area based on a pose of the vehicle and information about the first parking area; and prompting the user with the information about the parking trajectory.

Optionally, the information about the parking trajectory includes one or more of a number of planned gear changes, a planned parking path, and planned parking duration from the current position of the vehicle to the first parking area. The method further includes; when one or more of the following conditions are met, prompting the user to use an automatic parking function; detecting that a number of gear changes of the user in a process of driving from the current position to the first parking area is greater than or equal to the number of planned gear changes; detecting that a length of a driving path of the vehicle from the current position to the first parking area is greater than or equal to a length of the planned parking path; or detecting that duration of parking of the vehicle from the current position to the first parking area is greater than or equal to the planned parking duration.

Optionally, the method further includes; when the vehicle is pulled in the first parking area and the vehicle is not parked in the middle of the first parking area, prompting the user that the vehicle is not parked in the middle of the first parking area, or prompting the user to use the automatic parking function.

An embodiment of this application further provides an apparatus for implementing any one of the foregoing methods. For example, the apparatus includes units (or means) configured to implement steps performed by the vehicle in any one of the foregoing methods.

Figure 24:
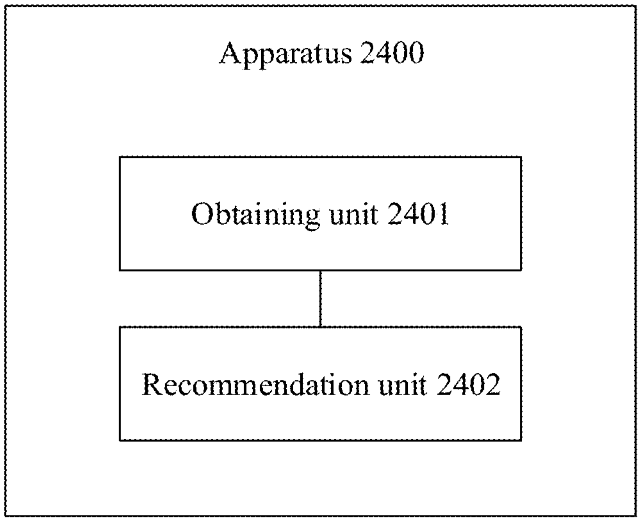
FIG. 24 is a schematic block diagram of a parking apparatus according to an embodiment of this application.

FIG. 24 is a schematic block diagram of a parking apparatus 2400 according to an embodiment of this application. As shown in FIG. 24, the apparatus 2400) includes;

an obtaining unit 2401, configured to obtain information about a plurality of parking areas, where the obtaining unit 2401 is further configured to obtain a relative position relationship between a vehicle and each of the plurality of parking areas; and a recommendation unit 2402, configured to recommend a first parking area to a user based on the relative position relationship and a first driving behavior of the user, where the plurality of parking areas include the first parking area.

Optionally, the recommendation unit 2402 is further configured to recommend a second parking area to the user based on the relative position relationship and a second driving behavior of the user, where the plurality of parking areas include the second parking area.

Optionally, the apparatus 2400 further includes a first determining unit, configured to; before the obtaining unit obtains the information about the plurality of parking areas, determine a parking mode of the vehicle based on the relative position relationship and a third driving behavior of the user, where the parking mode includes pulling in a parking area or pulling out of a parking area.

Optionally, the first driving behavior includes first gear information of the vehicle and first steering information of a steering wheel of the vehicle, the first steering information of the steering wheel corresponds to a first steering direction of a wheel, and the parking mode is pulling in the parking area; and the recommendation unit is specifically configured to recommend the first parking area to the user based on the first gear information and an included angle between the first steering direction and a direction of a first side of each parking area, where the first side corresponds to a direction in which the vehicle is pulled in the parking area.

Optionally, the relative position relationship further includes information about a distance between the vehicle and each parking area, and an included angle between a direction of a second side of the vehicle and a connection line between a wheel central point of the second side and a central point of a parking space line on the first side, and the first side and the second side correspond to the direction in which the vehicle is pulled in the parking area.

Optionally, the first determining unit is further configured to: before determining the parking mode of the vehicle, determine that a speed of the vehicle is less than or equal to a preset speed threshold.

Optionally, the apparatus further includes: a second determining unit, configured to determine information about a parking trajectory from a current position of the vehicle to the first parking area based on a pose of the vehicle and information about the first parking area; and a first prompting unit, configured to prompt the user with the information about the parking trajectory.

Optionally, the information about the parking trajectory includes one or more of a number of planned gear changes, a planned parking path, and planned parking duration from the current position of the vehicle to the first parking area; the first prompting unit is further configured to: when one or more of the following conditions are met, prompt the user to use an automatic parking function; detecting that a number of gear changes of the user in a process of driving from the current position to the first parking area is greater than or equal to the number of planned gear changes; detecting that a length of a driving path of the vehicle from the current position to the first parking area is greater than or equal to a length of the planned parking path; or detecting that duration of parking of the vehicle from the current position to the first parking area is greater than or equal to the planned parking duration.

Optionally, the apparatus further includes: a second prompting unit, configured to; when the vehicle is pulled in the first parking area and the vehicle is not parked in the middle of the first parking area, prompt the user that the vehicle is not parked in the middle of the first parking area, or prompt the user to use the automatic parking function.

The obtaining unit may be configured to obtain image information from an image sensor (for example, a camera lens). The recommendation unit may be configured to control a display apparatus to display information about a recommended parking area. Alternatively, the recommendation unit may be configured to control a voice module (for example, a speaker) to play voice information, to prompt the user with information about a recommended parking area.

It should be understood that division into the units in the foregoing apparatus is only logical function division. During actual implementation, all or some of the units may be integrated into one physical entity, or may be physically separated. In addition, a unit in the apparatus may be implemented in a form of invoking software by a processor. For example, the apparatus includes a processor, the processor is connected to a memory, the memory stores instructions, and the processor invokes the instructions stored in the memory, to implement any one of the foregoing methods or functions of units in the apparatus. For example, the processor is a general-purpose processor, for example, a CPU or a microprocessor, and the memory is a memory inside the apparatus or a memory outside the apparatus. Alternatively, a unit in the apparatus may be implemented in a form of a hardware circuit, and functions of some or all units may be implemented by designing the hardware circuit. The hardware circuit may be understood as one or more processors. For example, in an implementation, the hardware circuit is an ASIC, and functions of some or all units are implemented by designing a logical relationship between elements in the circuit. For another example, in another implementation, the hardware circuit may be implemented by using a PLD. An FPGA is used as an example. The FPGA may include a large number of logic gate circuits, and a connection relationship between the logic gate circuits is configured by using a configuration file, to implement functions of some or all of the foregoing units. All the units of the foregoing apparatus may be implemented in the form of invoking the software by the processor, or may be implemented in the form of the hardware circuit, or some of the units are implemented in the form of invoking the software by the processor, and a remaining unit is implemented in the form of the hardware circuit.

In this embodiment of this application, the processor is a circuit having a signal processing capability. In an implementation, the processor may be a circuit having an instruction reading and running capability, for example, a CPU, a microprocessor, a GPU, or a DSP. In another implementation, the processor may implement a specific function by using a logical relationship of a hardware circuit, and the logical relationship of the hardware circuit is fixed or reconfigurable. For example, the processor is a hardware circuit implemented by an ASIC or a PLD, for example, an FPGA. In the reconfigurable hardware circuit, a process in which the processor loads a configuration document to implement hardware circuit configuration may be understood as a process in which the processor loads instructions to implement functions of some or all of the foregoing units. In addition, the processor may be a hardware circuit designed for artificial intelligence, and may be understood as an ASIC, for example, an NPU, a TPU, or a DPU.

It can be learned that the units in the foregoing apparatus may be configured as one or more processors (or processing circuits) for implementing the foregoing methods, for example, a CPU, a GPU, an NPU, a TPU, a DPU, a microprocessor, a DSP, an ASIC, an FPGA, or a combination of at least two of these processor forms.

In addition, all or some of the units in the foregoing apparatus may be integrated together, or may be implemented independently. In an implementation, these units are integrated together and implemented in a form of a system-on-a-chip (SOC). The SOC may include at least one processor, configured to implement any one of the foregoing methods or implement functions of units of the apparatus. Types of the at least one processor may be different, for example, include a CPU and an FPGA, a CPU and an artificial intelligence processor, a CPU and a GPU, and the like.

An embodiment of this application further provides an apparatus. The apparatus includes a processing unit and a storage unit. The storage unit is configured to store instructions, and the processing unit executes the instructions stored in the storage unit, to enable the apparatus to perform the methods or steps performed in the foregoing embodiments.

Optionally, if the apparatus is in a vehicle, the processing unit may be the processors 151 to 15*n* shown in FIG. 1.

An embodiment of this application further provides a vehicle. The vehicle may include the apparatus 2400.

An embodiment of this application further provides a computer program product. The computer program product includes computer program code, and when the computer program code is run on a computer, the computer is enabled to perform the method.

An embodiment of this application further provides a computer-readable medium. The computer-readable medium stores program code, and when the computer program code is run on a computer, the computer is enabled to perform the method.

In an implementation process, steps in the foregoing methods can be implemented by using a hardware integrated logical circuit in the processor, or by using instructions in a form of software. The methods disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be understood that in this embodiment of this application, the memory may include a read-only memory and a random access memory, and provide instructions and data to the processor.

It should be further understood that sequence numbers of the foregoing processes do not mean execution sequences in various embodiments of this application. The execution sequences of the processes should be determined based on functions and internal logic of the processes, and should not be construed as any limitation on the implementation processes in embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is only an example. For example, division into the units is only logical function division and may be other division during actual implementation. For example, a plurality of units or assemblies may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely examples of implementations of this application, but are not intended to limit the protection scope of this application. Any variation or replacement readily figured out by a person skilled in the art within the technical scope disclosed in this application may fall within the protection scope of this application.

What is claimed is:

1. A parking apparatus, comprising:

at least one processor; and a memory coupled to the at least one processor and storing programming instructions for execution by the at least one processor;

wherein the programming instructions, when executed by the at least one processor, facilitate performance of the following by the parking apparatus:

obtaining information about a plurality of parking areas;

obtaining respective relative position relationships between a vehicle and each of the plurality of parking areas; and recommending a first parking area of the plurality of parking areas to a user based on a first driving behavior of the user and a first relative position relationship between the vehicle and the first parking area;

wherein the programming instructions, when executed by the at least one processor, further facilitate performance of the following by the parking apparatus:

determining information about a parking trajectory from a current position of the vehicle to the first parking area based on a pose of the vehicle and information about the first parking area; and prompting the user with the information about the parking trajectory;

wherein the information about the parking trajectory comprises one or more of:

a number of planned gear changes;

a planned parking path; or a planned parking duration; and wherein the programming instructions, when executed by the at least one processor, facilitate performance of the following by the parking apparatus: prompting the user to use an automatic parking function based on one or more of the following conditions being met:

detecting that a number of gear changes of the user in a process of driving from the current position to the first parking area is greater than or equal to the number of planned gear changes;

detecting that a length of a driving path of the vehicle from the current position to the first parking area is greater than or equal to a length of the planned parking path; or detecting that a duration of parking of the vehicle from the current position to the first parking area is greater than or equal to the planned parking duration.

2. The parking apparatus according to claim 1, wherein the programming instructions, when executed by the at least one processor, further facilitate performance of the following by the parking apparatus:

recommending a second parking area of the plurality of parking areas to the user based on a second driving behavior of the user and a second relative position relationship between the vehicle and the second parking area.

3. The parking apparatus according to claim 1, wherein the programming instructions, when executed by the at least one processor, further facilitate performance of the following by the parking apparatus:

determining a parking mode of the vehicle based on a relative position relationship and a third driving behavior of the user, wherein the parking mode comprises pulling into a parking area or pulling out of a parking area.

4. The parking apparatus according to claim 3, wherein the parking mode is pulling into the parking area;

wherein the first driving behavior comprises first gear information of the vehicle and first steering information of a steering wheel of the vehicle, the first steering information of the steering wheel corresponding to a first steering direction; and wherein recommending the first parking area to the user is based on the first gear information and an included angle between the first steering direction and a direction of a first side of each parking area, wherein the first side corresponds to a direction in which the vehicle is pulling into the parking area.

5. The parking apparatus according to claim 4, wherein the first relative position relationship further comprises information about a distance between the vehicle and the first parking area, and an included angle between a direction of a second side of the vehicle and a connection line between a wheel central point of the second side and a central point of a parking space line of each parking area on the first side, wherein the first side and the second side correspond to the direction in which the vehicle is pulling into the parking area.

6. The parking apparatus according to claim 3, wherein the programming instructions, when executed by the at least one processor, further facilitate performance of the following by the parking apparatus:

before determining the parking mode of the vehicle, determining that a speed of the vehicle is less than or equal to a preset speed threshold.

7. A non-transitory computer-readable medium having processor-executable instructions stored thereon for a parking method, wherein the processor-executable instructions, when executed, facilitate performance of the following:

obtaining information about a plurality of parking areas;

obtaining respective relative position relationships between a vehicle and each of the plurality of parking areas; and recommending a first parking area of the plurality of parking areas to a user based on a first driving behavior of the user and a first relative position relationship between the vehicle and the first parking area;

wherein the processor-executable instructions, when executed, further facilitate performance of the following:

determining information about a parking trajectory from a current position of the vehicle to the first parking area based on a pose of the vehicle and information about the first parking area; and prompting the user with the information about the parking trajectory;

wherein the information about the parking trajectory comprises one or more of:

a number of planned gear changes;

a planned parking path; or a planned parking duration; and wherein the processor-executable instructions, when executed, further facilitate performance of the following: prompting the user to use an automatic parking function based on one or more of the following conditions being met:

detecting that a number of gear changes of the user in a process of driving from the current position to the first parking area is greater than or equal to the number of planned gear changes;

detecting that a length of a driving path of the vehicle from the current position to the first parking area is greater than or equal to a length of the planned parking path; or detecting that a duration of parking of the vehicle from the current position to the first parking area is greater than or equal to the planned parking duration.

8. The non-transitory computer-readable medium according to claim 7, wherein the processor-executable instructions, when executed, further facilitate performance of the following:

recommending a second parking area of the plurality of parking areas to the user based on a second driving behavior of the user and a second relative position relationship between the vehicle and the second parking area.

9. The non-transitory computer-readable medium according to claim 8, wherein the second driving behavior comprises second gear information and/or second steering information of a steering wheel.

10. The non-transitory computer-readable medium according to claim 7, wherein the processor-executable instructions, when executed, further facilitate performance of the following:

before recommending the first parking area to the user, determining a parking mode of the vehicle based on a relative position relationship and a third driving behavior of the user, wherein the parking mode corresponds to pulling into a parking area or pulling out of a parking area.

11. The non-transitory computer-readable medium according to claim 10, wherein the parking mode is pulling into the parking area;

wherein the first driving behavior comprises first gear information of the vehicle and first steering information of a steering wheel of the vehicle, the first steering information of the steering wheel corresponding to a first steering direction; and wherein recommending the first parking area to the user is based on the first gear information and an included angle between the first steering direction and a direction of a first side of the first parking area, wherein the first side corresponds to a direction in which the vehicle is pulling into the parking area.

12. The non-transitory computer-readable medium according to claim 11, wherein the first relative position relationship further comprises information about a distance between the vehicle and the first parking area, and an included angle between a direction of a second side of the vehicle and a connection line between a wheel central point of the second side and a central point of a parking space line of the first parking area on the first side, wherein the first side and the second side correspond to the direction in which the vehicle is pulling into the parking area.

13. The non-transitory computer-readable medium according to claim 10, wherein the processor-executable instructions, when executed, further facilitate performance of the following:

before determining the parking mode of the vehicle, determining that a speed of the vehicle is less than or equal to a preset speed threshold.

14. The non-transitory computer-readable medium according to claim 10, wherein the third driving behavior comprises one or more of:

third gear information;

third steering information of a steering wheel;

information about whether the vehicle is powered on within a first preset duration before the parking mode of the vehicle is determined; or an automatic parking mode that the vehicle is in before the parking mode of the vehicle is determined.

15. The non-transitory computer-readable medium according to claim 7, wherein the processor-executable instructions, when executed, further facilitate performance of the following:

based on the vehicle having pulled into the first parking area and the vehicle not being parked in the middle of the first parking area, prompting the user that the vehicle is not parked in the middle of the first parking area, or prompting the user to use the automatic parking function.

16. A non-transitory computer-readable medium having processor-executable instructions stored thereon for a parking method, wherein the processor-executable instructions, when executed, facilitate performance of the following:

obtaining information about a plurality of parking areas;

obtaining respective relative position relationships between a vehicle and each of the plurality of parking areas; and recommending a first parking area of the plurality of parking areas to a user based on a first driving behavior of the user and a first relative position relationship between the vehicle and the first parking area;

wherein the processor-executable instructions, when executed, further facilitate performance of the following:

determining information about a parking trajectory from a current position of the vehicle to the first parking area based on a pose of the vehicle and information about the first parking area; and prompting the user with the information about the parking trajectory;

wherein the information about the parking trajectory comprises a planned parking path; and wherein the processor-executable instructions, when executed, further facilitate performance of the following: prompting the user to use an automatic parking function based on detecting that a length of a driving path of the vehicle from the current position to the first parking area is greater than or equal to a length of the planned parking path.

17. The non-transitory computer-readable medium according to claim 16, wherein the processor-executable instructions, when executed, further facilitate performance of the following:

recommending a second parking area of the plurality of parking areas to the user based on a second driving behavior of the user and a second relative position relationship between the vehicle and the second parking area.

18. The non-transitory computer-readable medium according to claim 17, wherein the second driving behavior comprises second gear information and/or second steering information of a steering wheel.

19. The non-transitory computer-readable medium according to claim 16, wherein the processor-executable instructions, when executed, further facilitate performance of the following:

before recommending the first parking area to the user, determining a parking mode of the vehicle based on a relative position relationship and a third driving behavior of the user, wherein the parking mode corresponds to pulling into a parking area or pulling out of a parking area.

20. The non-transitory computer-readable medium according to claim 16, wherein the processor-executable instructions, when executed, further facilitate performance of the following:

based on the vehicle having pulled into the first parking area and the vehicle not being parked in the middle of the first parking area, prompting the user that the vehicle is not parked in the middle of the first parking area, or prompting the user to use the automatic parking function.

* * * * *